US012457258B2

(12) United States Patent
Lee et al.

(10) Patent No.: US 12,457,258 B2
(45) **Date of Patent: *Oct. 28, 2025**

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Jinwon Lee, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,937

(22) Filed: May 14, 2024

(65) Prior Publication Data

US 2024/0388617 A1 Nov. 21, 2024

Related U.S. Application Data

(63) Continuation of application No. 17/226,709, filed on Apr. 9, 2021, now Pat. No. 12,021,910.

(60) Provisional application No. 63/010,066, filed on Apr. 15, 2020, provisional application No. 63/008,670, filed on Apr. 11, 2020.

(51) Int. Cl.
*H04L 65/70* (2022.01)
*H04L 9/40* (2022.01)

(52) U.S. Cl.
CPC .......... *H04L 65/70* (2022.05); *H04L 63/0428* (2013.01); *H04L 2212/00* (2013.01)

(58) Field of Classification Search
CPC ... H04L 9/00; H04L 9/40; H04L 63/00; H04L 63/04; H04L 63/0428; H04L 65/00; H04L 65/60; H04L 65/70; H04L 2212/00
See application file for complete search history.

(56) References Cited

U.S. PATENT DOCUMENTS

| | | | | |
|---|---|---|---|---|
| 11,216,984 | B2 * | 1/2022 | Sinharoy | G06T 3/40 |
| 12,021,910 | B2 * | 6/2024 | Lee | H04L 65/762 |
| 2020/0314435 | A1 * | 10/2020 | Tourapis | G06T 7/74 |
| 2022/0053216 | A1 * | 2/2022 | Yip | H04N 21/84 |
| 2022/0109901 | A1 * | 4/2022 | Takahashi | H04N 19/597 |
| 2022/0166814 | A1 * | 5/2022 | Hamza | H04L 67/02 |

* cited by examiner

*Primary Examiner* — Boris D Grijalva Lobos
(74) *Attorney, Agent, or Firm* — Fish & Richardson P.C.

(57) ABSTRACT

Disclosed herein are a point cloud data transmission method including encoding point cloud data, and transmitting point cloud data, and a point cloud data reception method including receiving point cloud data, decoding the point cloud data, and rendering the point cloud data.

7 Claims, 74 Drawing Sheets

| sample_stream_vpcc_header() { | Descriptor |
|---|---|
| ssvh_unit_size_precision_bytes_minus1 | u(3) |
| ssvh_reserved_zero_5bits | u(5) |
| } | |

25080

| sample_stream_vpcc_unit() { | Descriptor |
|---|---|
| ssvu_vpcc_unit_size | u(v) |
| vpcc_unit(ssvu_vpcc_unit_size ) | |
| } | |

FIG. 27

| vpcc_unit( numBytesInVPCCUnit) { | Descriptor |
|---|---|
| vpcc_unit_header( ) | |
| vpcc_unit_payload( ) | |
| while( more_data_in_vpcc_unit ) | |
| trailing_zero_8bits /* equal to 0x00 */ | f(8) |
| } | |

| vpcc_unit_header( ) { | Descriptor |
|---|---|
| vuh_unit_type | u(5) |
| if( vuh_unit_type == VPCC_AVD \|\| vuh_unit_type == VPCC_GVD \|\| | |
| vuh_unit_type == VPCC_OVD \|\| vuh_unit_type == VPCC_AD ) { | |
| vuh_vpcc_parameter_set_id | u(4) |
| vuh_atlas_id | u(6) |
| } | |
| if( vuh_unit_type == VPCC_AVD ) { | |
| vuh_attribute_index | u(7) |
| vuh_attribute_partition_index | u(5) |
| vuh_map_index | u(4) |
| vuh_auxiliary_video_flag | u(1) |
| } else if( vuh_unit_type == VPCC_GVD ) { | |
| vuh_map_index | u(4) |
| vuh_auxiliary_video_flag | u(1) |
| vuh_reserved_zero_12bits | u(12) |
| } else if( vuh_unit_type == VPCC_OVD \|\| vuh_unit_type == VPCC_AD ) | |
| vuh_reserved_zero_17bits | u(17) |
| else | |
| vuh_reserved_zero_27bits | u(27) |
| } | |

FIG. 28

| vpcc_unit_payload( ) { | Descriptor |
| --- | --- |
| if( vuh_unit_type == VPCC_VPS ) | |
| vpcc_parameter_set( ) | |
| else if( vuh_unit_type == VPCC_AD ) | |
| atlas_sub_bitstream( ) | |
| else if( vuh_unit_type == VPCC_OVD \|\| | |
| vuh_unit_type == VPCC_GVD \|\| | |
| vuh_unit_type == VPCC_AVD) | |
| video_sub_bitstream( ) | |
| } | |

FIG. 29

| vpcc_parameter_set( ) { | Descriptor |
|---|---|
| profile_tier_level() | |
| vps_vpcc_parameter_set_id | u(4) |
| vps_atlas_count_minus1 | u(6) |
| for(j = 0; j < vps_atlas_count_minus1 + 1; j++ ) { | |
| vps_frame_width[ j ] | u(16) |
| vps_frame_height[ j ] | u(16) |
| vps_map_count_minus1[ j ] | u(4) |
| if( vps_map_count_minus1[ j ] > 0 ) | |
| vps_multiple_map_streams_present_flag[ j ] | u(1) |
| vps_map_absolute_coding_enabled_flag[ j ][ 0 ] = 1 | |
| for( i = 1; i <= vps_map_count_minus1[ j ]; i++ ) { | |
| if( vps_multiple_map_streams_present_flag[ j ] ) | |
| vps_map_absolute_coding_enabled_flag[ j ][ i ] | u(1) |
| else | |
| vps_map_absolute_coding_enabled_flag[ j ][ i ] = 1 | |
| if( vps_map_absolute_coding_enabled_flag[ j ][ i ] = = 0 ) { | |
| if( i > 0) | |
| vps_map_predictor_index_diff[ j ][ i ] | ue(v) |
| else | |
| vps_map_predictor_index_diff[ j ][ i ] = 0 | |
| } | |
| } | |
| vps_auxiliary_video_present_flag[ j ] | u(1) |
| occupancy_information( j ) | |
| geometry_information( j ) | |
| attribute_information( j ) | |
| } | |
| vps_extension_present_flag | u(1) |
| if(vps_extension_present_flag) { | |
| vps_extension_length_minus1 | ue(v) |
| for( j = 0; j < vps_extension_length_minus1 + 1; j++ ) { | |
| vps_extension_data_byte | u(8) |
| } | |
| } | |
| byte_alignment( ) | |
| } | |

FIG. 32

| sample_stream_nal_header() { | Descriptor |
|---|---|
| ssvh_unit_size_precision_bytes_minus1 | u(3) |
| ssvh_reserved_zero_5bits | u(5) |
| } | |

| sample_stream_nal_unit() { | Descriptor |
|---|---|
| ssvu_nal_unit_size | u(v) |
| nal_unit(ssvu_nal_unit_size ) | |
| } | |

| nal_unit( NumBytesInNalUnit ) { | Descriptor |
|---|---|
| nal_unit_header | |
| NumBytesInRbsp = 0 | |
| for( i = 2; i < NumBytesInNalUnit; i++ ) | |
| rbsp_byte[ NumBytesInRbsp++ ] | b(8) |
| } | |

| nal_unit_header( ) { | Descriptor |
|---|---|
| nal_forbidden_zero_bit | f(1) |
| nal_unit_type | u(6) |
| nal_layer_id | u(6) |
| nal_temporal_id_plus1 | u(3) |
| } | |

FIG. 33

| nal_unit_type | Name of nal_unit_type | Content of NAL unit and RBSP syntax structure | NAL unit type class |
|---|---|---|---|
| 0 | NAL_TRAIL | Coded tile group of a non-TSA, non STSA trailing atlas frame<br>atlas_tile_group_layer_rbsp( ) | ACL |
| 1 | NAL_TSA | Coded tile group of a TSA atlas frame<br>atlas_tile_group_layer_rbsp( ) | ACL |
| 2 | NAL_STSA | Coded tile group of a STSA atlas frame<br>atlas_tile_group_layer_rbsp( ) | ACL |
| 3 | NAL_RADL | Coded tile group of a RADL atlas frame<br>atlas_tile_group_layer_rbsp( ) | ACL |
| 4 | NAL_RASL | Coded tile group of a RASL atlas frame<br>atlas_tile_group_layer_rbsp( ) | ACL |
| 5 | NAL_SKIP | Coded tile group of a skipped atlas frame<br>atlas_tile_group_layer_rbsp( ) | ACL |
| 6..9 | NAL_RSV_ACL_6..<br>NAL_RSV_ACL_9 | Reserved non-IRAP ACL NAL unit types | ACL |
| 10 | NAL_BLA_W_LP | Coded tile group of a BLA atlas frame | ACL |
| 11 | NAL_BLA_W_RADL | atlas_tile_group_layer_rbsp( ) | |
| 12 | NAL_BLA_N_LP | | |
| 13 | NAL_GBLA_W_LP | Coded tile group of a GBLA atlas frame | ACL |
| 14 | NAL_GBLA_W_RADL | atlas_tile_group_layer_rbsp( ) | |
| 15 | NAL_GBLA_N_LP | | |
| 16 | NAL_IDR_W_RADL | Coded tile group of an IDR atlas frame | ACL |
| 17 | NAL_IDR_N_LP | atlas_tile_group_layer_rbsp( ) | |
| 18 | NAL_GIDR_W_RADL | Coded tile group of a GIDR atlas frame | ACL |
| 19 | NAL_GIDR_N_LP | atlas_tile_group_layer_rbsp( ) | |
| 20 | NAL_CRA | Coded tile group of a CRA atlas frame<br>atlas_tile_group_layer_rbsp( ) | ACL |
| 21 | NAL_GCRA | Coded tile group of a GCRA atlas frame<br>atlas_tile_group_layer_rbsp( ) | ACL |
| 22 | NAL_IRAP_ACL_22 | Reserved IRAP ACL NAL unit types | ACL |
| 23 | NAL_IRAP_ACL_23 | | |
| 24..31 | NAL_RSV_ACL_24..<br>NAL_RSV_ACL_31 | Reserved non-IRAP ACL NAL unit types | ACL |
| 32 | NAL_ASPS | Atlas sequence parameter set<br>atlas_sequence_parameter_set_rbsp( ) | non-ACL |
| 33 | NAL_AFPS | Atlas frame parameter set<br>atlas_frame_parameter_set_rbsp( ) | non-ACL |
| 34 | NAL_AUD | Access unit delimiter<br>access_unit_delimiter_rbsp( ) | non-ACL |
| 35 | NAL_VPCC_AUD | V-PCC access unit delimiter<br>access_unit_delimiter_rbsp( ) | non-ACL |
| 36 | NAL_EOS | End of sequence<br>end_of_seq_rbsp( ) | non-ACL |
| 37 | NAL_EOB | End of bitstream<br>end_of_atlas_sub_bitstream_rbsp( ) | non-ACL |
| 38 | NAL_FD | Filler<br>filler_data_rbsp( ) | non-ACL |
| 39 | NAL_PREFIX_NSEI | Non-essential supplemental enhancement information | non-ACL |
| 40 | NAL_SUFFIX_NSEI | sei_rbsp( ) | |
| 41 | NAL_PREFIX_ESEI | Essential supplemental enhancement information | non-ACL |
| 42 | NAL_SUFFIX_ESEI | sei_rbsp( ) | |
| 43 | NAL_AAPS | Atlas adaptation parameter set<br>atlas_adaptation_parameter_set_rbsp( ) | non-ACL |
| 44..47 | NAL_RSV_NACL_44<br>NAL_RSV_NACL_47 | Reserved non-ACL NAL unit types | non-ACL |
| 48..63 | NAL_UNSPEC_48<br>NAL_UNSPEC_63 | Unspecified non-ACL NAL unit types | non-ACL |

FIG. 34

| atlas_sequence_parameter_set_rbsp( ) { | Descriptor |
| --- | --- |
| asps_atlas_sequence_parameter_set_id | ue(v) |
| asps_frame_width | u(16) |
| asps_frame_height | u(16) |
| asps_log2_patch_packing_block_size | u(3) |
| asps_log2_max_atlas_frame_order_cnt_lsb_minus4 | ue(v) |
| asps_max_dec_atlas_frame_buffering_minus1 | ue(v) |
| asps_long_term_ref_atlas_frames_flag | u(1) |
| asps_num_ref_atlas_frame_lists_in_asps | ue(v) |
| for( i = 0; i < asps_num_ref_atlas_frame_lists_in_asps; i++ ) | |
| ref_list_struct( i ) | |
| asps_use_eight_orientations_flag | u(1) |
| asps_extended_projection_enabled_flag | u(1) |
| asps_normal_axis_limits_quantization_enabled_flag | u(1) |
| asps_normal_axis_max_delta_value_enabled_flag | u(1) |
| asps_remove_duplicate_point_enabled_flag | u(1) |
| asps_pixel_deinterleaving_enabled_flag | u(1) |
| asps_patch_precedence_order_flag | u(1) |
| asps_patch_size_quantizer_present_flag | u(1) |
| asps_raw_patch_enabled_flag | u(1) |
| asps_eom_patch_enabled_flag | u(1) |
| if (asps_raw_patch_enabled_flag \|\| asps_eom_patch_enabled_flag ) | |
| asps_auxiliary_video_enabled_flag | u(1) |
| asps_point_local_reconstruction_enabled_flag | u(1) |
| asps_map_count_minus1 | u(4) |
| if( asps_pixel_deinterleaving_enabled_flag ) | |
| for( j = 0; j <= asps_map_count_minus1; j++ ) | |
| asps_pixel_deinterleaving_map_flag[ j ] | u(1) |
| if( asps_eom_patch_enabled_flag && asps_map_count_minus1 = = 0 ) | |
| asps_eom_fix_bit_count_minus1 | u(4) |
| if( asps_point_local_reconstruction_enabled_flag ) | |
| asps_point_local_reconstruction_information( asps_map_count_minus1 ) | |
| if( asps_pixel_deinterleaving_enabled_flag \|\| asps_point_local_reconstruction_enabled_flag ) | |
| asps_surface_thickness_minus1 | u(8) |
| asps_vui_parameters_present_flag | u(1) |
| if( asps_vui_parameters_present_flag ) | |
| vui_parameters( ) | |
| asps_extension_flag | u(1) |
| if( asps_extension_flag ) | |
| while( more_rbsp_data( ) ) | |
| asps_extension_data_flag | u(1) |
| rbsp_trailing_bits( ) | |
| } | |

FIG. 35

| atlas_frame_parameter_set_rbsp( ) { | Descriptor |
|---|---|
| afps_atlas_frame_parameter_set_id | ue(v) |
| afps_atlas_sequence_parameter_set_id | ue(v) |
| atlas_frame_tile_information( ) | |
| afps_output_flag_present_flag | u(1) |
| afps_num_ref_idx_default_active_minus1 | ue(v) |
| afps_additional_lt_afoc_lsb_len | ue(v) |
| afps_3d_pos_x_bit_count_minus1 | u(5) |
| afps_3d_pos_y_bit_count_minus1 | u(5) |
| afps_lod_mode_enabled_flag | u(1) |
| afps_override_eom_for_depth_flag | u(1) |
| if( afps_override_eom_for_depth_flag ) { | |
| afps_eom_number_of_patch_bit_count_minus1 | u(4) |
| afps_eom_max_bit_count_minus1 | u(4) |
| } | |
| afps_raw_3d_pos_bit_count_explicit_mode_flag | u(1) |
| afps_fixed_camera_model_flag | u(1) |
| afps_extension_flag | u(1) |
| if( afps_extension_flag ) | |
| while( more_rbsp_data( ) ) | |
| afps_extension_data_flag | u(1) |
| rbsp_trailing_bits( ) | |
| } | |

FIG. 36

| atlas_frame_tile_information( ) { | Descriptor |
|---|---|
| afti_single_tile_in_atlas_frame_flag | u(1) |
| if( !afti_single_tile_in_atlas_frame_flag ) { | |
| afti_uniform_tile_spacing_flag | u(1) |
| if( afti_uniform_tile_spacing_flag ) { | |
| afti_tile_cols_width_minus1 | ue(v) |
| afti_tile_rows_height_minus1 | ue(v) |
| } else { | |
| afti_num_tile_columns_minus1 | ue(v) |
| afti_num_tile_rows_minus1 | ue(v) |
| for( i = 0; i < afti_num_tile_columns_minus1; i++ ) | |
| afti_tile_column_width_minus1[ i ] | ue(v) |
| for( i = 0; i < afti_num_tile_rows_minus1; i++ ) | |
| afti_tile_row_height_minus1[ i ] | ue(v) |
| } | |
| afti_single_tile_per_tile_group_flag | u(1) |
| if( !afti_single_tile_per_tile_group_flag ) { | |
| afti_num_tile_groups_in_atlas_frame_minus1 | ue(v) |
| for( i = 0; i < afti_num_tile_groups_in_atlas_frame_minus1 + 1; i++ ) { | |
| if( i > 0 ) | |
| afti_top_left_tile_idx[ i ] | u(v) |
| afti_bottom_right_tile_idx_delta[ i ] | u(v) |
| } | |
| } | |
| afti_signalled_tile_group_ id_flag | u(1) |
| if( afti_signalled_tile_group_id_flag ) { | |
| afti_signalled_tile_group_id_length_minus1 | ue(v) |
| for( i = 0; i < afti_num_tile_groups_in_atlas_frame_minus1 + 1; i++ ) | |
| afti_tile_group_id[ i ] | u(v) |
| } | |
| } | |
| } | |

FIG. 37

| atlas_adaptation_parameter_set_rbsp() { | Descriptor |
|---|---|
| aaps_atlas_adaptation_parameter_set_id | ue(v) |
| aaps_camera_parameters_present_flag | u(1) |
| if ( aaps_camera_parameters_present_flag ) | |
| atlas_camera_parameters( ) | |
| aaps_extension_flag | u(1) |
| if( aaps_extension_flag ) | |
| while( more_rbsp_data( ) ) | |
| aaps_extension_data_flag | u(1) |
| rbsp_trailing_bits( ) | |
| } | |

FIG. 38

| atlas_camera_parameters( ) { | Descriptor |
|---|---|
| acp_camera_model | u(8) |
| if( acp_camera_model == 1 ) { | |
| acp_scale_enabled_flag | u(1) |
| acp_offset_enabled_flag | u(1) |
| acp_rotation_enabled_flag | u(1) |
| if( acp_scale_enabled_flag ) | |
| for( d = 0; d < 3; d++ ) | |
| acp_scale_on_axis[ d ] | u(32) |
| if( acp_offset_enabled_flag ) | |
| for( d = 0; d < 3; d++ ) | |
| acp_offset_on_axis[ d ] | i(32) |
| if( acp_rotation_enabled_flag ) { | |
| acp_rotation_qx | i(16) |
| acp_rotation_qy | i(16) |
| acp_rotation_qz | i(16) |
| } | |
| } | |
| } | |

FIG. 39

| atlas_tile_group_layer_rbsp( ) { | Descriptor |
|---|---|
| atlas_tile_group_header( ) | |
| if( atgh_type != SKIP_TILE_GRP ) | |
| atlas_tile_group_data_unit( ) | |
| rbsp_trailing_bits( ) | |
| } | |

| atlas_tile_group_header( ) { | Descriptor |
|---|---|
| atgh_atlas_frame_parameter_set_id | ue(v) |
| atgh_atlas_adaptation_parameter_set_id | ue(v) |
| atgh_address | u(v) |
| atgh_type | ue(v) |
| if( afps_output_flag_present_flag ) | |
| atgh_atlas_output_flag | u(1) |
| atgh_atlas_frm_order_cnt_lsb | u(v) |
| if( asps_num_ref_atlas_frame_lists_in_asps > 0 ) | |
| atgh_ref_atlas_frame_list_sps_flag | u(1) |
| if( atgh_ref_atlas_frame_list_sps_flag == 0) | |
| ref_list_struct( asps_num_ref_atlas_frame_lists_in_asps ) | |
| else if( asps_num_ref_atlas_frame_lists_in_asps > 1 ) | |
| atgh_ref_atlas_frame_list_idx | u(v) |
| for( j = 0; j < NumLtrAtlasFrmEntries; j++ ) { | |
| atgh_additional_afoc_lsb_present_flag[ j ] | u(1) |
| if( atgh_additional_afoc_lsb_present_flag[ j ] ) | |
| atgh_additional_afoc_lsb_val[ j ] | u(v) |
| } | |
| if( atgh_type != SKIP_TILE_GRP ) { | |
| if( asps_normal_axis_limits_quantization_enabled_flag ) { | |
| atgh_pos_min_z_quantizer | u(5) |
| if( asps_normal_axis_max_delta_value_enabled_flag ) | |
| atgh_pos_delta_max_z_quantizer | u(5) |
| } | |
| if( asps_patch_size_quantizer_present_flag ) { | |
| atgh_patch_size_x_info_quantizer | u(3) |
| atgh_patch_size_y_info_quantizer | u(3) |
| } | |
| if( afps_raw_3d_pos_bit_count_explicit_mode_flag ) | |
| atgh_raw_3d_pos_axis_bit_count_minus1 | u(v) |
| if( atgh_type == P_TILE_GRP && num_ref_entries[ RlsIdx ] > 1 ) { | |
| atgh_num_ref_idx_active_override_flag | u(1) |
| if( atgh_num_ref_idx_active_override_flag ) | |
| atgh_num_ref_idx_active_minus1 | ue(v) |
| } | |
| } | |
| byte_alignment( ) | |
| } | |

FIG. 40

| ref_list_struct( rlsIdx ) { | Descriptor |
| --- | --- |
| num_ref_entries[ rlsIdx ] | ue(v) |
| for( i = 0; i < num_ref_entries[ rlsIdx ]; i++ ) { | |
| if( asps_long_term_ref_atlas_frames_flag ) | |
| st_ref_atlas_frame_flag[ rlsIdx ][ i ] | u(1) |
| if( st_ref_atlas_frame_flag[ rlsIdx ][ i ] ) { | |
| abs_delta_afoc_st[ rlsIdx ][ i ] | ue(v) |
| if( abs_delta_afoc_st[ rlsIdx ][ i ] > 0 ) | |
| strpf_entry_sign_flag[ rlsIdx ][ i ] | u(1) |
| } else | |
| afoc_lsb_lt[ rlsIdx ][ i ] | u(v) |
| } | |
| } | |

FIG. 41

| atlas_tile_group_data_unit( ) { | Descriptor |
|---|---|
| p = 0 | |
| atgdu_patch_mode[ p ] | ue(v) |
| while( atgdu_patch_mode[ p ] != I_END && atgdu_patch_mode[p ] != P_END ) { | |
| patch_information_data( p, atgdu_patch_mode[ p ] ) | |
| p++ | |
| atgdu_patch_mode[ p ] | ue(v) |
| } | |
| AtgduTotalNumberOfPatches = p | |
| byte_alignment( ) | |
| } | |

FIG. 42

| patch_information_data ( patchIdx, patchMode ) { | Descriptor |
|---|---|
| if( atgh_type == SKIP_TILE_GR ) | |
| skip_patch_data_unit( patchIdx ) | |
| else if( atgh_type == P_TILE_GR ) { | |
| if( patchMode == P_SKIP ) | |
| skip_patch_data_unit( patchIdx ) | |
| else if( patchMode == P_MERGE ) | |
| merge_patch_data_unit( patchIdx ) | |
| else if( patchMode == P_INTRA ) | |
| patch_data_unit( patchIdx ) | |
| else if( patchMode == P_INTER ) | |
| inter_patch_data_unit( patchIdx ) | |
| else if( patchMode == P_RAW ) | |
| raw_patch_data_unit( patchIdx ) | |
| else if( patchMode == P_EOM ) | |
| eom_patch_data_unit( patchIdx ) | |
| } | |
| else if( atgh_type == I_TILE_GR ) { | |
| if( patchMode == I_INTRA ) | |
| patch_data_unit( patchIdx ) | |
| else if( patchMode == I_RAW ) | |
| raw_patch_data_unit( patchIdx ) | |
| else if( patchMode == I_EOM ) | |
| eom_patch_data_unit( patchIdx ) | |
| } | |
| } | |

FIG. 43

| patch_data_unit( patchIdx ) { | Descriptor |
|---|---|
| pdu_2d_pos_x[ patchIdx ] | ue(v) |
| pdu_2d_pos_y[ patchIdx ] | ue(v) |
| pdu_2d_size_x_minus1[ patchIdx ] | ue(v) |
| pdu_2d_size_y_minus1[ patchIdx ] | ue(v) |
| pdu_3d_pos_x[ patchIdx ] | u(v) |
| pdu_3d_pos_y[ patchIdx ] | u(v) |
| pdu_3d_pos_min_z[ patchIdx ] | u(v) |
| if( asps_normal_axis_max_delta_value_enabled_flag ) | |
| pdu_3d_pos_delta_max_z[ patchIdx ] | u(v) |
| pdu_projection_id[ patchIdx ] | u(v) |
| pdu_orientation_index[ patchIdx ] | u(v) |
| if( afps_lod_mode_enabled_flag ) { | |
| pdu_lod_enabled_flag[ patchIndex ] | u(1) |
| if( pdu_lod_enabled_flag[ patchIndex ] > 0 ) { | |
| pdu_lod_scale_x_minus1[ patchIndex ] | ue(v) |
| pdu_lod_scale_y[ patchIndex ] | ue(v) |
| } | |
| } | u(v) |
| if( asps_point_local_reconstruction_enabled_flag ) | |
| point_local_reconstruction_data( patchIdx ) | |
| } | |

FIG. 44

```
class VPCCAtlasRelationBox extends Box('vpcA') {
        VPCCAtlasRelationRecord VPCCAtlas;
}

aligned(8) class VPCCAtlasRelationRecord {
bit(1) entry_point_flag;
        unsigned int(8) num_atlas_data;
        for (i=0; i<num_atlas_data; i++) {
                unsigned int(8) atlas_id;
                unsigned int(8) num_atlas_tile_groups;
                for (j=0; j<num_atlas_tile_groups; j++) {
                        unsigned int(16) atlas_tile_group_id;
                }
                unsigned int(8) num_vpcc_component_track_groups;
                for (k=0; k<num_vpcc_component_track_groups; k++) {
unsigned int(32) vpcc_component_track_group_id;
                }
                unsigned int(8) num_vpcc_component_tracks;
                for (p=0; p<num_vpcc_component_tracks; p++) {
                        unsigned int(32) vpcc_component_track_id;
                }
        }
}
```

FIG. 45

```
class VPCCGlobalAtlasInformationBox extends Box('vpcA') {
        VPCCGlobalAtlasInformationRecord GlobalAtlas;
}

aligned(8) class VPCCGlobalAtlasInformationRecord {
        unsigned int(8) num_vpcc_tracks;
        for (i=0; i<num_vpcc_tracks; i++) {
                unsigned int(8) track_id;
                bit(1) entry_point_flag;
                unsigned int(8) num_atlas_data;
                for(j=0; j<num_atlas_data; j++) {
                        unsigned int(8) atlas_id;
                        unsigned int(8) num_atlas_tile_groups;
                        for (k=0; k<num_atlas_tile_groups; k++) {
                                unsigned int(16) atlas_tile_group_id;
                        }
                        unsigned int(8) num_vpcc_component_track_groups;
                        for (k=0; k<num_vpcc_component_track_groups; k++) {
unsigned int(32) vpcc_component_track_group_id;
                        }
                        unsigned int(8) num_vpcc_component_tracks;
                                for (p=0; p<num_vpcc_component_tracks; p++) {
                                unsigned int(32) vpcc_component_track_id;
                        }
                }
        }
}
```

FIG. 46

```
aligned(8) class DynamicAtlasRelationSampleGroupDescriptionEntry()
extends SampleGroupDescriptionEntry('dyar') {
        VPCCAtlasRelationBox();
}
```

```
aligned(8) class DynamicGlobalAtlasInformationSampleGroupDescriptionEntry()
extends SampleGroupDescriptionEntry('dyar') {
        VPCCGlobalAtlasInformationBox();
}
```

FIG. 53

| scene_object_information( payloadSize ) { | Descriptor |
|---|---|
| soi_cancel_flag | u(1) |
| soi_num_object_updates | ue(v) |
| if ( soi_num_object_updates > 0 ) { | |
| soi_simple_objects_flag | u(1) |
| if ( soi_simple_objects_flag == 0) { | |
| soi_object_label_present_flag | u(1) |
| soi_priority_present_flag | u(1) |
| soi_object_hidden_present_flag | u(1) |
| soi_object_dependency_present_flag | u(1) |
| soi_visibility_cones_present_flag | u(1) |
| soi_3d_bounding_box_present_flag | u(1) |
| soi_collision_shape_present_flag | u(1) |
| soi_point_style_present_flag | u(1) |
| soi_material_id_present_flag | u(1) |
| soi_extension_present_flag | u(1) |
| } | |
| else { | |
| soi_object_label_present_flag = 0 | |
| soi_priority_present_flag = 0 | |
| soi_object_hidden_present_flag = 0 | |
| soi_object_dependency_present_flag = 0 | |
| soi_visibility_cones_present_flag = 0 | |
| soi_3d_bounding_box_present_flag = 0 | |
| soi_collision_shape_present_flag = 0 | |
| soi_point_style_present_flag = 0 | |
| soi_material_id_present_flag = 0 | |
| soi_extension_present_flag = 0 | |
| } | |
| if (soi_3d_bounding_box_present_flag) { | |
| soi_3d_bounding_box_scale_log2 | u(5) |
| soi_3d_bounding_box_precision_minus8 | u(5) |
| } | |

FIG. 54

| | |
|---|---|
| soi_log2_max_object_idx_updated | u(5) |
| if( soi_object_dependency_present_flag ) | |
| soi_log2_max_object_dependency_idx | u(5) |
| for( i = 0; i <= soi_num_object_updates; i++ ) { | |
| soi_object_idx[ i ] | u(v) |
| k = soi_object_idx[ i ] | |
| soi_object_cancel_flag[ k ] | u(1) |
| ObjectTracked[ k ] = ! pi_object_cancel_flag[ k ] ] | |
| if (!soi_object_cancel_flag[ k ]) { | |
| if( soi_object_label_present_flag) { | |
| soi_object_label_update_flag[ k ] | u(1) |
| if( soi_object_label_update_flag[ k ] ) | |
| soi_object_label_idx[ k ] | ue(v) |
| } | |
| if( soi_priority_present_flag ) { | |
| soi_priority_update_flag[ k ] | u(1) |
| if( soi_priority_update_flag[ k ] ) | |
| soi_priority_value[ k ] | u(4) |
| } | |
| if( soi_object_hidden_present_flag ) | |
| soi_object_hidden_flag[ k ] | u(1) |
| if( soi_object_dependency_present_flag ) { | |
| soi_object_dependency_update_flag[ k ] | u(1) |
| if (soi_object_dependency_update_flag[ k ]) { | |
| soi_object_num_dependencies[ k ] | u(4) |
| for( j = 0; j < soi_object_num_dependencies[ k ]; j++ ) | |
| soi_object_dependency_idx[ k ] [ j ] | u(v) |
| } | |
| } | |
| if( soi_visibility_cones_present_flag ) { | |
| soi_visibility_cones _update_flag[ k ] | u(1) |
| if( soi_visibility_cones_update_flag[ k ]) { | |
| soi_direction_x[ k ] | fl(32) |
| soi_direction_y[ k ] | fl(32) |
| soi_direction_z[ k ] | fl(32) |
| soi_angle[ k ] | fl(16) |
| } | |
| } | |

FIG. 55

| | |
|---|---|
| if( soi_3d_bounding_box_present_flag ) { | |
| soi_3d_bounding_box_update_flag[ k ] | u(1) |
| if( soi_3d_bounding_box_update_flag[ k ]) { | |
| soi_3d_bounding_box_x[ k ] | u(v) |
| soi_3d_bounding_box_y[ k ] | u(v) |
| soi_3d_bounding_box_z[ k ] | u(v) |
| soi_3d_bounding_box_delta_x[ k ] | u(v) |
| soi_3d_bounding_box_delta_y[ k ] | u(v) |
| soi_3d_bounding_box_delta_z[ k ] | u(v) |
| } | |
| } | |
| if( soi_collision_shape_present_flag ) { | |
| soi_collision_shape_update_flag[ k ] | u(1) |
| if (soi_collision_shape_update_flag[ k] ]) | |
| soi_collision_shape_id[ k ] | u(16) |
| } | |
| if( soi_point_style_present_flag ) { | |
| soi_point_style_update_flag[ k ] | u(1) |
| if (soi_point_style_update_flag[ k] ]) { | |
| soi_point_shape_id[ k ] | u(8) |
| soi_point_size[ k ] | u(16) |
| } | |
| } | |
| if( soi_material_id_present_flag ) { | |
| soi_material_id_update_flag[ k ] | u(1) |
| if (soi_material_id_update_flag[ k] ]) | |
| soi_material_id[ k ] | u(16) |
| } | |
| } | |
| } | |
| } | |

| | |
|---|---|
| } | |

FIG. 56

| object_label_information ( payload_size) { | Descriptor |
|---|---|
| oli_cancel_flag | u(1) |
| if (!oli_cancel_flag) { | |
| oli_label_language_present_flag | u(1) |
| if( oli_label_language_present_flag ) { | |
| while( !byte_aligned( ) ) | |
| oli_bit_equal_to_zero /* equal to 0 */ | f(1) |
| oli_label_language | st(v) |
| } | |
| oli_num_label_updates | ue(v) |
| for( i = 0; i < oli_num_label_updates ; i++ ) { | |
| oli_label_idx[ i ] | ue(v) |
| oli_label_cancel_flag | u(1) |
| LabelAssigned[ pi_label_idx[ i] ] = !pi_label_cancel_flag | |
| if ( !oli_label_cancel_flag) { | |
| while( !byte_aligned( ) ) | |
| oli_bit_equal_to_zero /* equal to 0 */ | f(1) |
| oli_label[ oli_label_idx[ i ] ] | st(v) |
| } | |
| } | |
| } | |
| } | |

FIG. 57

| patch_information ( payload_size ) { | Descriptor |
|---|---|
| pi_cancel_flag | u(1) |
| pi_num_tile_group_updates | ue(v) |
| if ( pi_num_tile_group_updates > 0 ) { | ue(v) |
| pi_log2_max_object_idx_tracked | u(5) |
| pi_log2_max_patch_idx_updated | u(4) |
| } | |
| for( i = 0; i <= pi_num_tile_group_updates; i++ ) { | |
| pi_tile_group_address[ i ] | ue(v) |
| j = pi_tile_group_address[ i ] | |
| pi_tile_group_cancel_flag[ j ] | u(1) |
| pi_num_patch_updates[ j ] | ue(v) |
| for( k = 0; k < pi_num_patch_updates[ j ]; k++ ) { | |
| pi_patch_idx[ j ][ k ] | u(v) |
| p = pi_patch_idx[ j ][ k ] | |
| pi_patch_cancel_flag[ j ][ p ] | u(1) |
| if( !pi_patch_cancel_flag[ j ][ p ] ) { | |
| pi_patch_number_of_objects_minus1[ j ][ p ] | ue(v) |
| m = pi_patch_number_of_objects_minus1[ j ][ p ] + 1 | |
| for( n = 0; n < m; n++ ) | |
| pi_patch_object_idx[ j ][ p ][ n ] | u(v) |
| } | |
| } | |
| } | |
| } | |

FIG. 58

| volumetric_rectangle_information ( payload_size ) { | Descriptor |
|---|---|
| vri_cancel_flag | u(1) |
| vri_num_rectangles_updates | ue(v) |
| if ( vri_num_rectangles_updates > 0 ) { | ue(v) |
| vri_log2_max_object_idx_tracked | u(5) |
| vri_log2_max_rectangle_idx_updated | u(4) |
| } | |
| for( k = 0; k < vri_num_rectangles_updates]; k++ ) { | |
| vri_rectangle_idx[ k ] | u(v) |
| p = vri_rectangle_idx[ k ] | |
| vri_rectangle_cancel_flag[ p ] | u(1) |
| if( !vri_rectangle_cancel_flag[ p ] ) { | |
| vri_bounding_box_update_flag[ p ] | u(1) |
| if( vri_bounding_box_update_flag[ p ] ) { | |
| vri_bounding_box_top[ p ] | u(v) |
| vri_bounding_box_left[ p ] | u(v) |
| vri_bounding_box_width[ p ] | u(v) |
| vri_bounding_box_height[ p ] | u(v) |
| } | |
| vri_rectangle_number_of_objects_minus1[ p ] | ue(v) |
| m = vri_rectangle_number_of_objects_minus1[ p ] + 1 | |
| for( n = 0; n < m; n++ ) | |
| vri_rectangle_object_idx[ p ][ n ] | u(v) |
| } | |
| } | |
| } | |

FIG. 61

```
aligned(8) class 3DPoint() {
    unsigned int(16) x;
    unsigned int(16) y;
    unsigned int(16) z;
}
aligned(8) class CuboidRegionStruct() {
    unsigned int(16) cuboid_dx;
    unsigned int(16) cuboid_dy;
    unsigned int(16) cuboid_dz;
}
aligned(8) class 3DSpatialRegionStruct(dimensions_included_flag) {
    unsigned int(16) 3d_region_id;
    3DPoint anchor;
    if (dimensions_included_flag) {
        CuboidRegionStruct();
    }
}
```

FIG. 62

```
aligned(8) class VPCCSpatialRegionsBox extends FullBox('vpsr',0,0) {
    unsigned int(16) num_regions;
    for (i=0; i < num_regions; i++) {
        3DSpatialRegionStruct(1);
         LabelInfoStruct();
                unsigned int(16) num_atlas;
                 for(m=0; m< num_atlas ; m++)
                {
                  unsigned int(16) atlas_id;

          unsigned int(16) num_region_tile_groups;
          for (k=0; k < num_region_tile_groups; k++) {
              unsigned int(16) region_tile_group_id;
            unsigned int(8) num_patch_updates;
              for (p=0; p < num_patch_updates; p++)
                  unsigned int(16) patch_id;
         }
         }
               unsigned int(8) num_track_groups;
               for (j=0; j < num_track_groups; j++) {
                   unsigned int(32) track_group_id;
               }
            }
}

aligned(8) class LabelInfoStruct() {
    unsigned int(16) label_id;
    string label_language;
    string label_name;
}
```

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a continuation of U.S. application Ser. No. 17/226,709, filed on Apr. 9, 2021, which claims the benefit of U.S. Provisional Application No. 63/008,670, filed on Apr. 11, 2020, and 63/010,066, filed on Apr. 15, 2020, which are hereby incorporated by reference as if fully set forth herein.

TECHNICAL FIELD

Embodiments provide a method for providing point cloud content to provide a user with various services such as virtual reality (VR), augmented reality (AR), mixed reality (MR), and self-driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

To achieve these objects and other advantages and in accordance with the purpose of the disclosure, as embodied and broadly described herein, a method for transmitting point cloud data may include encoding point cloud data, encapsulating the point cloud data, and transmitting the point cloud data.

In another aspect of the present disclosure, a method for receiving point cloud data may include receiving point cloud data, decapsulating the point cloud data, and decoding the point cloud data.

The point cloud data transmission method, the point cloud data transmission device, the point cloud data reception method, and the point cloud data reception device according to the embodiments may provide a good-quality point cloud service.

The point cloud data transmission method, the point cloud data transmission device, the point cloud data reception method, and the point cloud data reception device according to the embodiments may achieve various video codec methods.

The point cloud data transmission method, the point cloud data transmission device, the point cloud data reception method, and the point cloud data reception device according to the embodiments may provide universal point cloud content such as a self-driving service.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 24 shows a patch, an atlas, an atlas tile group, an atlas frame, and the like;

FIG. 27 shows a V-PCC unit and a V-PCC unit header according to embodiments;

FIG. 28 shows the payload of a V-PCC unit according to embodiments;

FIG. 29 shows a V-PCC parameter set according to embodiments;

FIG. 32 shows a sample stream NAL unit, a sample stream NAL unit header, a NAL unit, and a NAL unit header included in a bitstream containing point cloud data according to embodiments;

FIG. 33 shows NAL unit types according to embodiments;

FIG. 34 shows an atlas sequence parameter set according to embodiments;

FIG. 35 shows an atlas frame parameter set according to embodiments;

FIG. 36 shows atlas_frame_tile_information according to embodiments;

FIG. 37 shows atlas_adaptation_parameter_set according to embodiments;

FIG. 38 shows atlas_camera_parameters according to embodiments;

FIG. 39 shows atlas_tile_group_layer and atlas_tile_group_header according to embodiments;

FIG. 40 shows a reference list structure (ref_list_struct) according to embodiments;

FIG. 41 shows atlas tile group data (atlas_tile_group_data_unit) according to embodiments;

FIG. 42 shows patch_information_data according to embodiments;

FIG. 43 shows patch_data_unit according to embodiments;

FIG. 44 shows a V-PCC atlas relation box according to embodiments;

FIG. 45 shows a V-PCC global atlas information box according to embodiments;

FIG. 46 shows a dynamic atlas relation sample group and a dynamic global atlas information sample group according to embodiments;

FIGS. 53, 54, and 55 show scene object information according to embodiments;

FIG. 56 shows object label information according to embodiments;

FIG. 57 shows patch information according to embodiments;

FIG. 58 shows volumetric rectangle information;

FIG. 61 shows a VPCC spatial regions box according to embodiments;

FIG. 62 shows a VPCC spatial regions box according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
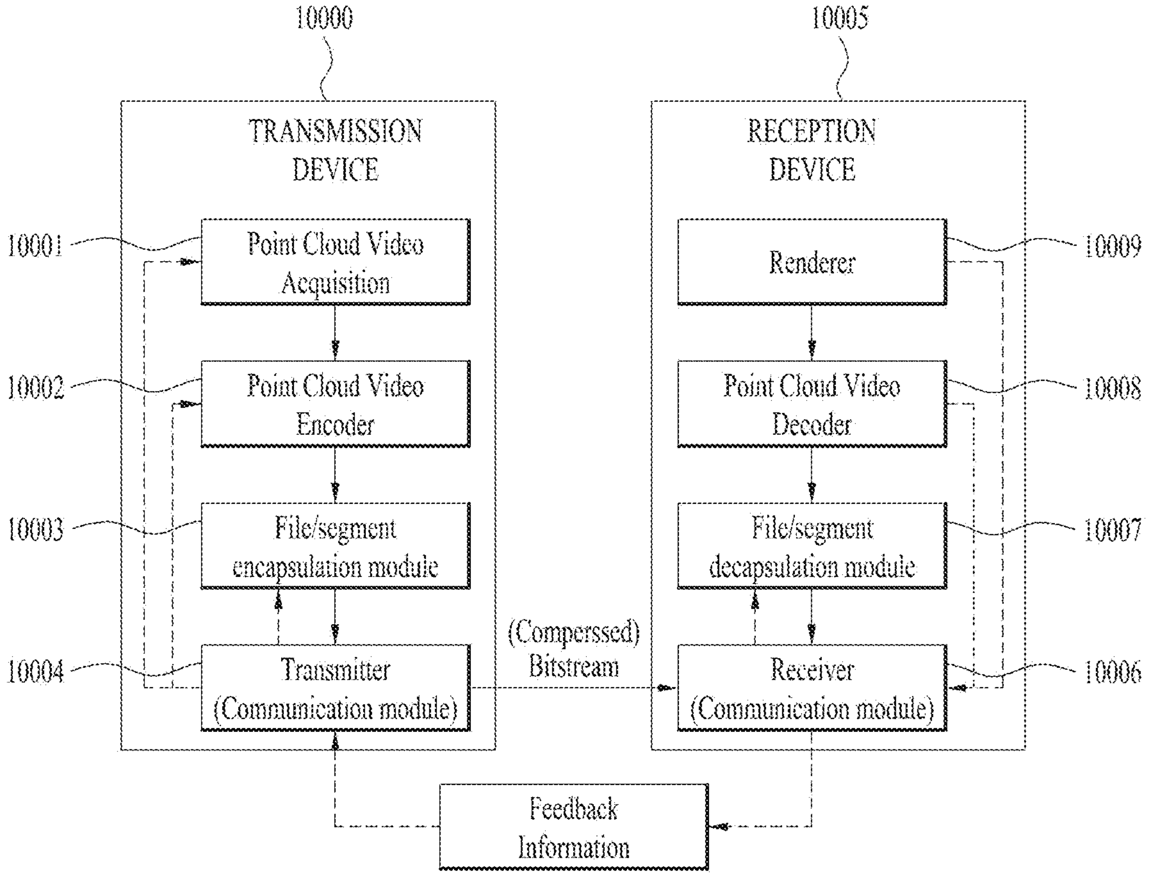
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and self-driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may not only include encoded point cloud video data, but also include signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to cither point cloud data or points) and/or signaling data related to the point cloud. The specific operation of encoding according to embodiments will be described below.

As used herein, the term V-PCC may stand for Video-based Point Cloud Compression (V-PCC). The term V-PCC may be the same as Visual Volumetric Video-based Coding (V3C). These terms may be complementarily used.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform a reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., self-driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data. The data may be transmitted in the form of a bitstream containing a point cloud.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

Figure 2:
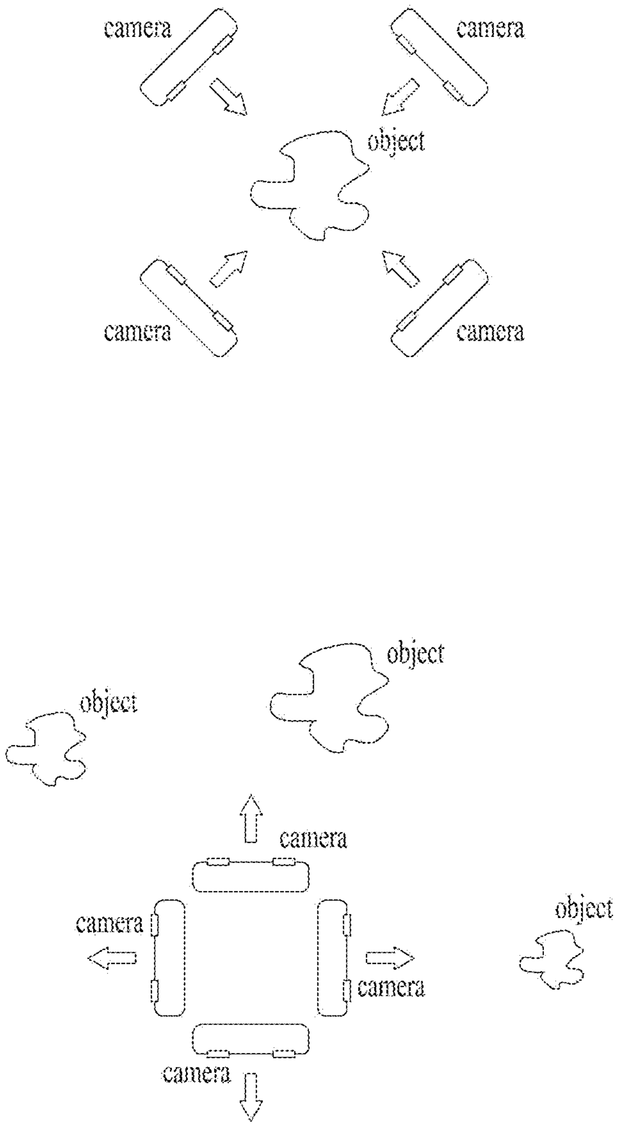
FIG. 2 illustrates capture of point cloud data according to embodiments.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term “point cloud video” may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/self-driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
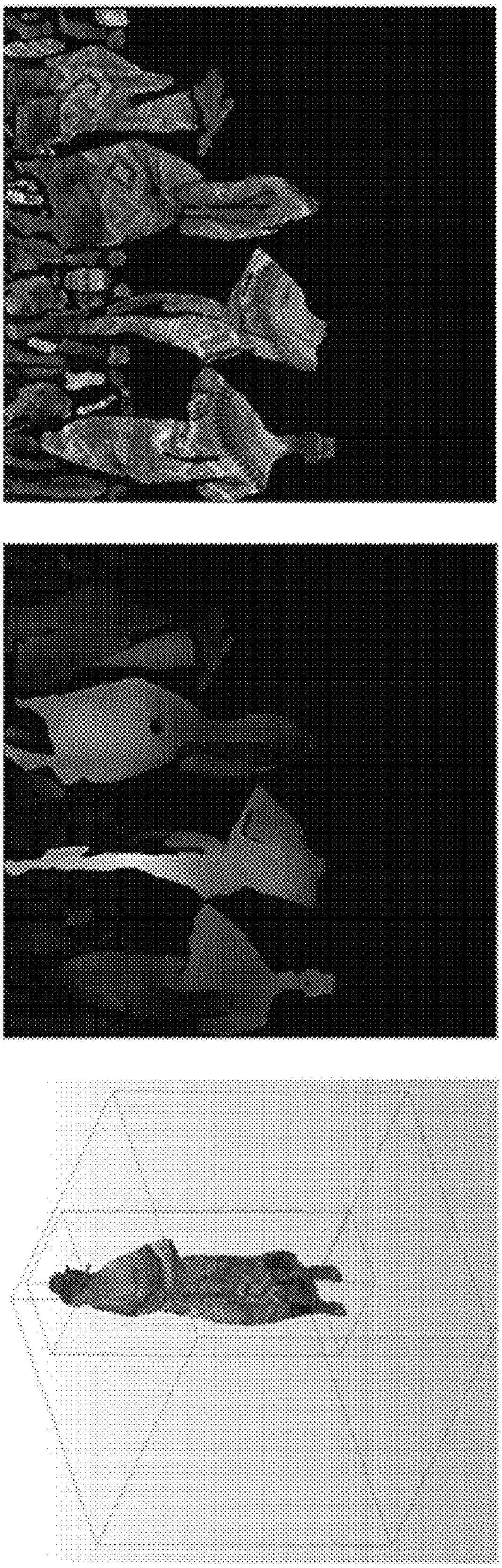
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point. An atlas is a collection of 2D bounding boxes positioned in a rectangular frame that correspond to a 3D bounding box in a 3D space in which volumetric data is rendered and information related thereto.

The atlas bitstream is a bitstream for one or more atlas frames constituting an atlas and related data.

The atlas frame is a 2D rectangular array of atlas samples onto which patches are projected.

An atlas sample is a position of a rectangular frame onto which patches associated with the atlas are projected.

An atlas frame may be partitioned into tiles. A tile is a unit in which a 2D frame is partitioned. That is, a tile is a unit for partitioning signaling information of point cloud data called an atlas.

Patch: A set of points constituting a point cloud, which indicates that points belonging to the same patch are adjacent to each other in 3D space and are mapped in the same direction among 6-face bounding box planes in the process of mapping to a 2D image.

A patch is a unit in which a tile partitioned. The patch is signaling information on the configuration of point cloud data.

The reception device according to the embodiments may restore attribute video data, geometry video data, and occupancy video data, which are actual video data having the same presentation time, based on an atlas (tile, patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
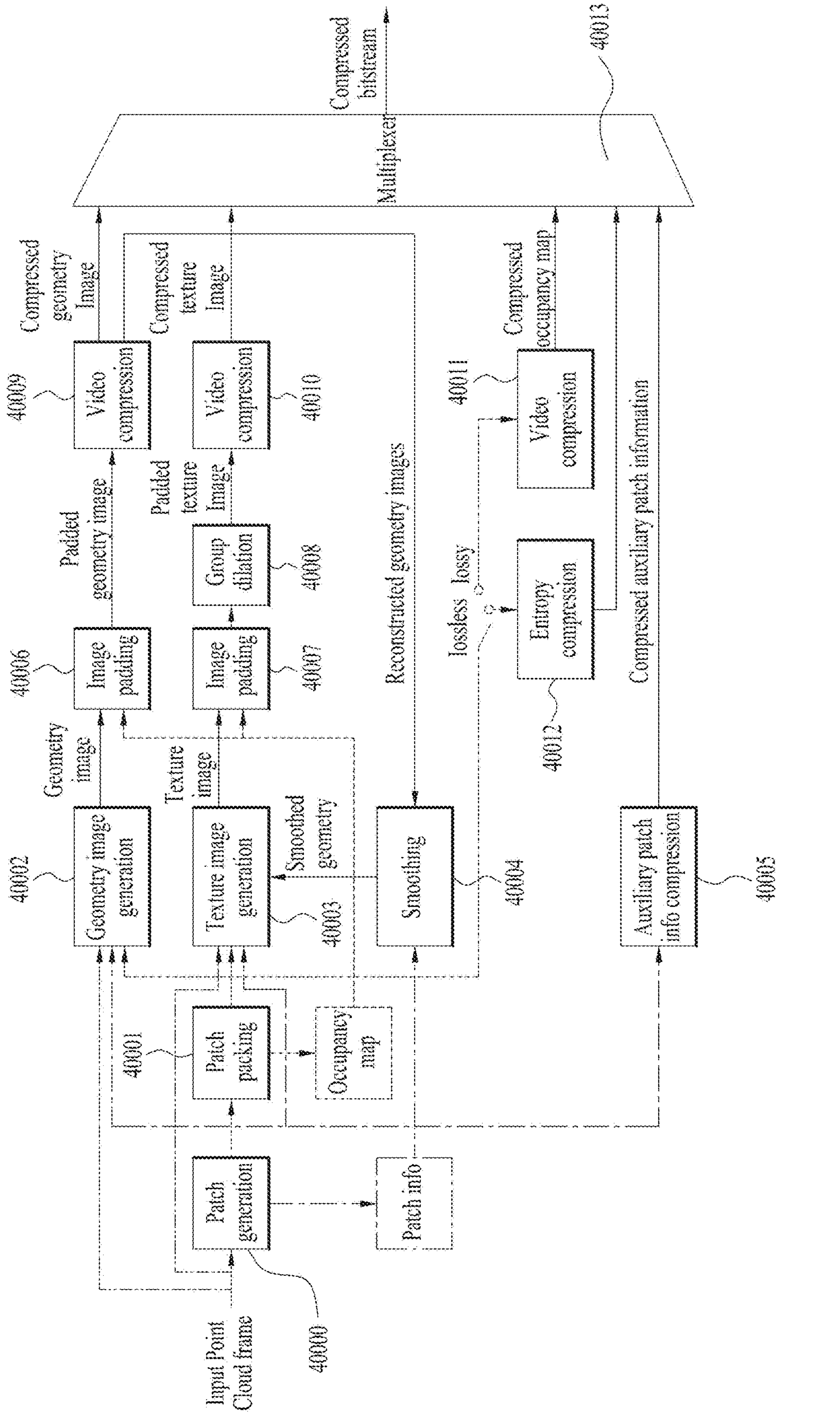
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
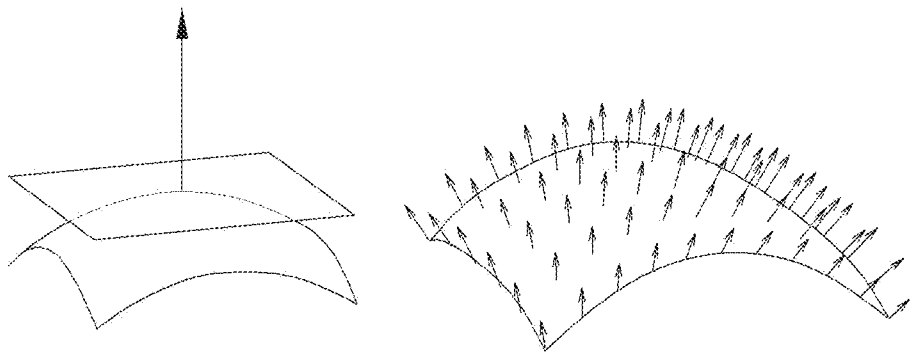
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows.

Normal Calculation Related to Patch Generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
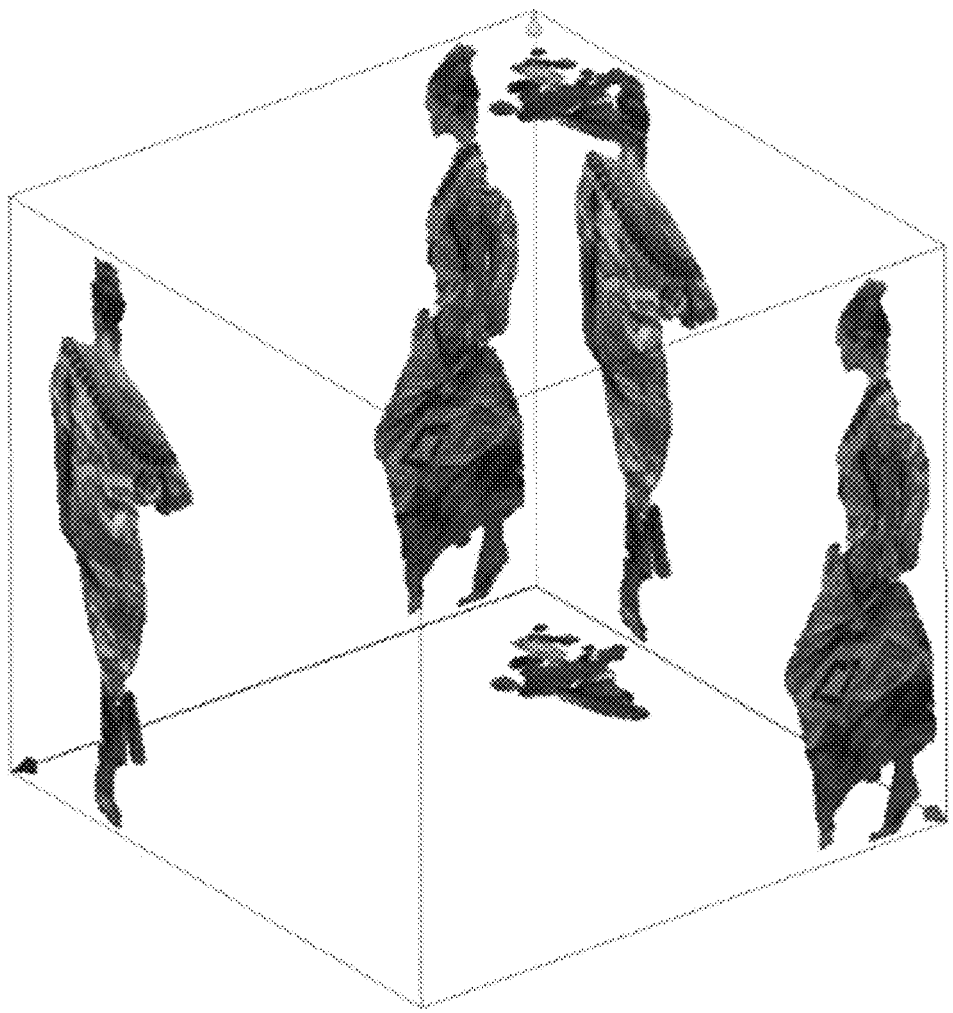
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation Related to Patch Generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}}\{\vec{n}_{pi}\cdot\vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;
2) When the neighboring points are projected onto the same plane as the current point (when they have the same cluster index), extract the current point and the neighboring points as one patch;
3) Calculate geometry values of the extracted patch. The details are described below; and
4) Repeat operations 2) to 4) until there is no unextracted point.

The occupancy map, geometry image and texture image for each patch as well as the size of each patch are determined through the patch segmentation process.

Figure 7:
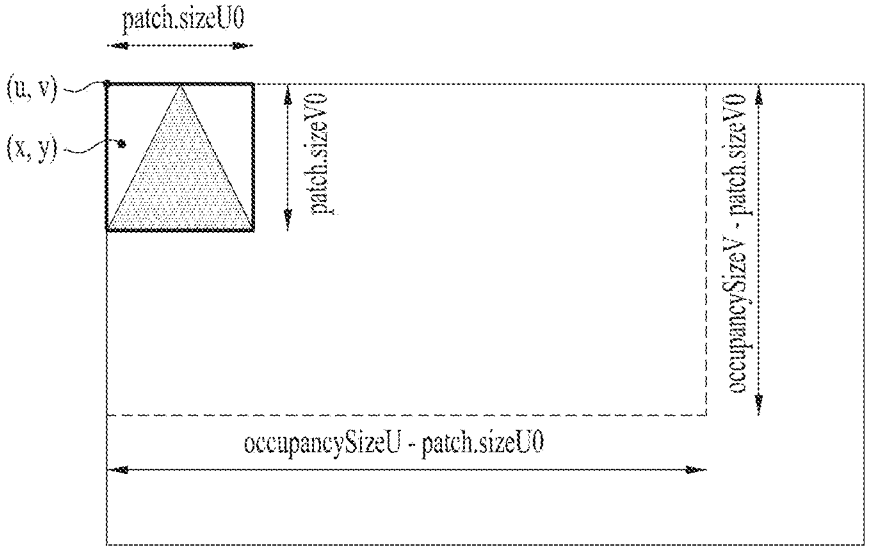
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;
2) Place a patch at a point (u, v) having a horizontal coordinate within the range of (0, occupancySizeU—patch.sizeU0) and a vertical coordinate within the range of (0, occupancySizeV—patch.sizeV0) in the occupancy map plane;
3) Set a point (x, y) having a horizontal coordinate within the range of (0, patch.sizeU0) and a vertical coordinate within the range of (0, patch.sizeV0) in the patch plane as a current point;
4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);
5) Change the position of (u, v) in raster order and repeat operations 3) to 5);
6) Determine (u, v) as the position of the patch and copy the occupancy map data about the patch onto the corresponding portion on the global occupancy map; and
7) Repeat operations 2) to 7) for the next patch.

occupancySizeU: indicates the width of the occupancy map. The unit thereof is occupancy packing block size.
occupancySizeV: indicates the height of the occupancy map. The unit thereof is occupancy packing block size.
patch.sizeU0: indicates the width of the occupancy map. The unit thereof is occupancy packing block size.
patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
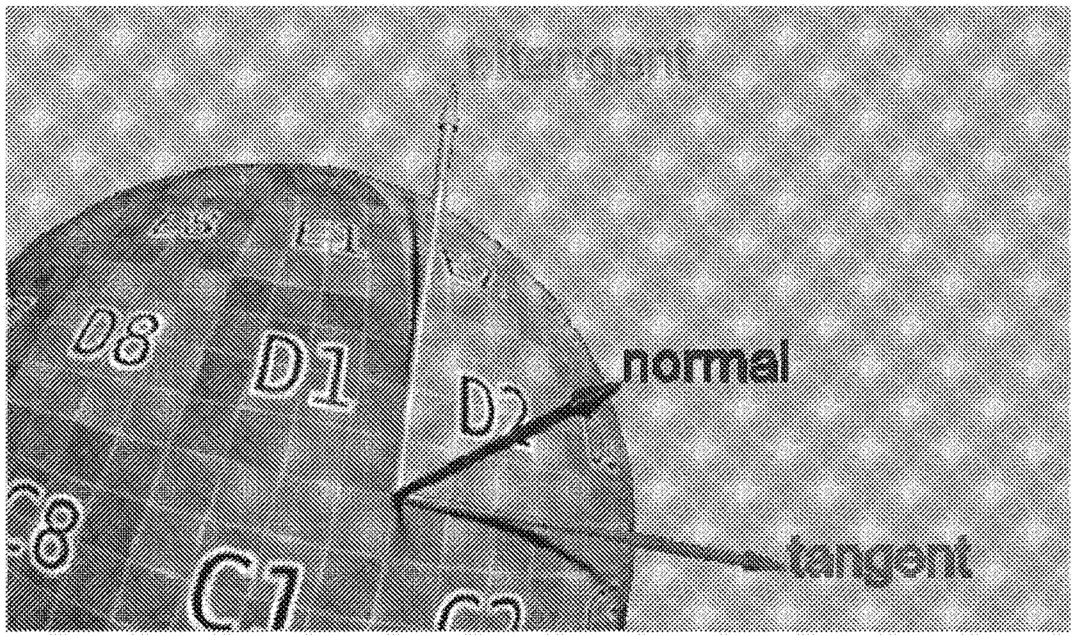
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
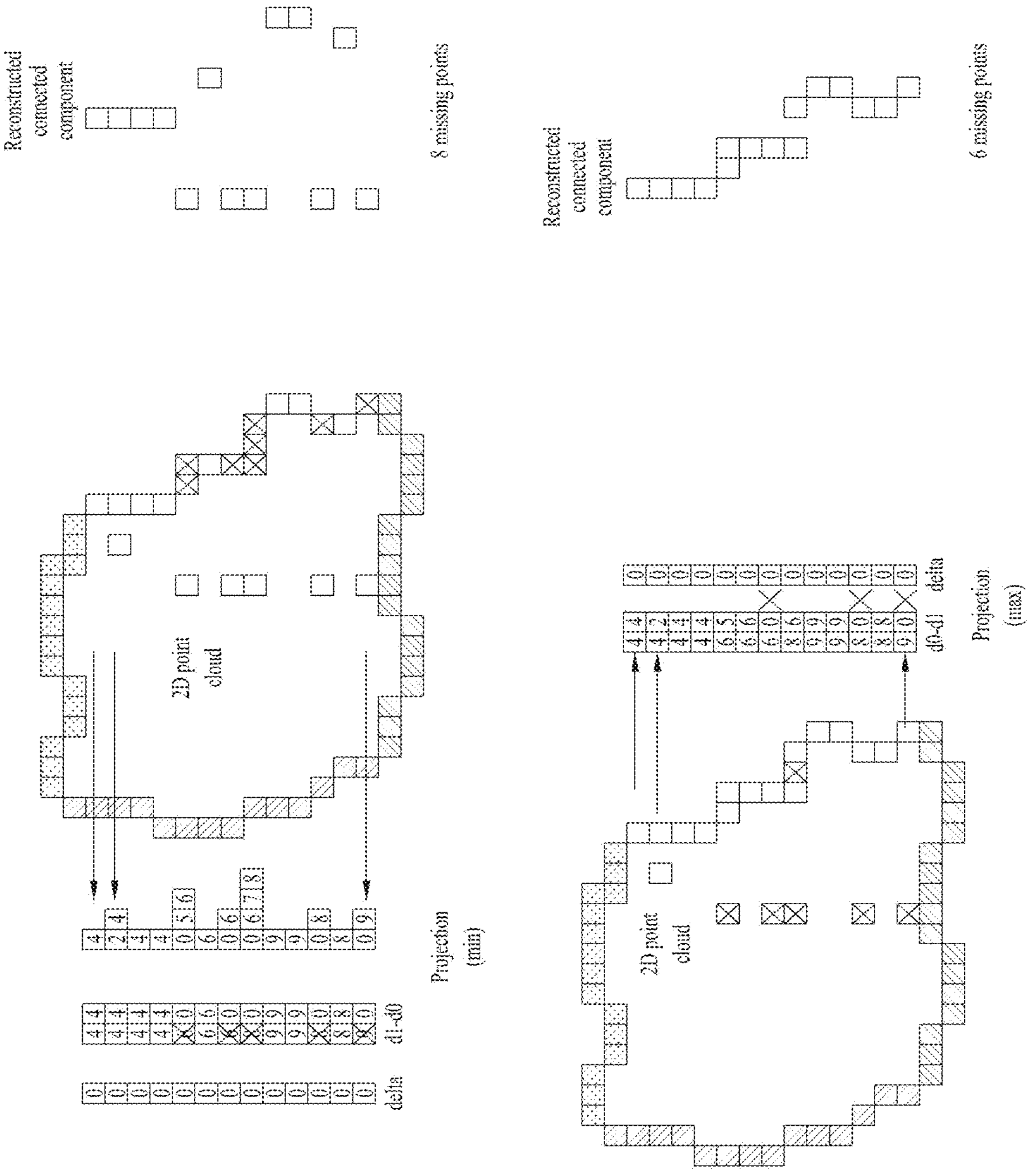
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for do, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image do is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image do.

In the encoding method using the depth values of the two layers, do and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
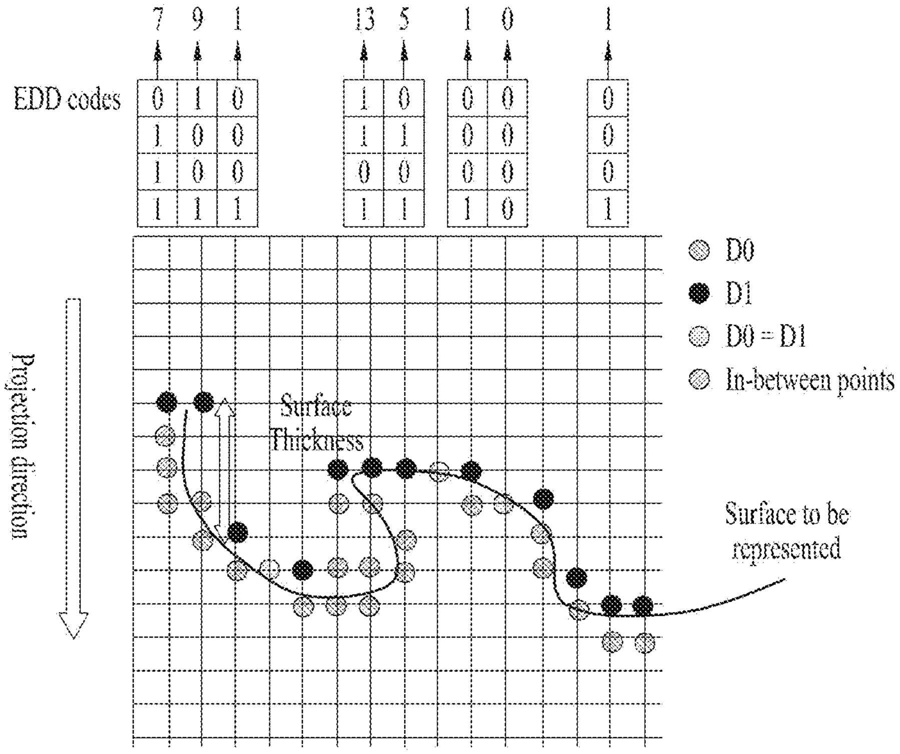
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over DO and the second and third positions are empty. When the EDD code is encoded together with DO and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;
2) Calculate neighboring points of each point constituting the reconstructed point cloud using the K-D tree or the like;
3) Determine whether each of the points is positioned on the patch boundary. For example, when there is a neighboring point having a different projection plane (cluster index) from the current point, it may be determined that the point is positioned on the patch boundary;
4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
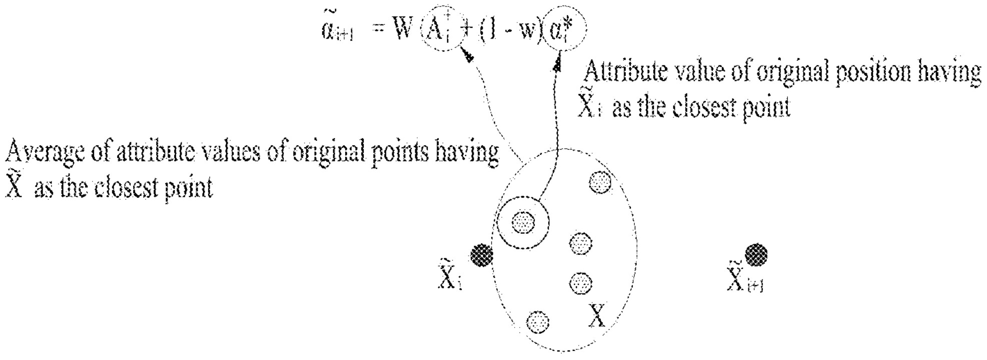
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (Cluster Index) for Identifying the Projection Plane (Normal Plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++ ) {
  if( candidatePatches[ i ].size( ) = = 1 ) {
    blockToPatch[ i ] = candidatePatches[ i ][ 0 ]
  } else {
    candidate_index
    if( candidate_index = = max_candidate_count ) {
      blockToPatch[ i ] = local_patch_index
    } else {
```

TABLE 1-1-continued

Pseudo code for mapping a block to a patch

```
      blockToPatch[ i ] =
candidatePatches[ i ][ candidate_index ]
    }
  }
}
```

Figure 12:
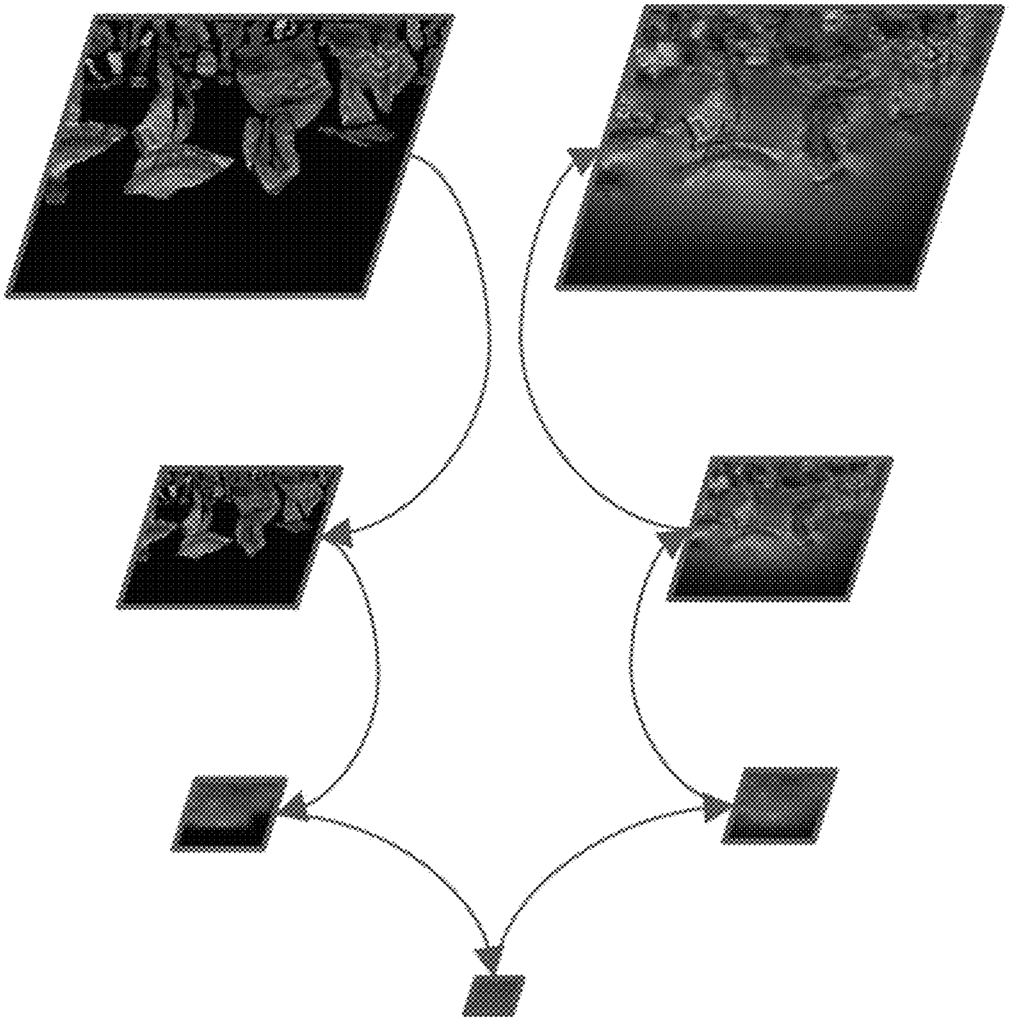
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
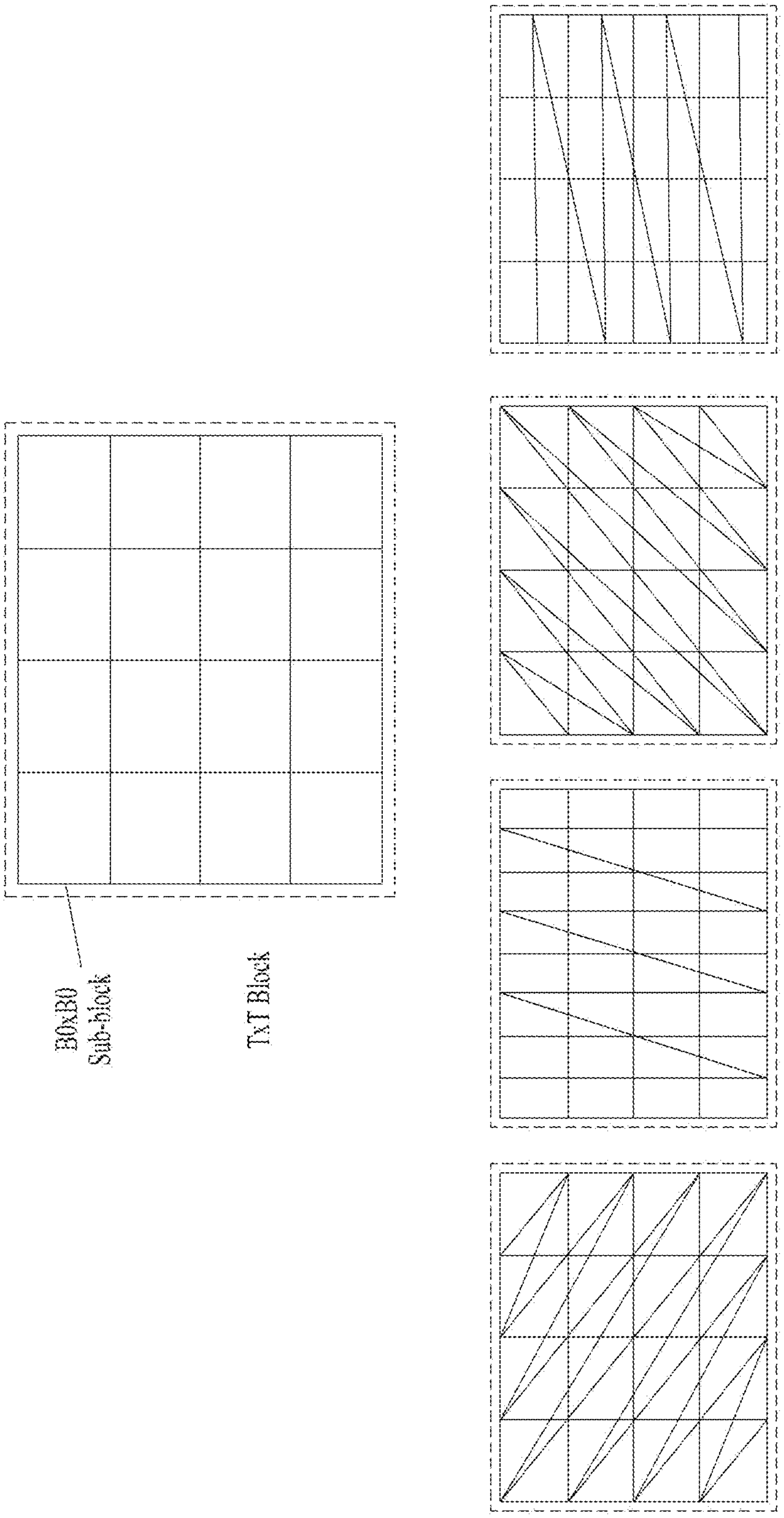
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
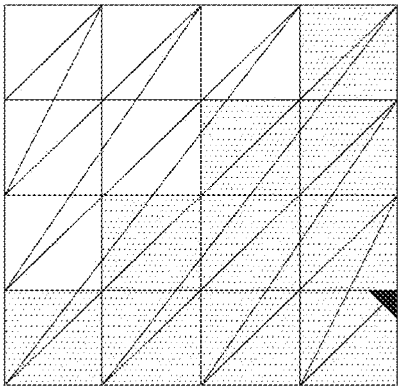
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

Figure 15:
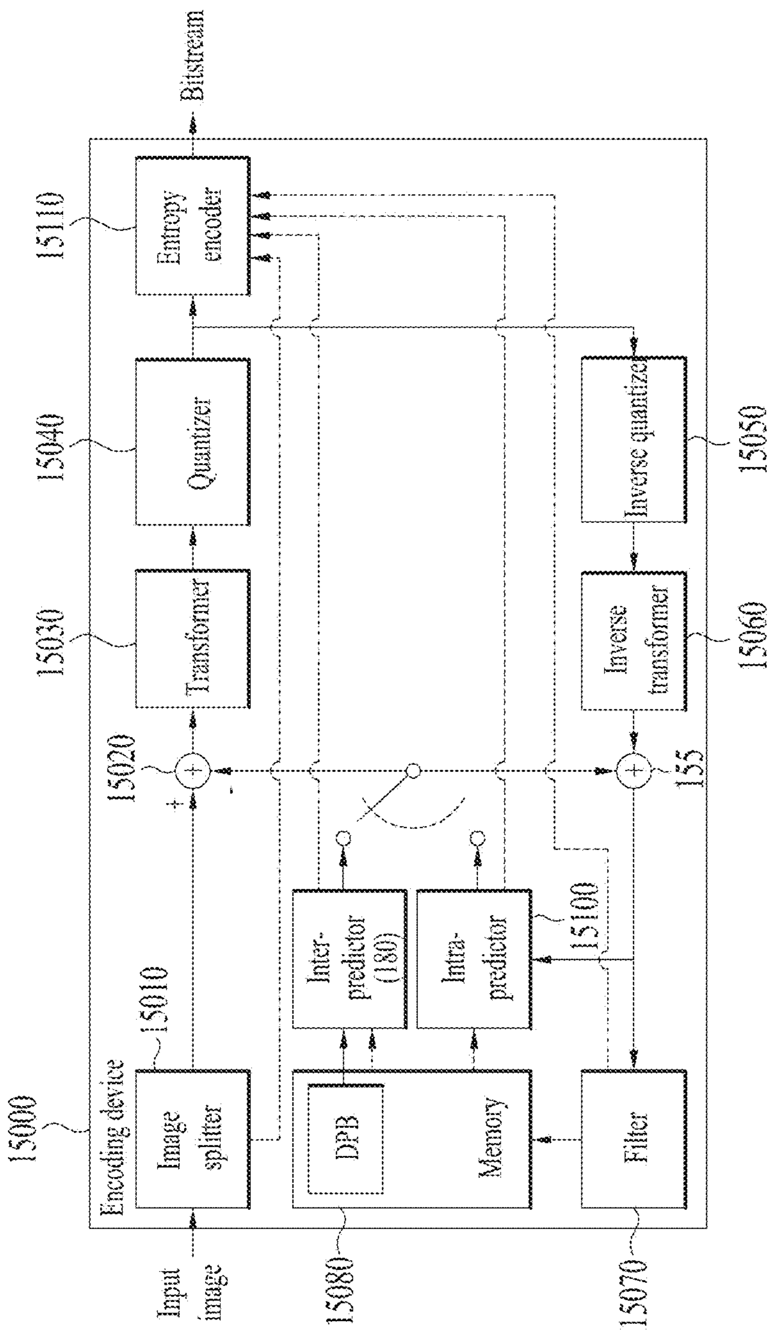
FIG. 15 illustrates an exemplary 2D video/image encoder according to embodiments.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally nonlinear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
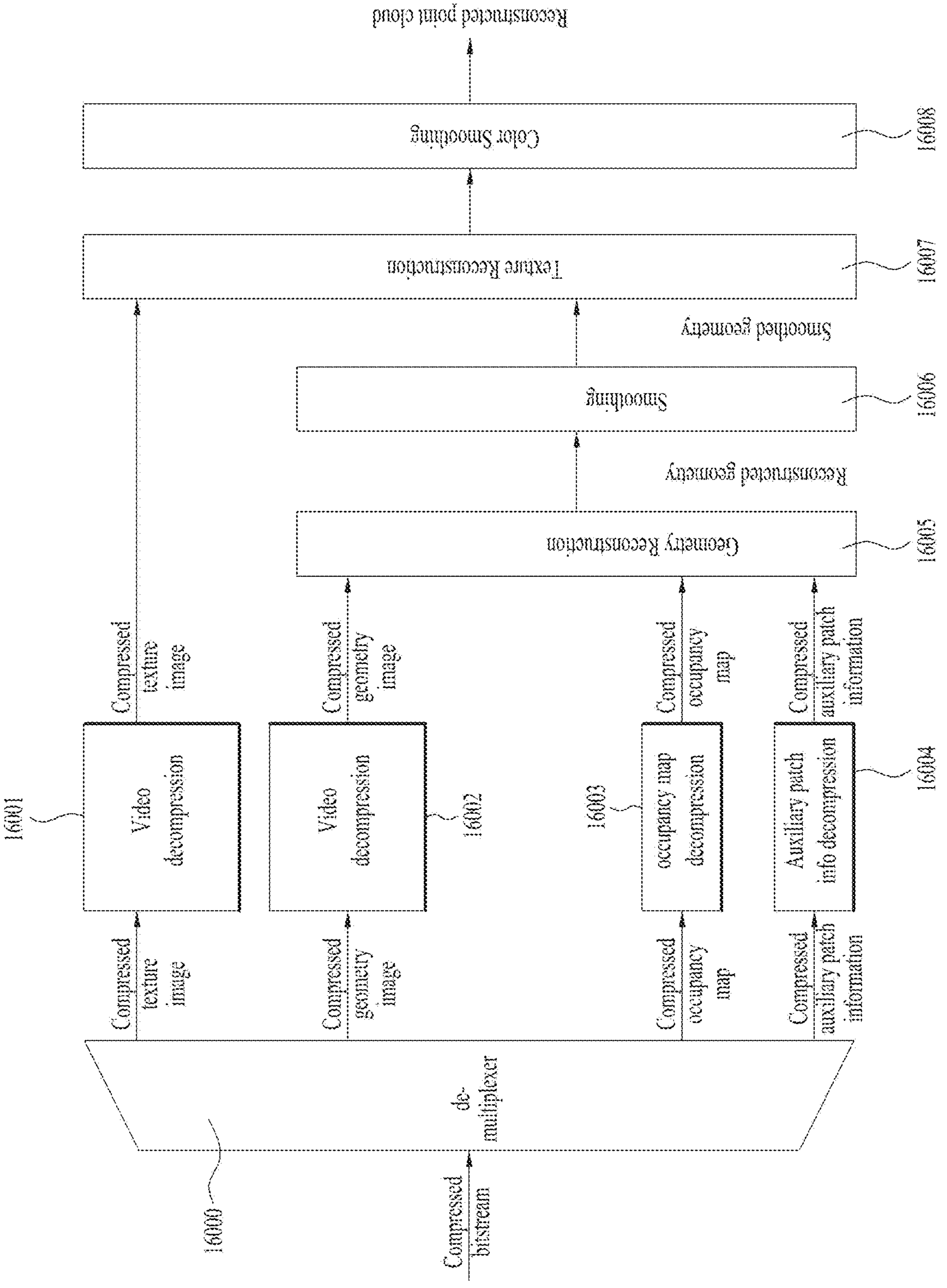
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smoothes color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
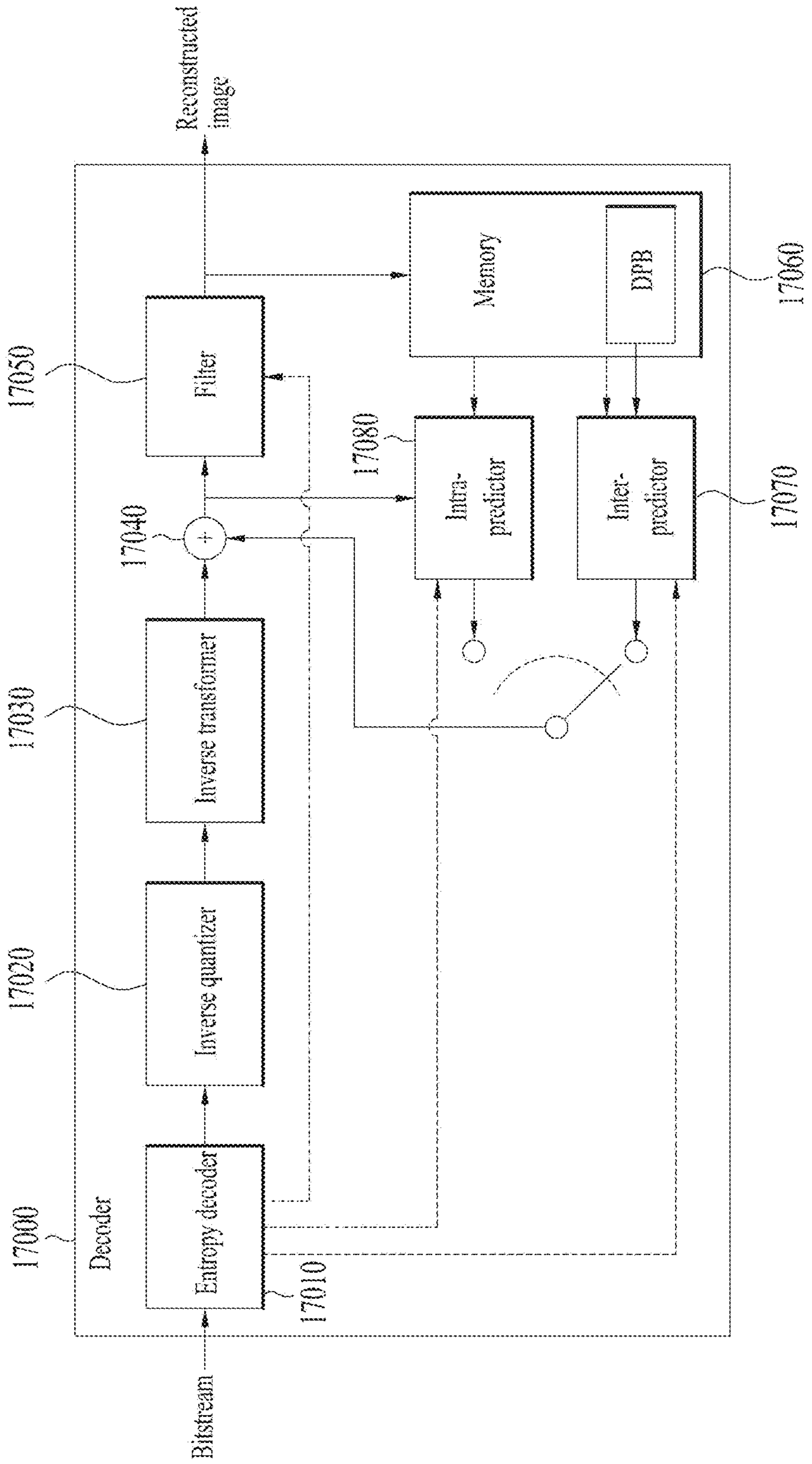
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIGS. 0.2-1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoding device 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g (u, v), and the coordinates of the position of the patch on the normal, tangent and bitangent axes of the 3D space are (□0, s0, r0), □(u, v), s(u, v), and r(u, v), which are the normal, tangent, and bitangent coordinates in the 3D space of a position mapped to point (u, v) may be expressed as follows:

$$\square(u, v) = \square 0 + g(u, v);$$

$$s(u, v) = s0 + u;$$

$$r(u, v) = r0 + v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
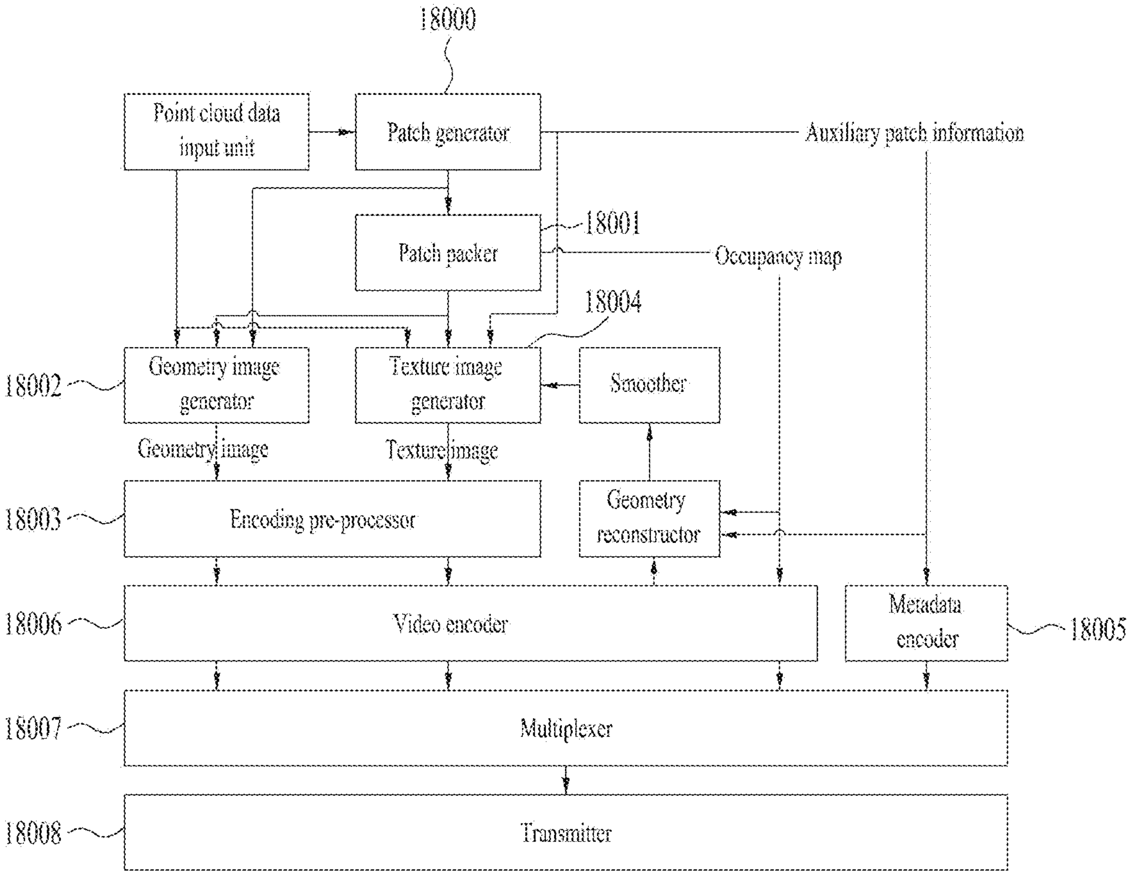
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
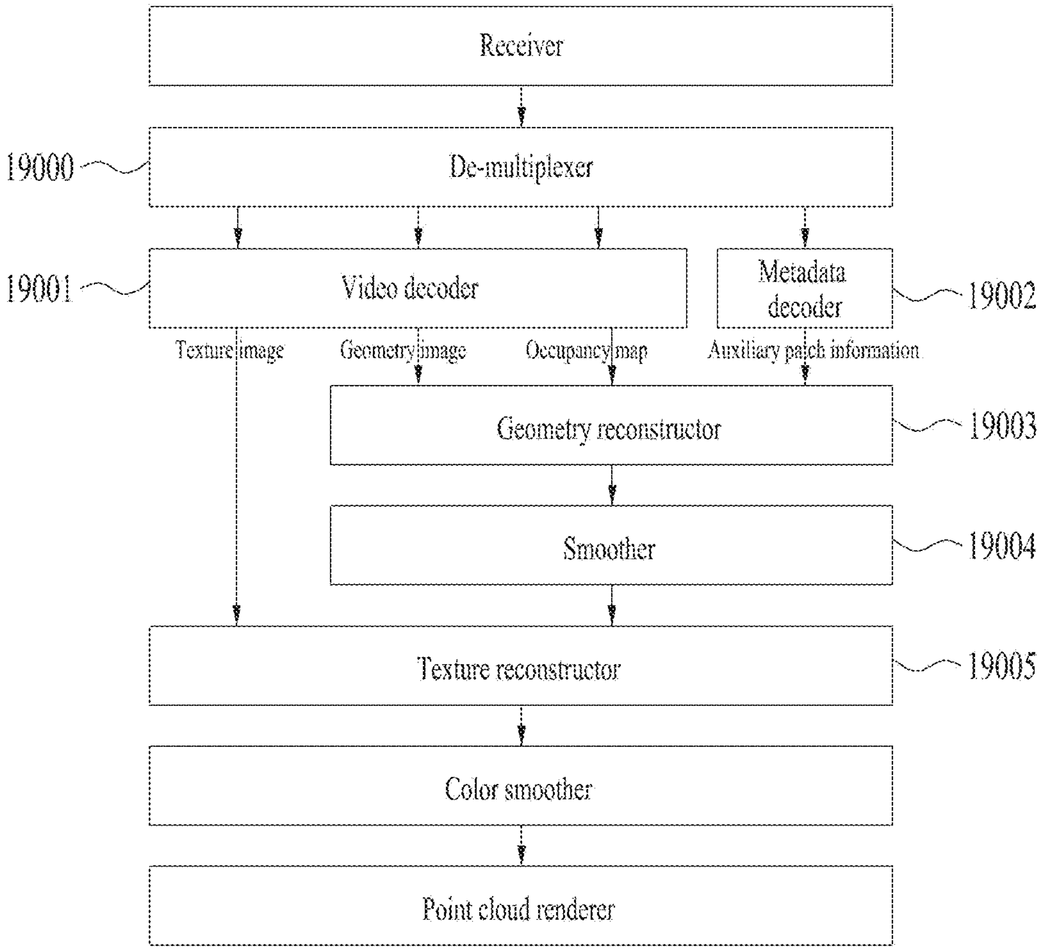
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
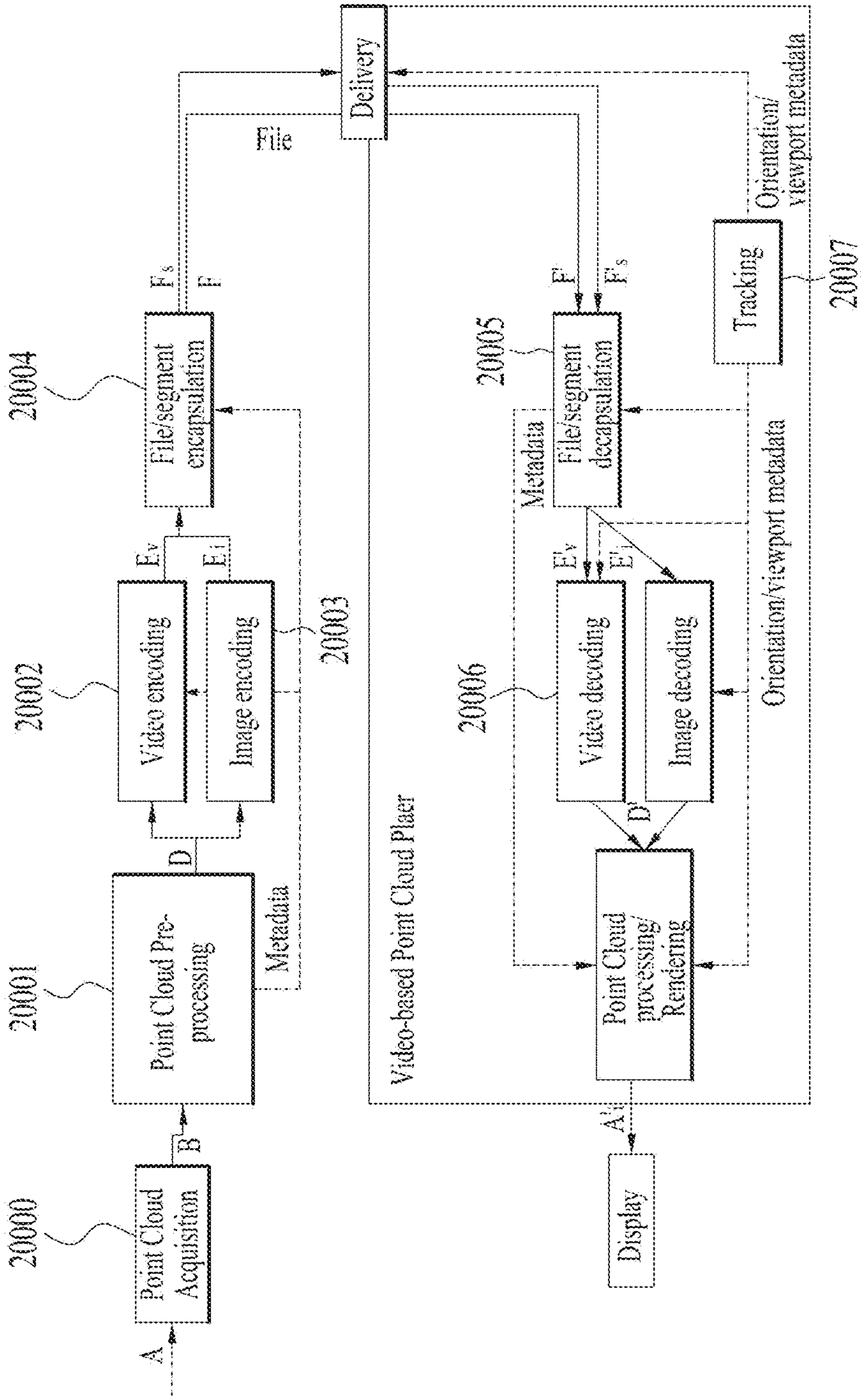
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

Figure 21:
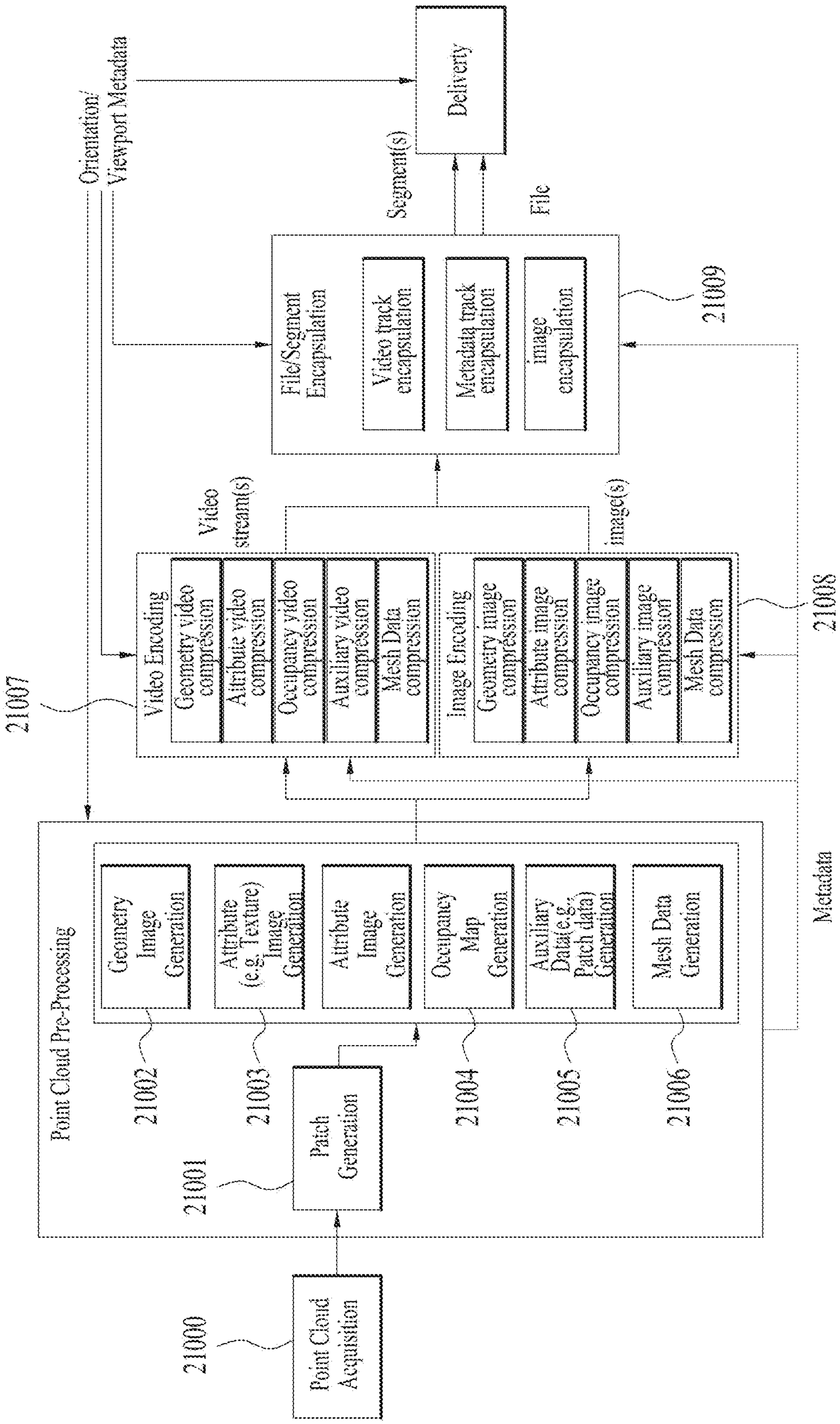
FIG. 21 is an exemplary block diagram of a device for storing and transmitting point cloud data according to embodiments.
Figure 22:
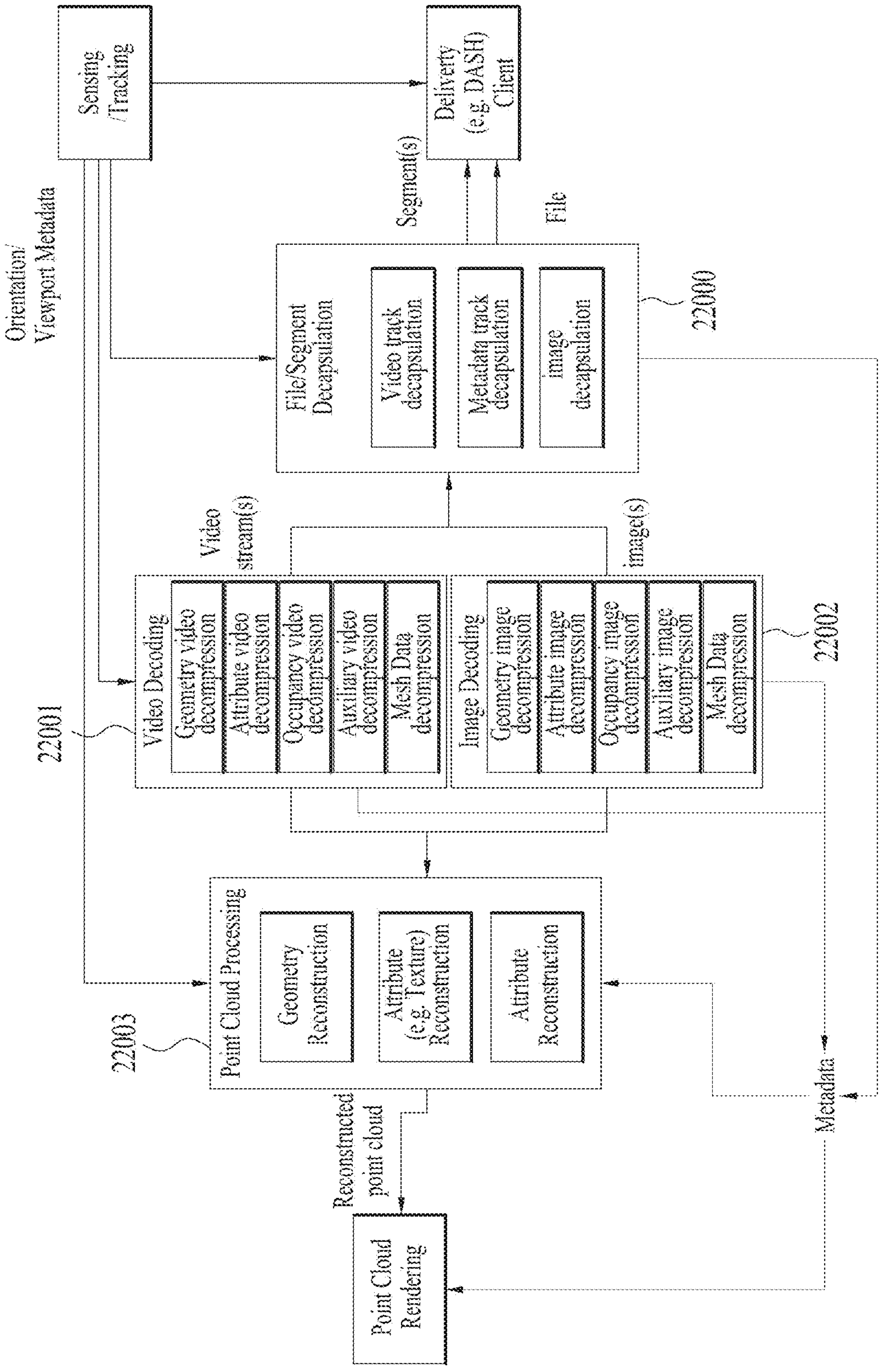
FIG. 22 is an exemplary block diagram of a point cloud data reception device according to embodiments.

FIGS. 20 to 22 are diagrams illustrating a structure in which a system is additionally connected to the transmission device and the reception device according to embodiments. The transmission device and the reception device the system according to embodiments may be referred to as a transmission/reception apparatus according to the embodiments.

In the apparatus according to the embodiments illustrated in FIGS. 20 to 22, the transmitting device corresponding to FIG. 18 or the like may generate a container suitable for a data format for transmission of a bitstream containing encoded point cloud data.

The V-PCC system according to the embodiments may create a container including point cloud data, and may further add additional data necessary for efficient transmission/reception to the container.

The reception device according to the embodiments may receive and parse the container based on the system shown in FIGS. 20 to 22. The reception device corresponding to FIG. 19 or the like may decode and restore point cloud data from the parsed bitstream.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 20002, the image encoder 20003, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/self-driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The point cloud video encoder and/or the point cloud image encoder according to the embodiments may generate a G-PCC/V-PCC bitstream according to the embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator according to the embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream containing metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator according to the embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoding and the image decoding according to the embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder according to the embodiments may decode the G-PCC/V-PCC bitstream according to the embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream containing the point cloud data may be encapsulated and/or decapsulated in the form of a file and/or a segment.

For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004 of FIG. 20, the file/segment encapsulator 21009 of FIG. 21, and the file/segment encapsulator 22000 of FIG. 22.

Figure 23:
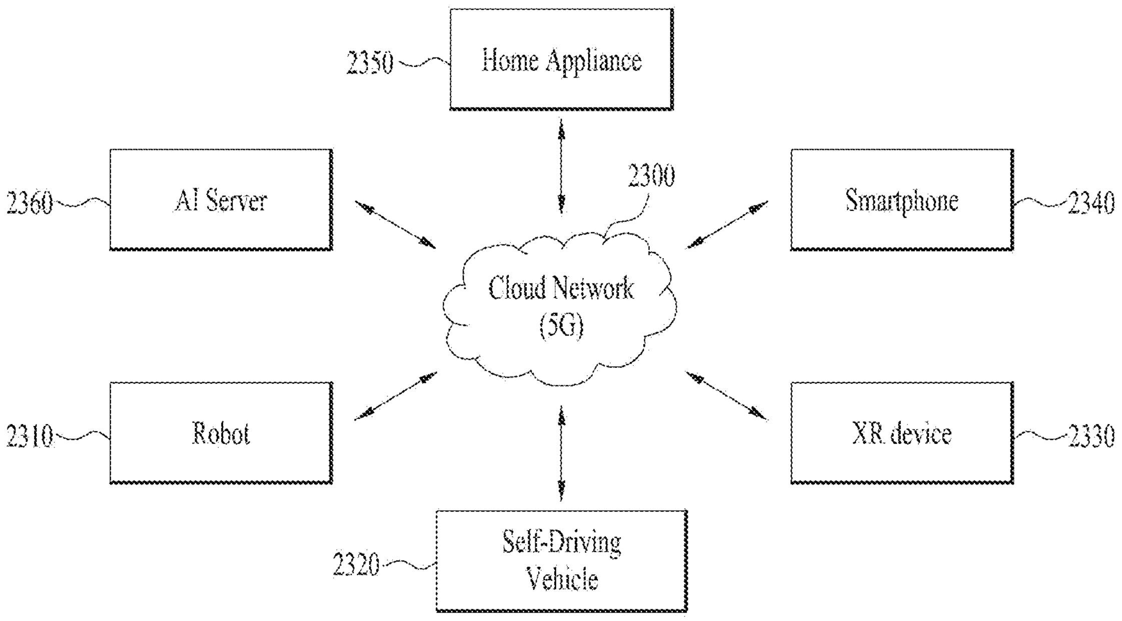
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR>

The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+XR+Mobile phone>

The XR/PCC device 2330 may be implemented as a mobile phone 2340 by applying PCC technology.

The mobile phone 2340 may decode and display point cloud content based on the PCC technology.

<PCC+Self-driving+XR>

The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

A point cloud data transmission method/device according to embodiments, an encoding operation and encoder of the transmission method/device according to embodiments, encapsulation and an encapsulator of the point cloud data transmission method/device, a point cloud data reception method/device, a decoding operation and decoder of the point cloud data reception method/device according to embodiments, decapsulation and a decapsulator of the point cloud data receiving method/device according to embodiments may be referred to simply as a method/device according to embodiments.

Figure 24:
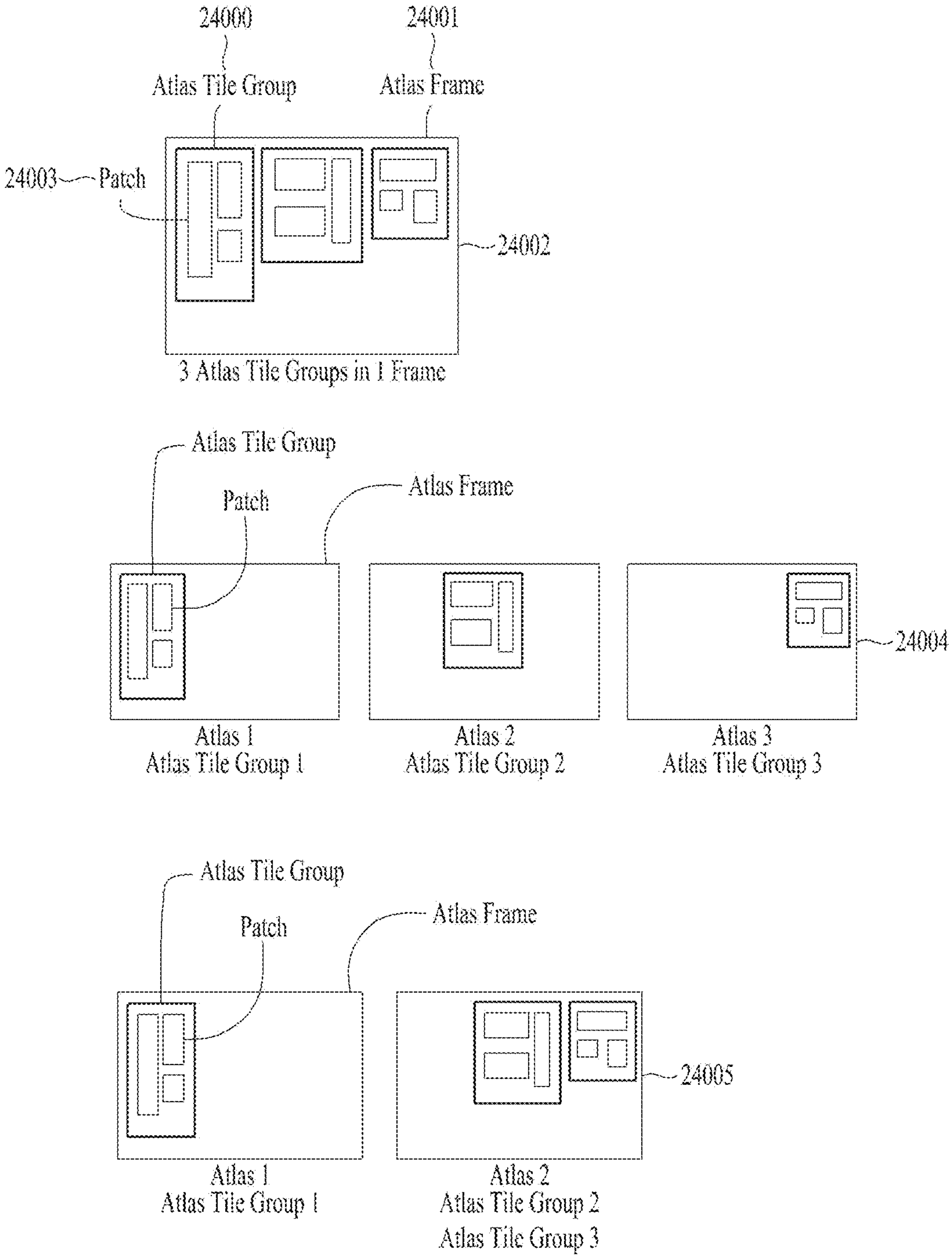

FIG. 24 shows a patch, an atlas, an atlas tile group, an atlas frame, and the like.

A method/device according to embodiments (e.g., FIGS. 1, 4, 15 to 23, etc.) may generate, transmit, and receive multiple V-PCC tracks for multiple atlas data. In addition, a file format definition for a method of configuring one or more V-PCC tracks for a V-PCC bitstream containing multiple atlas data or an atlas sub-bitstream, and a method for signaling and receiving the same may be provided.

The method/device according to the embodiments (e.g., FIGS. 1, 4, 15 to 23, etc.) is a transmitter (encoder) or a receiver (decoder) for provision of a point cloud content service that efficiently stores a V-PCC bitstream in tracks of a file and provides signaling for the same.

The method/device according to the embodiments (e.g., FIGS. 1, 4, 15 to 23, etc.) is related to a transmitter or receiver for provision of a point cloud content service that processes a file storage technique to support efficient access to a V-PCC bitstream stored in a file.

The method/device according to the embodiments (e.g., FIGS. 1, 4, 15 to 23, etc.) supports efficient storage of a V-PCC bitstream in a file track, signaling for the same, and efficient access to the stored V-PCC bitstream. In addition, the V-PCC bitstream may be divided and stored into one or more tracks in a file by adding (or additionally modifying/combining) a file storage technique therefor.

Definitions of terms according to embodiments are as follows. VPS: V-PCC parameter set; AD: atlas data; OVD: occupancy video data; GVD: geometry video data; AVD: attribute video data; ACL: atlas coding layer; AAPS: atlas adaptation parameter set; ASPS: atlas sequence parameter set; a syntax structure containing syntax elements that apply to zero or more entire coded atlas sequences (CASs) as determined by the content of a syntax element found in the ASPS referred to by a syntax element found in each tile group header; AFPS: atlas frame atlas frame parameter set; a syntax structure containing syntax elements that apply to zero or more entire coded atlas frames as determined by the content of a syntax element found in the tile group header0; SEI: supplemental enhancement information; Atlas: this may be a collection of 2D bounding boxes, i.e. patches, projected into a rectangular frame that correspond to a 3-dimensional bounding box in 3D space, which may represent a subset of a point cloud, or collection of 2D bounding boxes and their associated information placed onto a rectangular frame and corresponding to a volume in 3D space on which volumetric data is rendered; Atlas sub-bitstream: an extracted sub-bitstream from the V-PCC bitstream containing a part of an atlas NAL bitstream; V-PCC content: a point cloud encoded using video-coded point cloud compression (V-PCC); V-PCC track: a volumetric visual track which carries the atlas bitstream of the V-PCC bitstream; V-PCC component track: video track which carries 2D video encoded data for any of the occupancy map, geometry, or attribute component video bitstreams of the V-PCC bitstream.

The V-PCC bitstream for a point cloud object, which is a target of point cloud data, may be composed of one or more atlas data.

Figure 26:
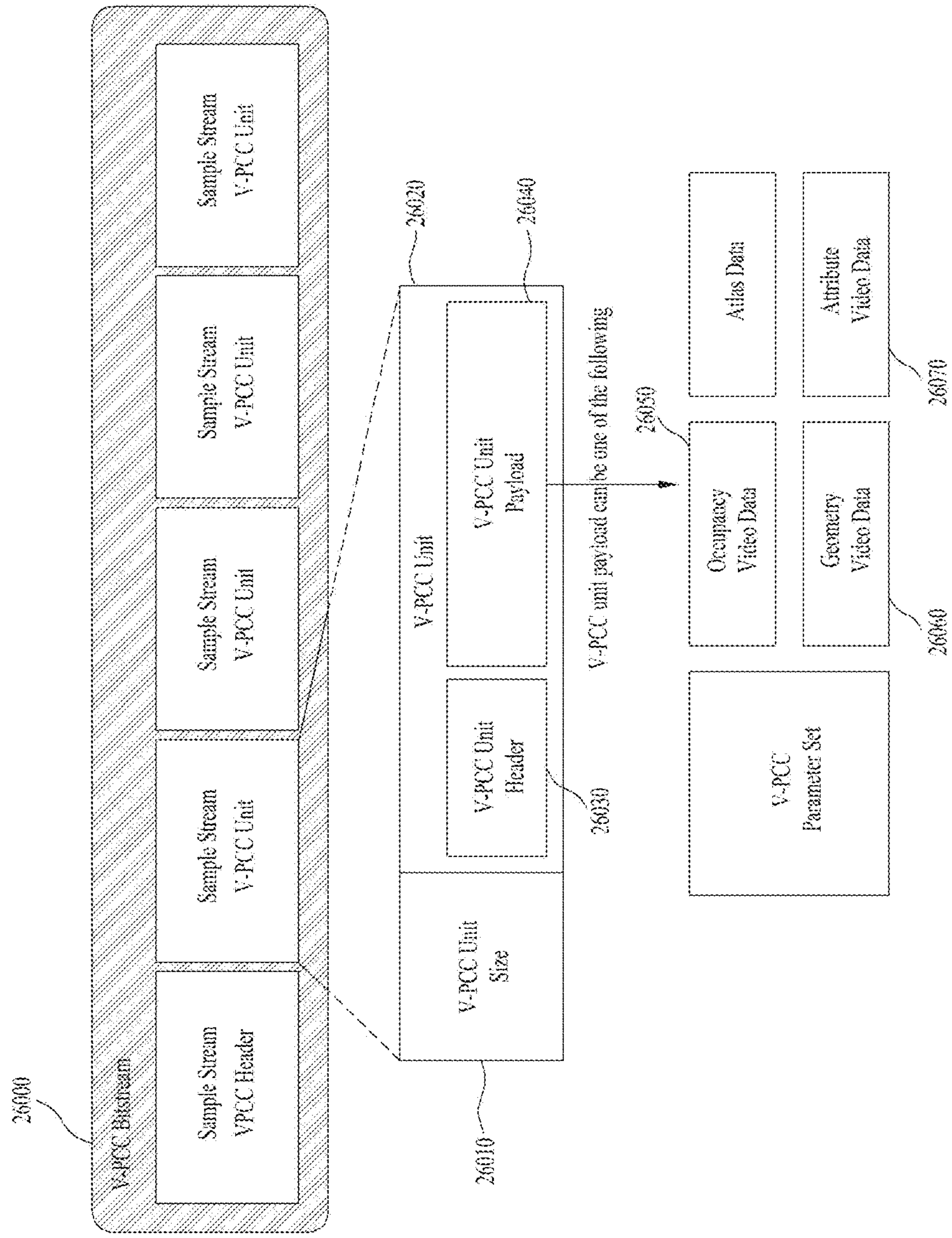
FIG. 26 shows a structure of a bitstream containing point cloud data according to embodiments.

Each atlas data may have vuh_atlas_id of the vpcc_unit_header( ) of FIGS. 26 and 27. The atlas data and vuh_atlas_id may be mapped to each other. The device according to the embodiments may acquire atlas data through vuh_atlas_id.

Each of the atlas data may have an association with one or more atlas tile groups 24000 or atlas tile groups that may constitute an atlas frame 24001.

An atlas tile may be an atlas bitstream corresponding to the tile. A collection of patches 24003 may be an atlas tile group, and a collection of atlas tile groups may be an atlas frame.

Referring to FIG. 24, the method/device according to embodiments may configure V-PCC content composed of multiple atlas sub-bitstreams in multiple V-PCC tracks.

In general, three atlas tile groups may be configured in one atlas frame such as an atlas frame 24002.

Reference numerals 24004 and 24005 according to embodiments represent cases where multiple atlas data are configured. 24004 is a case where one atlas data incudes one atlas tile group. 24005 is a case where one atlas data includes one or more atlas tile groups.

The method/device according to the embodiments may process a single atlas and/or multiple atlases, and may provide a data storage method and a signaling method for a single atlas and/or multiple atlases.

In the case of the single atlas 24002, a frame of point cloud data acquired from a point cloud object may include one atlas. For example, the frame may include an atlas tile group or an atlas frame.

In the case of the multiple atlases 24004 and 24005, a frame of point cloud data acquired from a point cloud object may include one atlas. For example, each of three atlases may include three atlas tile groups. One atlas may include an atlas frame, and the atlas frame may include an atlas tile group. Also, one of the two atlases may include one atlas tile group, and the other atlas may include two atlas tile groups. One atlas frame may include an atlas tile group.

According to embodiments, the atlas frame may correspond to an atlas, and the atlas may be partitioned into tiles. A patch may be a 2D bounding box on which a point cloud object is projected, and one or more patches may be referred to as an atlas tile group. The atlas may be information related to a 2D bounding box and the 2D bounding box.

Figure 25:
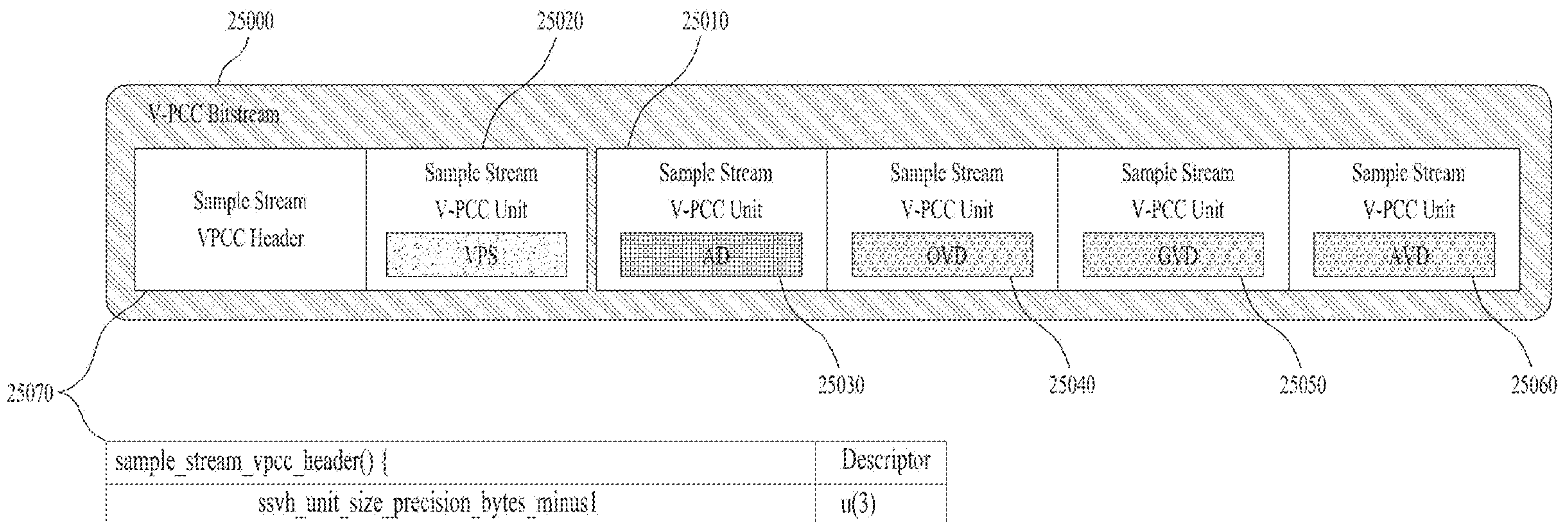
FIG. 25 shows a structure of a bitstream containing point cloud data according to embodiments.

FIG. 25 shows a structure of a bitstream containing point cloud data according to embodiments.

FIG. 25 is a structure of a bitstream containing point cloud data according to embodiments to be encoded or decoded, as illustrated in FIGS. 15 to 23.

The method/device according to the embodiments generates a bitstream for a dynamic point cloud object. In this regard, a file format for the bitstream is proposed, and a signaling scheme therefor is provided.

The method/device according to the embodiments includes a transmitter, a receiver, and/or a processor for providing a point cloud content service of efficiently storing a V-PCC (=V3C) bitstream in a track of a file and providing signaling therefor.

The method/device according to the embodiments provides a data format for storing a V-PCC bitstream containing point cloud data. Accordingly, the reception method/device according to the embodiments provides a data storage and signaling method for receiving point cloud data and efficiently accessing the point cloud data. Therefore, based on the storage technique for a file containing point cloud data for efficient access, the transmitter and/or the receiver may provide a point cloud content service.

FIG. 25 shows a structure of a point cloud bitstream contained in data transmitted and received by the methods/devices according to the embodiments.

A method of compressing and decompressing point cloud data according to embodiments represent volumetric encoding and decoding of point cloud visual information.

A point cloud bitstream (which may be referred to as a V-PCC bitstream or V3C bitstream) 25000 containing a coded point cloud sequence (CPCS) may include sample stream V-PCC units 25010. The sample stream V-PCC units 25010 may carry V-PCC parameter set (VPS) data 25020, an atlas bitstream 25030, a 2D video encoded occupancy map bitstream 25040, a 2D video encoded geometry bitstream 25050, and zero or one or more 2D video encoded attribute bitstreams 25060.

The point cloud bitstream 25000 may include a sample stream VPCC header 25070.

ssvh_unit_size_precision_bytes_minus1: A value obtained by adding 1 to this value specifies the precision, in bytes, of the ssvu_vpcc_unit_size element in all sample stream V-PCC units. ssvh_unit_size_precision_bytes_minus1 may be in the range of 0 to 7.

The syntax 26080 of the sample stream V-PCC unit 26010 is configured as follows. Each sample stream V-PCC unit may include a type of one of V-PCC units of VPS, AD, OVD, GVD, and AVD. The content of each sample stream V-PCC unit may be associated with the same access unit as the V-PCC unit included in the sample stream V-PCC unit.

ssvu_vpcc_unit_size: specifies the size, in bytes, of the subsequent vpcc_unit. The number of bits used to represent ssvu_vpcc_unit_size is equal to (ssvh_unit_size_precision_bytes_minus1+1)*8.

Figure 70:
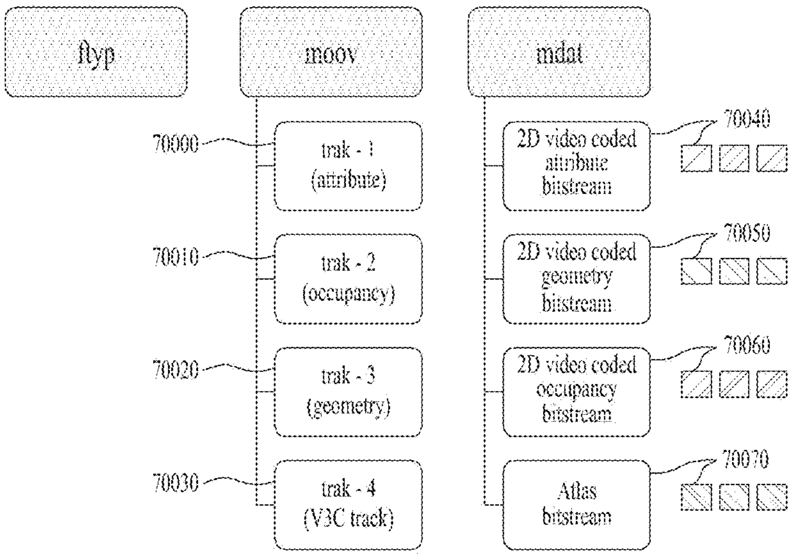
FIG. 70 shows an encapsulated V-PCC data container structure according to embodiments.
Figure 71:
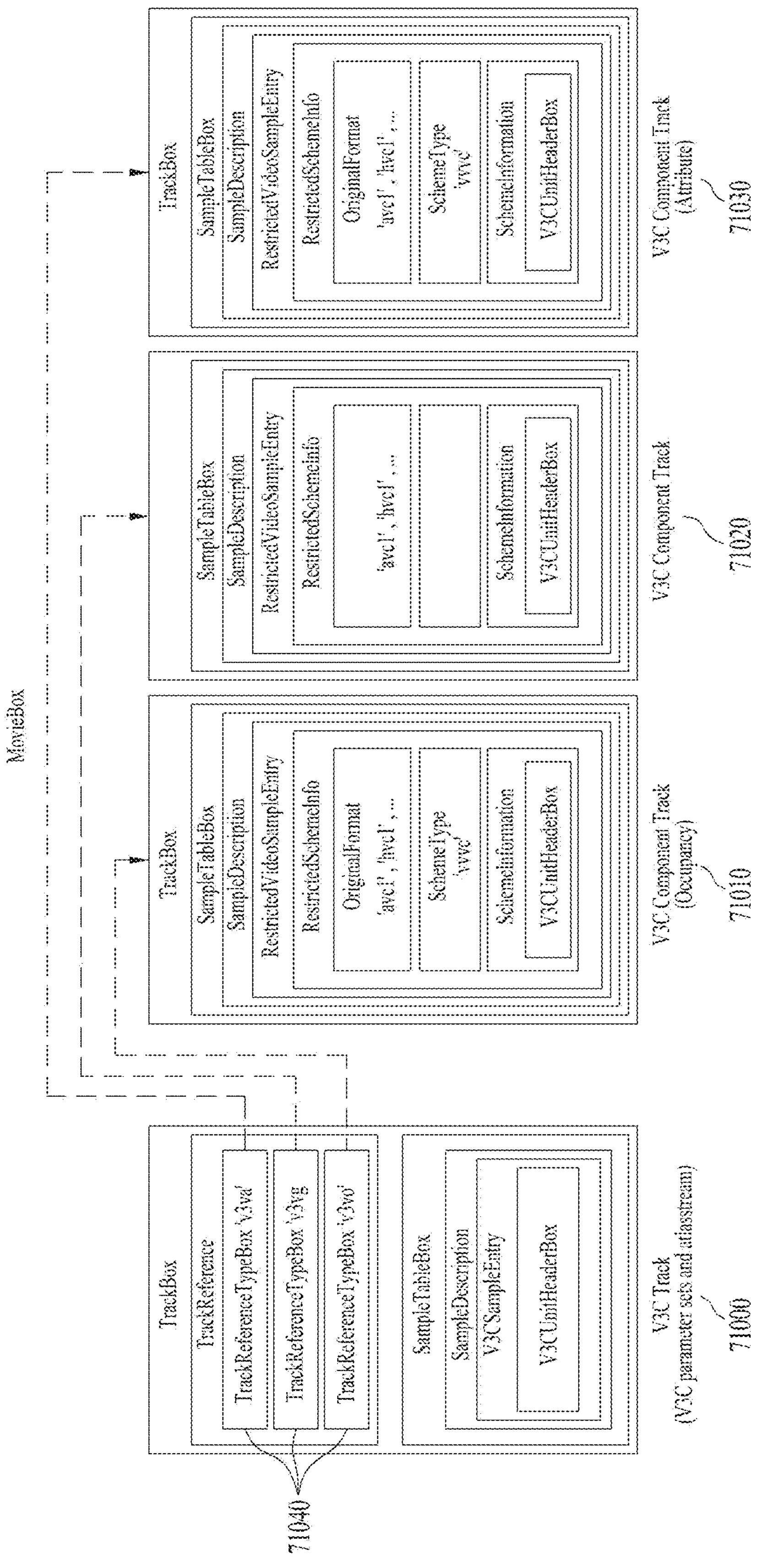
FIG. 71 shows a structure of a file according to embodiments.
Figure 72:
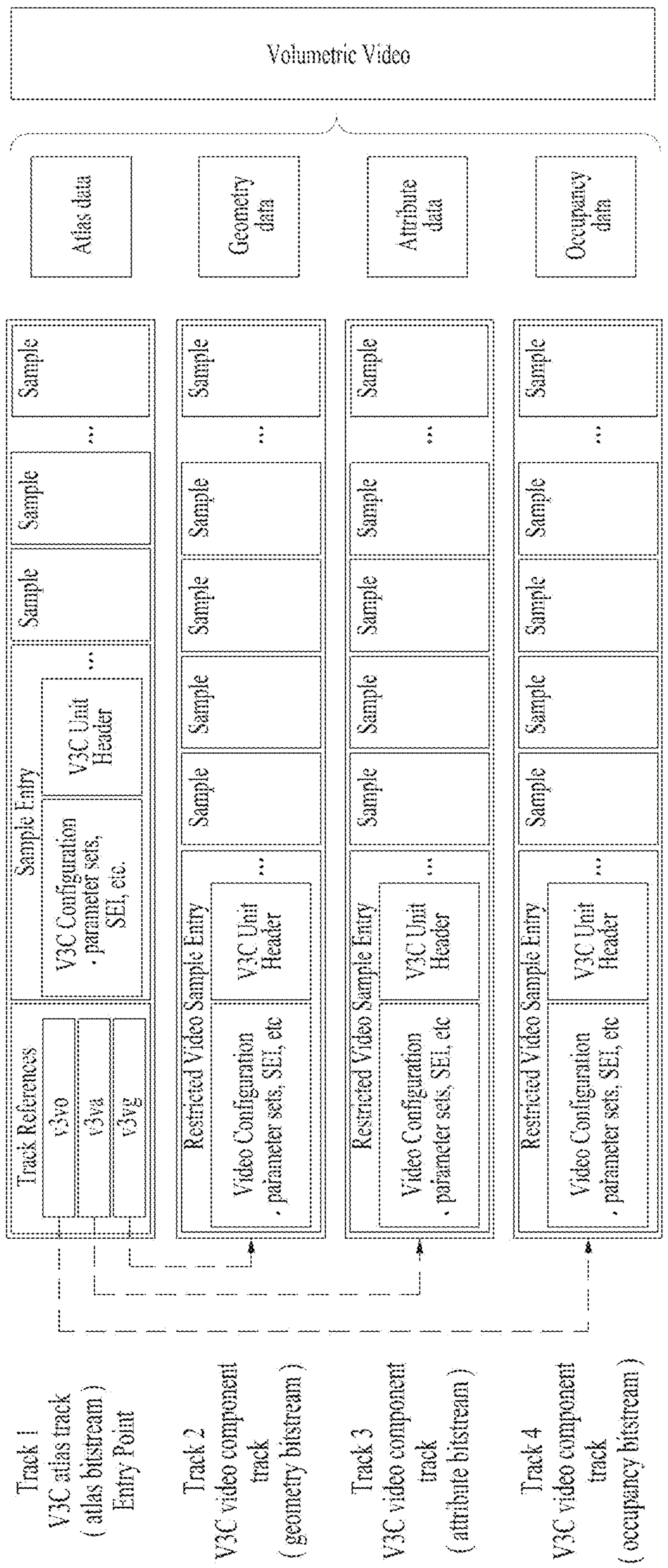
FIG. 72 shows tracks according to the embodiments.

The method/device according to the embodiments receives the bitstream of FIG. 25 containing the encoded point cloud data, and generates a file as shown in FIGS. 70 to 72 through the encapsulator 20004 or 21009.

The method/device according to the embodiments receives a file as shown in FIGS. 70 to 72 and decodes point cloud data through the decapsulator 22000 or the like.

The VPS 25020 and/or the AD 25030 may be encapsulated in track-4 (V3C track 70030). The OVD 25040 may be encapsulated in track-2 (occupancy track 70010). The GVD 25050 may be encapsulated in track-3 (geometry track 70020). The AVD 25060 may be encapsulated in track-1 (attribute track 70000).

FIG. 26 shows a structure of a bitstream containing point cloud data according to embodiments.

A bitstream 26000 of FIG. 26 corresponds to the bitstream 25000 of FIG. 25. The bitstream of FIGS. 25 and 26 is generated by the transmission device 10000 of FIG. 1, the point cloud video encoder 10002 of FIG. 1, the encoder of FIG. 4, the encoder of FIG. 15, the transmission device of FIG. 18, the processor 20001 of FIG. 20, and the video/image encoder 20002 of FIG. 20, the processors 21001 to 21006 of FIG. 21, the video/image encoders 21007 and 21008, and the like.

A V-PCC bitstream according to embodiments may contain a series of V-PCC sequences.

A V-PCC bitstream contains a series of V-PCC sequences. A vpcc unit type with a value of vuh_unit_type equal to VPCC_VPS may be expected to be the first V-PCC unit type in a V-PCC sequence. All other V-PCC unit types follow this unit type without any additional restrictions in their coding order. A V-PCC unit payload of a V-PCC unit carrying occupancy video, attribute video, or geometry video is composed of one or more NAL units.

A VPCC unit may include a header and a payload.

The VPCC unit header may include the following information based on the VUH unit type.

vuh_unit_type indicates the type of the V-PCC unit 26020 as follows.

| vuh_unit_type | Identifier | V-PCC Unit Type | Description |
|---|---|---|---|
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

The bitstream of FIGS. 25 and 26 is stored in a container (the file in FIGS. 70 to 72) by the file/segment encapsulator of FIG. 1, the file/segment encapsulator 20004 of FIG. 20, the file/segment encapsulator 21009 of FIG. 21, or the like.

The bitstream of FIGS. 25 and 26 is transmitted by the transmitter 10004 of FIG. 1 or the like.

The container (file in FIGS. 70 to 72) including the bitstream of FIGS. 25 and 26 is received by the reception device 10005, the receiver 10006, or the like in FIG. 1.

The bitstream of FIGS. 25 and 26 is parsed from the container by the file/segment decapsulator 10007 of FIG. 1, the file/segment decapsulator 20005 of FIG. 20, the file/segment decapsulator 22000 of FIG. 22, or the like.

The bitstream of FIGS. 25 and 26 is decoded and reconstructed and provided to the user by the point cloud video decoder 10008 of FIG. 1, the decoder of FIG. 16, the decoder of FIG. 17, the reception device of FIG. 19, the video/image decoder 20006 of FIG. 20, the video/image decoders 22001 and 22002 of FIG. 22, the processor 22003 of FIG. 22, or the like.

The sample stream V-PCC unit contained in the bitstream 26000 related to point cloud data according to the embodiments may include a V-PCC unit size 26010 and a V-PCC unit 26020.

Each V-PCC unit 26020 may include a V-PCC unit header 26030 and a V-PCC unit payload 26040. The V-PCC unit header 26030 may describe a V-PCC unit type. The V-PCC unit header of attribute video data may describe an attribute type, an index thereof, multiple instances of the same attribute type supported, and the like.

The unit payloads 26050, 26060, and 26070 of occupancy, geometry and attribute video data may correspond to video data units. For example, the occupancy video data, geometry video data, and attribute video data 26050, 26060, and 26070 may be HEVC NAL units. Such video data may be decoded by a video decoder according to embodiments.

FIG. 27 shows a V-PCC unit and a V-PCC unit header according to embodiments.

FIG. 27 shows the syntaxes of the V-PCC unit 26020 and the V-PCC unit header 26030 illustrated in FIG. 26.

When vuh_unit_type indicates attribute video data (VPCC_AVD), geometry video data (VPCC_GVD), occupancy video data (VPCC_OVD), or atlas data (VPCC_AD), vuh_vpcc_parameter_set ID and vuh_atlas_id is carried in the unit header. A parameter set ID and an atlas ID associated with the V-PCC unit may be delivered.

When the unit type is atlas video data, the header of the unit may carry an attribute index (vuh_attribute_index), an attribute partition index (vuh_attribute_partition_index), a map index (vuh_map_index), and an auxiliary video flag (vuh_auxiliary_video_flag).

When the unit type is geometry video data, vuh_map_index and vuh_auxiliary_video_flag may be carried.

When the unit type is occupancy video data or atlas data, the header of the unit may contain additional reserved bits.

vuh_vpcc_parameter_set_id specifies the value of vps_vpcc_parameter_set_id for the active V-PCC VPS. Through the vpcc_parameter_set_id in the header of the current V-PCC unit, the ID of the VPS parameter set may be known and the relationship between the V-PCC unit and the V-PCC parameter set may be announced.

vuh_atlas_id specifies the index of the atlas that corresponds to the current V-PCC unit. Through the vuh_atlas_id in the header of the current V-PCC unit, the index of the atlas may be known, and the atlas corresponding to the V-PCC unit may be announced.

vuh_attribute_index indicates the index of the attribute data carried in the Attribute Video Data unit.

vuh_attribute_partition_index indicates the index of the attribute dimension group carried in the Attribute Video Data unit.

vuh_map_index indicates, when present, the map index of the current geometry or attribute stream.

vuh_auxiliary_video_flag equal to 1 indicates that the associated geometry or attribute video data unit is a RAW and/or EOM coded points video only. vuh_auxiliary_video_flag equal to 0 indicates that the associated geometry or attribute video data unit may contain RAW and/or EOM coded points.

FIG. 28 shows the payload of a V-PCC unit according to embodiments.

FIG. 28 shows the syntax of the V-PCC unit payload 26040.

When vuh_unit_type is V-PCC parameter set (VPCC_VPS), the V-PCC unit payload contains vpcc_parameter_set( ).

When vuh_unit_type is V-PCC atlas data (VPCC_AD), the V-PCC unit payload contains atlas_sub_bitstream( ).

When vuh_unit_type is V-PCC accumulating video data (VPCC_OVD), geometric video data (VPCC_GVD), or attribute video data (VPCC_AVD), the V-PCC unit payload contains video_sub_bitstream( ).

Hereinafter, information contained in the payload of the V-PCC unit will be described. FIG. 29 shows a V-PCC parameter set according to embodiments.

FIG. 29 shows the syntax of a parameter set when the payload 26040 of the unit 26020 of the bitstream according to the embodiments contains the parameter set as shown in FIG. 28.

The VPS of FIG. 29 may include the following elements.

profile_tier_level( ) specifies restrictions on the bitstreams and hence limits on the capabilities needed to decode the bitstreams. Profiles, tiers, and levels may also be used to indicate interoperability points between individual decoder implementations.

vps_vpcc_parameter_set_id may provide an identifier for the V-PCC VPS for reference by other syntax elements.

vps_atlas_count_minus1 plus 1 indicates the total number of supported atlases in the current bitstream.

Depending on the number of atlases, the following parameters may be further included in the parameter set.

vps_frame_width[j] indicates the V-PCC frame width in terms of integer luma samples for the atlas with index j. This frame width is the nominal width that is associated with all V-PCC components for the atlas with index j.

vps_frame_height[j] indicates the V-PCC frame height in terms of integer luma samples for the atlas with index j. This frame height is the nominal height that is associated with all V-PCC components for the atlas with index j.

vps_map_count_minus1[j] plus 1 indicates the number of maps used for encoding the geometry and attribute data for the atlas with index j.

When vps_map_count_minus1[j] is greater than 0, the following parameters may be further included in the parameter set.

Depending on the value of vps_map_count_minus1[j], the following parameters may be further included in the parameter set.

vps_multiple_map_streams_present_flag[j] equal to 0 indicates that all geometry or attribute maps for the atlas with index j are placed in a single geometry or attribute video stream, respectively. vps_multiple_map_streams_present_flag[j] equal to 1 indicates that all geometry or attribute maps for the atlas with index j are placed in separate video streams.

If vps_multiple_map_streams_present_flag[j] indicates 1, vps_map_absolute_coding_enabled_flag[j][i] may be further included in the parameter set. Otherwise, vps_map_absolute_coding_enabled_flag[j][i] may have a value of 1.

vps_map_absolute_coding_enabled_flag[j][i] equal to 1 indicates that the geometry map with index i for the atlas with index j is coded without any form of map prediction. vps_map_absolute_coding_enabled_flag[j][i] equal to 0 indicates that the geometry map with index i for the atlas with index j is first predicted from another, earlier coded map, prior to coding.

vps_map_absolute_coding_enabled_flag[j][0] equal to 1 indicates that the geometry map with index 0 is coded without map prediction.

If vps_map_absolute_coding_enabled_flag[j][i] is 0 and i is greater than 0, vps_map_predictor_index_diff[j][i] may be further included in the parameter set. Otherwise, vps_map_predictor_index_diff[j][i] may be 0.

vps_map_predictor_index_diff[j][i] is used to compute the predictor of the geometry map with index i for the atlas with index j when vps_map_absolute_coding_enabled_flag[j][i] is equal to 0.

vps_auxiliary_video_present_flag[j] equal to 1 indicates that auxiliary information for the atlas with index j, i.e. RAW or EOM patch data, may be stored in a separate video stream, referred to as the auxiliary video stream. vps_auxiliary_video_present_flag[j] equal to 0 indicates that auxiliary information for the atlas with index j is not be stored in a separate video stream.

occupancy_information( ) includes occupancy video related information.

geometry_information( ) includes geometry video related information.

attribute_information( ) includes attribute video related information.

vps_extension_present_flag equal to 1 specifies that the syntax element vps_extension_length is present in vpcc_parameter_set syntax structure.

vps_extension_present_flag equal to 0 specifies that syntax element vps_extension_length is not present.

vps_extension_length_minus1 plus 1 specifies the number of vps_extension_data_byte elements that follow this syntax element.

Depending on vps_extension_length_minus1, extension data may be further included in the parameter set.

vps_extension_data_byte may have any value that may be included through extension.

Figure 30:
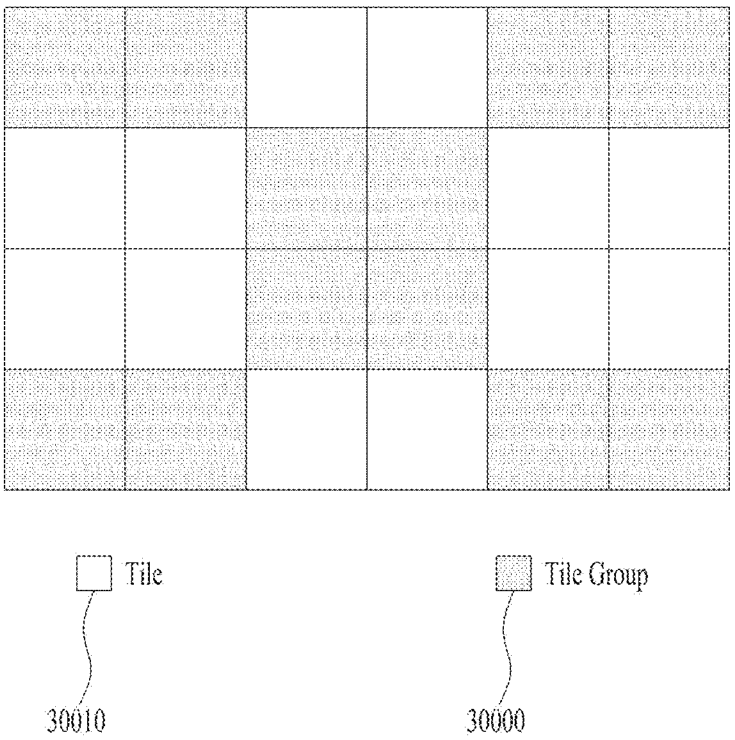
FIG. 30 shows an atlas frame according to embodiments.

FIG. 30 shows an atlas frame according to embodiments.

FIG. 30 shows an atlas frame including tiles encoded by the encoder 10002 of FIG. 1, the encoder of FIG. 4, the encoder of FIG. 15, the transmission device of FIG. 18, the system of FIGS. 20 and 21, and the like. The figure shows an atlas frame including tiles decoded by the decoder 10008 of FIG. 1, the decoder of FIGS. 16 and 17, the reception device of FIG. 19, the system of FIG. 23, and the like.

An atlas frame is divided into one or more tile rows and one or more tile columns. A tile is a rectangular region of an atlas frame. A tile group contains a plurality of tiles of an atlas frame. A tile and a tile group may not be distinguished from each other, and a tile group may correspond to one tile. Only rectangular tile groups are supported. In this mode, a tile group (or tile) may contain a plurality of tiles of an atlas frame that collectively form a rectangular region of the atlas frame. FIG. 30 shows an example tile group (or tile) partitioning of an atlas frame according to embodiments, where the atlas frame is divided into 24 tiles (6 tile columns and 4 tile rows) and 9 rectangular tile groups. A tile group may be used as a term corresponding to a tile without distinction between a tile group and a tile according to embodiments.

That is, according to embodiments, the tile group 49000 may correspond to a tile 30010 and may be referred to as the tile 30010. In addition, the tile 30010 may correspond to a tile partition and may be referred to as a tile partition. The terms signaling information may also be changed to and referred.

Figure 31:
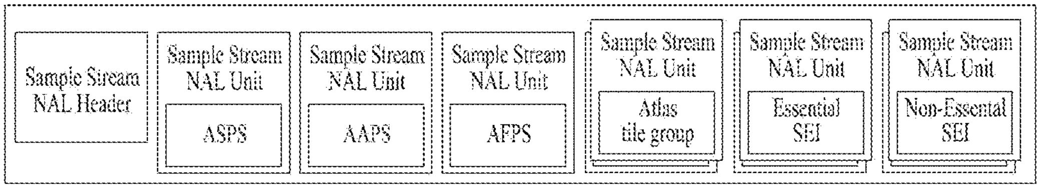
FIG. 31 shows a structure of an atlas bitstream according to embodiments.

FIG. 31 shows the structure of an atlas bitstream according to embodiments.

FIG. 31 shows an example in which the payload 26040 of the unit 26020 of the bitstream 26000 in FIG. 26 carries an atlas bitstream.

According to embodiments, the term "sub-" may be interpreted as meaning a part. According to embodiments, a sub-bitstream may be interpreted as a bitstream.

According to embodiments, an atlas bitstream may contain a sample stream NAL header and a sample stream NAL unit.

Each sample stream NAL unit according to the embodiments may include an atlas sequence parameter set (ASPS) (see FIG. 34), an atlas adaptation parameter set (AAPS) (see FIG. 37), an atlas frame parameter set (AFPS) (see FIG. 35), one or more atlas tile groups, one or more essential SEIs, and one or more non-essential SEIs.

Referring to FIG. 31, the V-PCC unit payload of a V-PCC unit carrying an atlas sub-bitstream may be composed of one or more sample stream NAL units.

Hereinafter, syntax of information contained in the atlas bitstream of FIG. 31 will be described.

FIG. 32 shows a sample stream NAL unit, a sample stream NAL unit header, a NAL unit, and a NAL unit header included in a bitstream containing point cloud data according to embodiments.

FIG. 32 shows the syntax of data contained in the atlas bitstream of FIG. 31;

ssnh_unit_size_precision_bytes_minus1 plus 1 specifies the precision, in bytes, of the ssnu_nal_unit_size element in all sample stream NAL units. ssnh_unit_size_precision_bytes_minus1 may be in the range of 0 to 7.

ssnu_nal_unit_size specifies the size, in bytes, of the subsequent NAL_unit. The number of bits used to represent ssnu_nal_unit_size may be equal to (ssnh_unit_size_precision_bytes_minus1+1)*8.

NumBytesInNalUnit indicates the size in bytes of a NAL unit.

Figure 52:
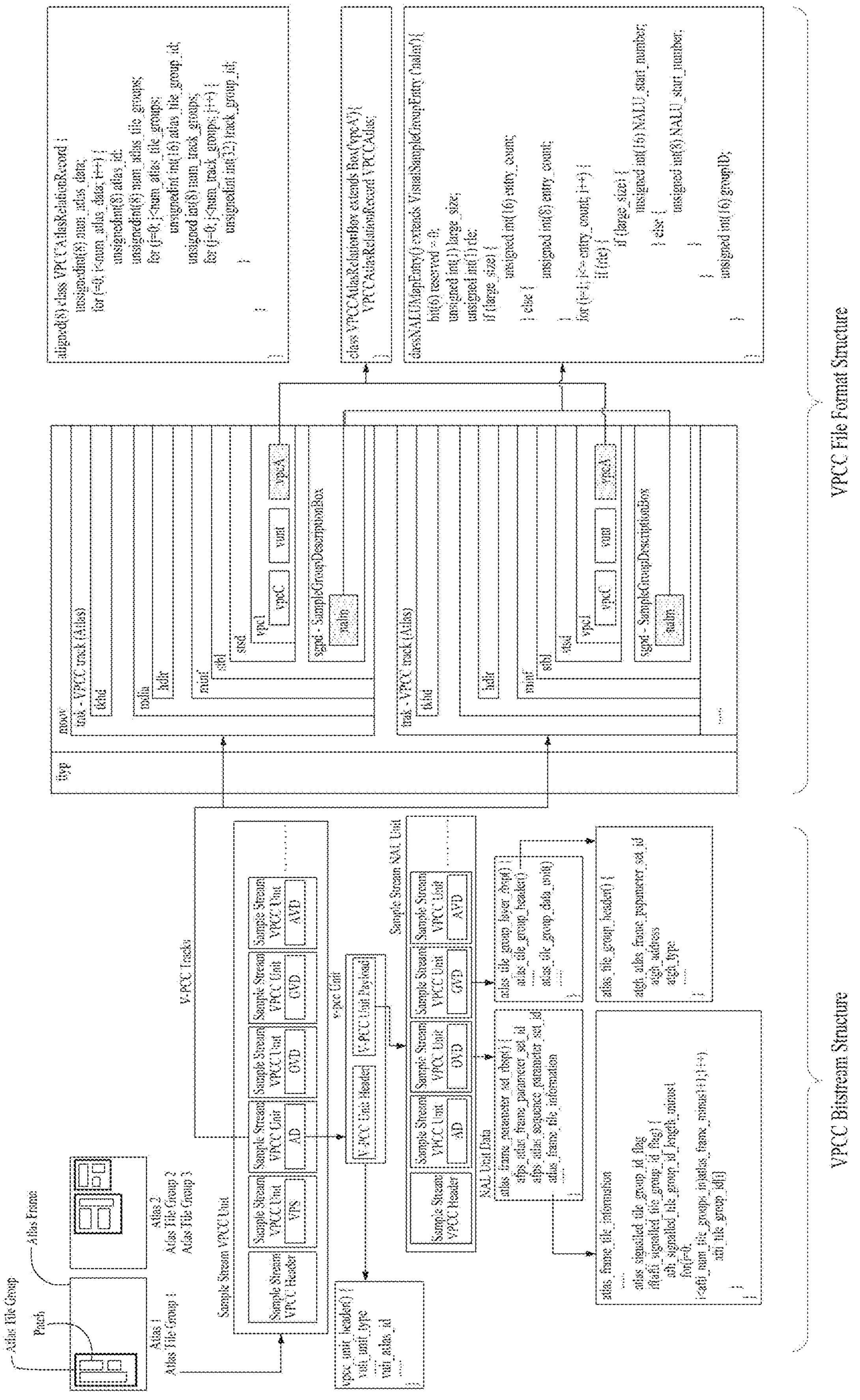
FIG. 52 shows structures of a V-PCC bitstream and a V-PCC file format according to embodiments.

NumBytesInRbsp indicates the number of bytes belonging to the payload of the NAL unit, and may be initialized to 0.

rbsp_byte[i] is the i-th byte of the RBSP. The RBSP may be expressed as an ordered sequence of bytes.

nal_forbidden_zero_bit may be equal to zero (0).

nal_unit_type may have values as shown in FIG. 52. nal_unit_type specifies the type of the RBSP data structure contained in the NAL unit.

nal_layer_id specifies the identifier of the layer to which an ACL NAL unit belongs or the identifier of a layer to which a non-ACL NAL unit applies.

nal_temporal_id_plus1 minus1 specifies a temporal identifier for the NAL unit.

FIG. 33 shows NAL unit types according to embodiments.

FIG. 33 shows nal_unit_type included in the NAL unit header of the sample stream NAL unit of FIG. 31.

NAL_TRAIL: A coded tile group of a non-TSA, non STSA trailing atlas frame may be included in the NAL unit. The RBSP syntax structure of the NAL unit is atlas_tile_group_layer_rbsp( ) or atlas_tile_layer_rbsp( ). The type class of the NAL unit is ACL. According to embodiments, a tile group may correspond to a tile.

NAL TSA: A coded tile group of a TSA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_STSA: A coded tile group of an STSA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RADL: A coded tile group of an RADL atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RASL: A coded tile group of an RASL atlas frame may be included in the NAL unit. The RBSP syntax structure of the NAL unit is atlas_tile_group_layer_rbsp( ) or aatlas_tile_layer_rbsp( ). The type class of the NAL unit is ACL.

NAL_SKIP: A coded tile group of a skipped atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_RSV_ACL_6 to NAL_RSV_ACL_9: Reserved non-IRAP ACL NAL unit types may be included in the NAL unit. The type class of the NAL unit is ACL.

NAL_BLA_W_LP, NAL_BLA_W_RADL, NAL_BLA_N_LP: A coded tile group of a BLA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_GBLA_W_LP, NAL_GBLA_W_RADL, NAL_GBLA_N_LP: A coded tile group of a GBLA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_IDR_W_RADL, NAL_IDR_N_LP: A coded tile group of an IDR atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_GIDR_W_RADL, NAL_GIDR_N_LP: A coded tile group of a GIDR atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_CRA: A coded tile group of a CRA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_GCRA: A coded tile group of a GCRA atlas frame may be included in the NAL unit. The RBSP syntax structure of the NAL unit is atlas_tile_group_layer_rbsp( ) or atlas_tile_layer_rbsp( ). The type class of the NAL unit is ACL.

NAL_IRAP_ACL_22, NAL_IRAP_ACL_23: Reserved IRAP ACL NAL unit types may be included in the NAL unit. The type class of the NAL unit is ACL.

NAL_RSV_ACL_24 to NAL_RSV_ACL_31: Reserved non-IRAP ACL NAL unit types may be included in the NAL unit. The type class of the NAL unit is ACL.

NAL_ASPS: An atlas sequence parameter set may be included in the NAL unit. The RBSP syntax structure of the NAL unit is atlas_sequence_parameter_set_rbsp( ). The type class of the NAL unit is non-ACL.

NAL_AFPS: An atlas frame parameter set may be included in the NAL unit. The RBSP syntax structure of the NAL unit is atlas_frame_parameter_set_rbsp( ). The type class of the NAL unit is non-ACL.

NAL_AUD: An access unit delimiter may be included in the NAL unit. The RBSP syntax structure of the NAL unit is access_unit_delimiter_rbsp( ). The type class of the NAL unit is non-ACL.

NAL_VPCC_AUD: A V-PCC access unit delimiter may be included in the NAL unit. The RBSP syntax structure of the NAL unit is access_unit_delimiter_rbsp( ). The type class of the NAL unit is non-ACL.

NAL_EOS: The NAL unit type may be end of sequence. The RBSP syntax structure of the NAL unit is end_of_seq_rbsp( ). The type class of the NAL unit is non-ACL.

NAL_EOB: The NAL unit type may be end of bitstream. The RBSP syntax structure of the NAL unit is end_of_atlas_sub_bitstream_rbsp( ). The type class of the NAL unit is non-ACL.

NAL_FD Filler: The NAL unit type may be filler_data_rbsp( ). The type class of the NAL unit is non-ACL.

NAL_PREFIX_NSEI, NAL_SUFFIX_NSEI: The NAL unit type may be non-essential supplemental enhancement information. The RBSP syntax structure of the NAL unit is sei_rbsp( ). The type class of the NAL unit is non-ACL.

NAL_PREFIX_ESEI, NAL_SUFFIX_ESEI: The NAL unit type may be essential supplemental enhancement information. The RBSP syntax structure of the NAL unit is sei_rbsp( ). The type class of the NAL unit is non-ACL.

NAL_AAPS: The NAL unit type may be atlas adaptation parameter set. The RBSP syntax structure of the NAL unit is atlas_adaptation_parameter_set_rbsp( ). The type class of the NAL unit is non-ACL.

NAL_RSV_NACL_44 to NAL_RSV_NACL_47: The NAL unit type may be reserved non-ACL NAL unit types. The type class of the NAL unit is non-ACL.

NAL_UNSPEC_48 to NAL_UNSPEC_63: The NAL unit type may be unspecified non-ACL NAL unit types. The type class of the NAL unit is non-ACL.

FIG. 34 shows an atlas sequence parameter set according to embodiments.

FIG. 34 shows an atlas sequence parameter set (ASPS) contained in the atlas bitstream of FIG. 31.

Each sample stream NAL unit may contain one of an atlas parameter set, for example, ASPS, AAPS, or AFPS, information about one or more atlas tile groups, and SEIs.

The ASPS may include syntax elements that apply to zero or more entire coded atlas sequences (CASs) as determined by the content of a syntax element found in the ASPS referred to by a syntax element found in each tile group header.

The ASPS may include the following elements.

asps_atlas_sequence_parameter_set_id may provide an identifier for the atlas sequence parameter set for reference by other syntax elements.

asps_frame_width indicates the atlas frame width in terms of integer number of samples, where a sample corresponds to a luma sample of a video component.

asps_frame_height indicates the atlas frame height in terms of integer number of samples, where a sample corresponds to a luma sample of a video component.

asps_log 2_patch_packing_block_size specifies the value of the variable PatchPackingBlockSize that is used for the horizontal and vertical placement of the patches within the atlas.

asps_log 2_max_atlas_frame_order_cnt_lsb_minus4 specifies the value of the variable MaxAtlasFrmOrderCntLsb that is used in the decoding process for the atlas frame order count.

asps_max_dec_atlas_frame_buffering_minus1 plus 1 specifies the maximum required size of the decoded atlas frame buffer for the CAS in units of atlas frame storage buffers.

asps_long_term_ref_atlas_frames_flag equal to 0 specifies that no long term reference atlas frame is used for inter prediction of any coded atlas frame in the CAS.

asps_long_term_ref_atlas_frames_flag equal to 1 specifies that long term reference atlas frames may be used for inter prediction of one or more coded atlas frames in the CAS.

asps_num_ref_atlas_frame_lists_in_asps specifies the number of the ref_list_struct (rlsIdx) syntax structures included in the atlas sequence parameter set.

ref_list_struct (i) as many as asps_num_ref_atlas_frame_lists_in_asps may be included in the atlas sequence parameter set.

asps_use_cight_orientations_flag equal to 0 specifies that the patch orientation index for a patch with index j in a frame with index i, pdu_orientation_index[i][j], is in the range of 0 to 1, inclusive. asps_use_eight_orientations_flag equal to 1 specifies that the patch orientation index for a patch with index j in a frame with index i, pdu_orientation_index[i][j], is in the range of 0 to 7, inclusive.

asps_extended_projection_enabled_flag equal to 0 specifies that the patch projection information is not signaled for the current atlas tile group.

asps_extended_projection_enabled_flag equal to 1 specifies that the patch projection information is signaled for the current atlas tile group or the current atlas tile.

asps_normal_axis_limits_quantization_enabled_flag equal to 1 specifies that quantization parameters shall be signalled and used for quantizing the normal axis related elements of a patch data unit, a merge patch data unit, or an inter patch data unit. If asps_normal_axis_limits_quantization_enabled_flag is equal to 0, then no quantization is applied on any normal axis related elements of a patch data unit, a merge patch data unit, or an inter patch data unit.

asps_normal_axis_max_delta_value_enabled_flag equal to 1 specifies that the maximum nominal shift value of the normal axis that may be present in the geometry information of a patch with index i in a frame with index j will be indicated in the bitstream for each patch data unit, a merge patch data unit, or an inter patch data unit. If asps_normal_axis_max_delta_value_enabled_flag is equal to 0, then the maximum nominal shift value of the normal axis that may be present in the geometry information of a patch with index i in a frame with index j shall not be indicated in the bitstream for each patch data unit, a merge patch data unit, or an inter patch data unit.

asps_remove_duplicate_point_enabled_flag equal to 1 indicates that duplicated points are not econstructed for the current atlas, where a duplicated point is a point with the same 2D and 3D geometry coordinates as another point from a lower index map.

asps_remove_duplicate_point_enabled_flag equal to 0 indicates that all points are reconstructed.

asps_max_dec_atlas_frame_buffering_minus1 plus 1 specifies the maximum required size of the decoded atlas frame buffer for the CAS in units of atlas frame storage buffers.

asps_pixel_deinterleaving_flag equal to 1 indicates that the decoded geometry and attribute videos for the current atlas contain spatially interleaved pixels from two maps. asps_pixel_deinterleaving_flag equal to 0 indicates that the decoded geometry and attribute videos corresponding to the current atlas contain pixels from only a single map.

asps_patch_precedence_order_flag equal to 1 indicates that patch precedence for the current atlas is the same as the decoding order. asps_patch_precedence_order_flag equal to 0 indicates that patch precedence for the current atlas is the reverse of the decoding order.

asps_patch_size_quantizer_present_flag equal to 1 indicates that the patch size quantization parameters are present in an atlas tile group header.

asps_patch_size_quantizer_present_flag equal to 0 indicates that the patch size quantization parameters are not present.

asps_eom_patch_enabled_flag equal to 1 indicates that the decoded occupancy map video for the current atlas contains information related to whether intermediate depth positions between two depth maps are occupied. asps_eom_patch_enabled_flag equal to 0 indicates that the decoded occupancy map video does not contain information related to whether intermediate depth positions between two depth maps are occupied.

asps_point_local_reconstruction_enabled_flag equal to 1 indicates that point local reconstruction mode information may be present in the bitstream for the current atlas.

asps_point_local_reconstruction_enabled_flag equal to 0 indicates that no information related to the point local reconstruction mode is present in the bitstream for the current atlas).

asps_map_count_minus1 plus 1 indicates the number of maps that may be used for encoding the geometry and attribute data for the current atlas.

asps_pixel_deinterleaving_map_flag[i] equal to 1 indicates that decoded geometry and attribute videos corresponding to map with index i in the current atlas contain spatially interleaved pixels corresponding to two maps. asps_pixel_deinterleaving_map_flag[i] equal to 0 indicates that decoded geometry and attribute videos corresponding to map index i in the current atlas contain pixels corresponding to a single map.

asps_eom_fix_bit_count_minus1 plus 1 indicates the size in bits of the EOM codeword.

asps_surface_thickness_minus1 plus 1 specifies the maximum absolute difference between an explicitly coded depth value and interpolated depth value when asps_pixel_deinterleaving_enabled_flag or asps_point_local_reconstruction_enabled_flag is equal to 1.

asps_vui_parameters_present_flag equal to 1 specifies that the vui_parameters( ) syntax structure is present. asps_vui_parameters_present_flag equal to 0 specifies that the vui_parameters( ) syntax structure is not present.

asps_extension_flag equal to 0 specifies that no asps_extension_data_flag syntax elements are present in the ASPS RBSP syntax structure.

asps_extension_data_flag may have any value.

rbsp_trailing_bits is used for the purpose of filling the remaining bits with 0 for byte alignment after adding a stop bit of 1 to indicate the end of RBSP data.

FIG. 35 shows an atlas frame parameter set according to embodiments.

FIG. 35 shows a detailed syntax of an atlas frame parameter set contained in the atlas bitstream of shows 31.

The atlas frame parameter set (AFPS) includes a syntax structure including syntax elements that apply to zero or more entire coded atlas frames.

afps_atlas_frame_parameter_set_id identifies the atlas frame parameter set for reference by other syntax elements.

afps_atlas_sequence_parameter_set_id specifies the value of asps_atlas_sequence_parameter_set_id for the active atlas sequence parameter set.

atlas_frame_tile_information( ) will be described with reference to FIG. 36.

afps_output_flag_present_flag equal to 1 indicates that the atgh_frame_output_flag syntax element is present in the associated tile group headers. afps_output_flag_present_flag equal to 0 indicates that the atgh_frame_output_flag syntax element is not present in the associated tile group headers.

afps_num_ref_idx_default_active_minus1 plus 1 specifies the inferred value of the variable NumRefIdxActive for the tile group or tile with atgh_num_ref_idx_active_override_flag equal to 0.

afps_additional_lt_afoc_lsb_len specifies the value of the variable MaxLtAtlasFrmOrderCntLsb that is used in the decoding process for reference atlas frame.

afps_3d_pos_x_bit_count_minus1 plus 1 specifies the number of bits in the fixed-length representation of pdu_3d_pos_x[j] of patch with index j in an atlas tile group that refers to afps_atlas_frame_parameter_set_id.

afps_3d_pos_y_bit_count_minus1 plus 1 specifies the number of bits in the fixed-length representation of pdu_3d_pos_y[j] of patch with index j in an atlas tile group that refers to afps_atlas_frame_parameter_set_id.

afps_lod_mode_enabled_flag equal to 1 indicates that the LOD parameters may be present in a patch. afps_lod_mode_enabled_flag equal to 0 indicates that the LOD parameters are not present in a patch.

afps_override_eom_for_depth_flag equal to 1 indicates that the values of afps_eom_number_of_patch_bit_count_minus1 and afps_eom_max_bit_count_minus1 are explicitly present in the bitstream. afps_override_eom_for_depth_flag equal to 0 indicates that the values of afps_eom_number_of_patch_bit_count_minus1 and afps_eom_max_bit_count_minus1 are implicitly derived.

afps_eom_number_of_patch_bit_count_minus1 plus 1 specifies the number of bits used to represent the number of geometry patches associated in an EOM attribute patch in an atlas frame that is associated with this atlas frame parameter set.

afps_eom_max_bit_count_minus1 plus 1 specifies the number of bits used to represent the number of EOM points per geometry patch associated with an EOM attribute patch in an atlas frame that is associated with this atlas frame parameter set.

afps_raw_3d_pos_bit_count_explicit_mode_flag equal to 1 indicates that the number of bits in the fixed-length representation of rpdu_3d_pos_x, rpdu_3d_pos_y, and rpdu_3d_pos_z is explicitly coded by atgh_raw_3d_pos_axis_bit_count_minus1 in the atlas tile group header that refers to afps_atlas_frame_parameter_set_id. afps_raw_3d_pos_bit_count_explicit_mode_flag equal to 0 indicates the value of atgh_raw_3d_pos_axis_bit_count_minus1 is implicitly derived.

afps_extension_flag equal to 0 specifies that no afps_extension_data_flag syntax elements are present in the AFPS RBSP syntax structure.

afps_extension_data_flag may contain extension related data.

FIG. 36 shows atlas_frame_tile_information according to embodiments.

FIG. 36 shows a syntax of atlas frame tile information included in the atlas bitstream of FIG. 31.

afti_single_tile_in_atlas_frame_flag equal to 1 specifies that there is only one tile in each atlas frame referring to the AFPS. afti_single_tile_in_atlas_frame_flag equal to 0 specifies that there is more than one tile in each atlas frame referring to the AFPS.

afti_uniform_tile_spacing_flag equal to 1 specifies that tile column and row boundaries are distributed uniformly across the atlas frame and signaled using the syntax elements, afti_tile_cols_width_minus1 and afti_tile_rows_height_minus1, respectively. afti_uniform_tile_spacing_flag equal to 0 specifies that tile column and row boundaries may or may not be distributed uniformly across the atlas frame and are signaled using the syntax elements afti_num_tile_columns_minus1 and afti_num_tile_rows_minus1 and a list of syntax element pairs afti_tile_column_width_minus1[i] and afti_tile_row_height_minus1[i].

afti_tile_cols_width_minus1 plus 1 specifies the width of the tile columns excluding the right-most tile column of the atlas frame in units of 64 samples when afti_uniform_tile_spacing_flag is equal to 1.

afti_tile_rows_height_minus1 plus 1 specifies the height of the tile rows excluding the bottom tile row of the atlas frame in units of 64 samples when afti_uniform_tile_spacing_flag is equal to 1.

When afti_uniform_tile_spacing_flag is not equal to 1, the following elements are included in the atlas frame tile information.

afti_num_tile_columns_minus1 plus 1 specifies the number of tile columns partitioning the atlas frame when afti_uniform_tile_spacing_flag is equal to 0.

afti_num_tile_rows_minus1 plus 1 specifies the number of tile rows partitioning the atlas frame when pti_uniform_tile_spacing_flag is equal to 0.

afti_tile_column_width_minus1[i] plus 1 specifies the width of the i-th tile column in units of 64 samples.

afti_tile_column_width_minus1[i] is included in the atlas frame tile information according to the value of afti_num_tile_columns_minus1.

afti_tile_row_height_minus1[i] plus 1 specifies the height of the i-th tile row in units of 64 samples.

afti_tile_row_height_minus1[i] is included in the atlas frame tile information according to the value of afti_num_tile_rows_minus1.

afti_single_tile_per_tile_group_flag equal to 1 specifies that each tile group (or tile) that refers to this AFPS includes one tile. afti_single_tile_per_tile_group_flag equal to 0 specifies that a tile group that refers to this AFPS may include more than one tile. When not present, the value of afti_single_tile_per_tile_group_flag may be inferred to be equal to 1.

Based on the value of afti_num_tile_groups_in_atlas_frame_minus1, afti_tile_idx[i] is included in the atlas frame tile information.

When afti_single_tile_per_tile_group_flag is equal to 0, afti_num_tile_groups_in_atlas_frame_minus1 is carried in the atlas frame tile information.

afti_num_tile_groups_in_atlas_frame_minus1 plus 1 specifies the number of tile groups in each atlas frame referring to the AFPS. The value of afti_num_tile_groups_in_atlas_frame_minus1 may be in the range of 0 to NumTilesInAtlasFrame−1, inclusive. When not present and afti_single_tile_per_tile_group_flag is equal to 1, the value of afti_num_tile_groups_in_atlas_frame_minus1 may be inferred to be equal to NumTilesInAtlasFrame−1.

The following elements are included in the atlas frame tile information according to the value of as much as afti_num_tile_groups_in_atlas_frame_minus1.

afti_top_left_tile_idx[i] specifies the tile index of the tile located at the top-left corner of the i-th tile group (tile). The value of afti_top_left_tile_idx[i] is not equal to the value of afti_top_left_tile_idx[j] for any i not equal to j. When not present, the value of afti_top_left_tile_idx[i] may be inferred to be equal to i. The length of the afti_top_left_tile_idx[i] syntax element may be Ceil (Log 2(NumTilesInAtlasFrame) bits.

afti_bottom_right_tile_idx_delta[i] specifies the difference between the tile index of the tile located at the bottom-right corner of the i-th tile group (tile) and afti_top_left_tile_idx[i]. When afti_single_tile_per_tile_group_flag is equal to 1, the value of afti_bottom_right_tile_idx_delta[i] is inferred to be equal to 0. The length of the afti_bottom_right_tile_idx_delta[i] syntax element is Ceil (Log 2(NumTilesInAtlasFrame-afti_top_left_tile_idx[i])) bits.

afti_signalled_tile_group_id_flag equal to 1 specifies that the tile group ID for each tile group is signaled.

When afti_signalled_tile_group_id_flag is equal to 1, afti_signalled_tile_group_id_length_minus1 and afti_tile_group_id[i] may be carried in the atlas frame tile information. When the value of this flag is 0, tile group IDs may not be signaled.

afti_signalled_tile_group_id_length_minus1 plus 1 specifies the number of bits used to represent the syntax element afti_tile_group_id[i] when present, and the syntax element atgh_address in tile group headers.

afti_tile_group_id[i] specifies the tile group ID of the i-th tile group. The length of the afti_tile_group_id[i] syntax element is afti_signalled_tile_group_id_length_minus1+1 bits.

afti_tile_group_id[i] is included in the atlas frame tile information according to the value of afti_num_tile_groups_in_atlas_frame_minus1.

FIG. 37 shows atlas_adaptation_parameter_set according to embodiments.

FIG. 37 shows an atlas adaptation parameter set included in the atlas bitstream of FIG. 31.

An AAPS RBSP includes parameters that may be referred to by the coded tile group NAL units of one or more coded atlas frames. At most one AAPS RBSP is considered active at any given moment during the operation of the decoding process. Activation of any particular AAPS RBSP results in deactivation of the previously active AAPS RBSP.

aaps_atlas_adaptation_parameter_set_id may identify the atlas adaptation parameter set for reference by other syntax elements.

aaps_atlas_sequence_parameter_set_id specifies the value of asps_atlas_sequence_parameter_set_id for the active atlas sequence parameter set.

aaps_camera_parameters_present_flag equal to 1 specifies that camera parameters are present in the current atlas adaptation parameter set. aaps_camera_parameters_present_flag equal to 0 specifies that camera parameters for the current adaptation parameter set are not be present.

aaps_extension_flag equal to 0 specifies that no aaps_extension_data_flag syntax elements are present in the AAPS RBSP syntax structure.

aaps_extension_data_flag may have various values.

FIG. 38 shows atlas_camera_parameters according to embodiments.

FIG. 38 shows atlas_camera_parameters included in FIG. 37.

acp_camera_model indicates the camera model for point cloud frames that are associated with the current adaptation parameter set.

When acp_camera_model is equal to 0, the name of acp_camera_model is not specified.

When acp_camera_model is equal to 1 acp_camera_model indicates an orthographic camera model.

When acp_camera_model has a value from 2 to 255, acp_camera_model may be reserved for future use.

acp_scale_enabled_flag equal to 1 indicates that scale parameters for the current camera model are present. acp_scale_enabled_flag equal to 0 indicates that scale parameters for the current camera model are not present.

acp_offset_enabled_flag equal to 1 indicates that offset parameters for the current camera model are present. acp_offset_enabled_flag equal to 0 indicates that offset parameters for the current camera model are not present.

acp_rotation_enabled_flag equal to 1 indicates that rotation parameters for the current camera model are present. acp_rotation_enabled_flag equal to 0 indicates that rotation parameters for the current camera model are not present.

acp_scale_on_axis[d] specifies the value of the scale [d], along the d axis for the current camera model. The value of d is in the range of 0 to 2, inclusive, with the values of 0, 1, and 2 corresponding to the X, Y, and Z axes, respectively.

acp_offset_on_axis[d] indicates the value of the offset along the d axis for the current camera model where d is in the range of 0 to 2, inclusive. The values of d equal to 0, 1, and 2 may correspond to the X, Y, and Z axis, respectively.

acp_rotation_qx specifies the x component, qX, for the rotation of the current camera model using the quaternion representation.

acp_rotation_qy specifies the y component, qY, for the rotation of the current camera model using the quaternion representation.

acp_rotation_qz specifies the z component, qZ, for the rotation of the current camera model using the quaternion representation.

FIG. 39 shows atlas_tile_group_layer and atlas_tile_group_header according to embodiments.

FIG. 39 shows an atlas_tile_group_layer and an atlas tile group header included in the atlas bitstream of FIG. 31.

atgh_atlas_frame_parameter_set_id specifies the value of afps_atlas_frame_parameter_set_id for the active atlas frame parameter set for the current atlas tile group.

atgh_atlas_adaptation_parameter_set_id specifies the value of aaps_atlas_adaptation_parameter_set_id for the active atlas adaptation parameter set for the current atlas tile group.

atgh_address specifies the tile group address of the tile group. When not present, the value of atgh_address is inferred to be equal to 0. The tile group address is the tile group ID of the tile group. The length of atgh_address may be afti_signalled_tile_group_id_length_minus1+1 bits. When afti_signalled_tile_group_id_flag is equal to 0, the value of atgh_address is in the range of 0 to afti_num_tile_groups_in_atlas_frame_minus1, inclusive. On the other hand, the value of atgh_address may be in the range of 0 to 2 (afti_signalled_tile_group_id_length_minus1+1)−1, inclusive.

atgh_type specifies the coding type of the current atlas tile group.

When atgh_type is equal to 0, the type is inter atlas tile group (P_TILE_GRP).

When atgh_type is equal to 1, the type is intra atlas tile group (I_TILE_GRP).

When atgh_type is equal to 2, the type is SKIP atlas tile group (SKIP_TILE_GRP).

When atgh_type is equal to 3, the type is RESERVED.

atgh_atlas_output_flag may affects the decoded atlas output and removal processes atgh_atlas_frm_order_cnt_lsb specifies the atlas frame order count modulo MaxAtlasFrmOrderCntLsb for the current atlas tile group.

atgh_ref_atlas_frame_list_sps_flag equal to 1 specifies that the reference atlas frame list of the current atlas tile group may be derived based on one of the ref_list_struct (rlsIdx) syntax structures in the active ASPS. atgh_ref_atlas_frame_list_sps_flag equal to 0 specifies that the reference atlas frame list of the current atlas tile group may be derived based on the ref_list_struct (rlsIdx) syntax structure directly included in the tile group header of the current atlas tile group.

atgh_ref_atlas_frame_list_idx specifies the index for the list of the ref_list_struct (rlsIdx) syntax structures included in the active ASPS of the ref_list_struct (rlsIdx) syntax structure that is used for derivation of the reference atlas frame list for the current atlas tile group.

atgh_additional_afoc_lsb_present_flag[j] equal to 1 specifies that atgh_additional_afoc_lsb_val[j] is present for the current atlas tile group. atgh_additional_afoc_lsb_present_flag[j] equal to 0 specifies that atgh_additional_afoc_lsb_val[j] is not present.

atgh_additional_afoc_lsb_val[j] specifies the value of FullAtlasFrmOrderCntLsbLt[RlsIdx][j] for the current atlas tile group.

atgh_pos_min_z_quantizer specifies the quantizer that is to be applied to the pdu_3d_pos_min_z[p] value of the patch p. If atgh_pos_min_z_quantizer is not present, its value is inferred to be equal to 0.

atgh_pos_delta_max_z_quantizer specifies the quantizer that is to be applied to the pdu_3d_pos_delta_max_z[p] value of the patch with index p. When atgh_pos_delta_max_z_quantizer is not present, the value thereof may be inferred to be equal to 0.

atgh_patch_size_x_info_quantizer specifies the value of the quantizer PatchSizeXQuantizer that is to be applied to the variables pdu_2d_size_x_minus1[p], mpdu_2d_delta_size_x[p], ipdu_2d_delta_size_x[p], rpdu_2d_size_x_minus1[p], and epdu_2d_size_x_minus1[p] of a patch with index p. When atgh_patch_size_x_info_quantizer is not present, the value thereof may be inferred to be equal to asps_log 2_patch_packing_block_size.

atgh_patch_size_y_info_quantizer specifies the value of the quantizer PatchSizeYQuantizer that is to be applied to the variables pdu_2d_size_y_minus1[p], mpdu_2d_delta_size_y[p], ipdu_2d_delta_size_y[p], rpdu_2d_size_y_minus1[p], and epdu_2d_size_y_minus1[p] of a patch with index p. When atgh_patch_size_y_info_quantizer is not present, the value thereof may be inferred to be equal to asps_log 2_patch_packing_block_size.

atgh_raw_3d_pos_axis_bit_count_minus1 plus 1 specifies the number of bits in the fixed-length representation of rpdu_3d_pos_x, rpdu_3d_pos_y, and rpdu_3d_pos_z.

atgh_num_ref_idx_active_override_flag equal to 1 specifies that the syntax element atgh_num_ref_idx_active_minus1 is present for the current atlas tile group. atgh_num_ref_idx_active_override_flag equal to 0 specifies that the syntax element atgh_num_ref_idx_active_minus1 is not present. When atgh_num_ref_idx_active_override_flag is not present, the value thereof may be inferred to be equal to 0.

atgh_num_ref_idx_active_minus1 specifies the maximum reference index for referencing the atlas frame list that may be used to decode the current atlas tile group. When the value of NumRefIdxActive is equal to 0, no reference index for the reference atlas frame list may be used to decode the current atlas tile group.

byte_alignment is used for the purpose of filling the remaining bits with 0 for byte alignment after adding 1 as a stop bit to indicate the end of data.

FIG. 40 shows a reference list structure (ref_list_struct) according to embodiments.

FIG. 40 shows the reference list structure included in FIG. 39.

num_ref_entries[rlsIdx] specifies the number of entries in the ref_list_struct (rlsIdx) syntax structure.

st_ref_atlas_frame_flag[rlsIdx][i] equal to 1 specifies that the i-th entry in the ref_list_struct (rlsIdx) syntax structure is a short term reference atlas frame entry. st_ref_atlas_frame_flag[rlsIdx][i] equal to 0 specifies that the i-th entry in the ref_list_struct (rlsIdx) syntax structure is a long term reference atlas frame entry. When not present, the value of st_ref_atlas_frame_flag[rlsIdx][i] may be inferred to be equal to 1.

abs_delta_afoc_st[rlsIdx][i] specifies, when the i-th entry is the first short term reference atlas frame entry in ref_list_struct (rlsIdx) syntax structure, the absolute difference between the atlas frame order count values of the current atlas tile group and the atlas frame referred to by the i-th entry, or specifies, when the i-th entry is a short term reference atlas frame entry but not the first short term reference atlas frame entry in the ref_list_struct (rlsIdx) syntax structure, the absolute difference between the atlas frame order count values of the atlas frames referred to by the i-th entry and by the previous short term reference atlas frame entry in the ref_list_struct (rlsIdx) syntax structure.

strpf_entry_sign_flag[rlsIdx][i] equal to 1 specifies that i-th entry in the syntax structure ref_list_struct (rlsIdx) has a value greater than or equal to 0.

strpf_entry_sign_flag[rlsIdx][i] equal to 0 specifies that the i-th entry in the syntax structure ref_list_struct (rlsIdx) has a value less than 0. When not present, the value of strpf_entry_sign_flag[rlsIdx][i] may be inferred to be equal to 1.

afoc_lsb_lt[rlsIdx][i] specifies the value of the atlas frame order count modulo MaxAtlasFrmOrderCntLsb of the atlas frame referred to by the i-th entry in the ref_list_struct (rlsIdx) syntax structure. The length of the afoc_lsb_lt [rlsIdx][i] syntax element may be asps_log 2_max_atlas_frame_order_cnt_lsb_minus4+4 bits.

FIG. 41 shows atlas tile group data (atlas_tile_group_data_unit) according to embodiments.

FIG. 41 shows atlas tile group data included in the atlas bitstream of FIG. 31. atgdu_patch_mode[p] indicates the patch mode for the patch with index p in the current atlas tile group. A tile group with atgh_type=SKIP_TILE_GRP implies that the entire tile group information is copied directly from the tile group with the same atgh_address as that of the current tile group that corresponds to the first reference atlas frame.

Patch mode types for I_TILE_GRP type atlas tile groups may be specified as follows. atgdu_patch_mode equal to 0 indicates the non-predicted patch mode with the identifier of I_INTRA.

atgdu_patch_mode equal to 1 indicates the RAW point patch mode with the identifier of I_RAW.

atgdu_patch_mode equal to 2 indicates the EOM point patch mode with the identifier of I_EOM.

The values of atgdu_patch_mode equal from 3 to 13 indicate reserved modes with the identifier of I_RESERVED.

atgdu_patch_mode equal to 14 indicates the patch termination mode with the identifier of I_END.

Patch mode types for the P_TILE_GRP type atlas tile groups may be specified as follows.

atgdu_patch_mode equal to 0 indicates the patch skip mode with the identifier of P_SKIP.

atgdu_patch_mode equal to 1 indicates the patch merge mode with the identifier of P_MERGE.

atgdu_patch_mode equal to 2 indicates the inter predicted patch mode with the identifier of P_INTER.

atgdu_patch_mode equal to 3 indicates the non-predicted patch mode with the identifier of P_INTRA.

atgdu_patch_mode equal to 4 indicates the RAW point patch mode with the identifier of P_RAW.

atgdu_patch_mode equal to 5 indicates the EOM point patch mode with the identifier of P_EOM.

The values of atgdu_patch_mode equal from 6 to 13 indicate reserved modes with the identifier of P_RESERVED.

atgdu_patch_mode equal to 14 indicates the patch termination mode with the identifier of P_END.

Patch mode types for SKIP_TILE_GRP type atlas tile groups may be specified as follows.

atgdu_patch_mode equal to 0 indicates the patch skip mode with the identifier of P_SKIP.

FIG. 42 shows patch_information_data according to embodiments

FIG. 42 shows patch_information_data that may be included in FIG. 41.

The patch_information_data may carry the following information according to patchIdx and patchMode.

When atgh_type is SKIP_TILE_GR, skip_patch_data_unit(patchIdx) may be carried.

When atgh_type is P_TILE_GR, the following elements may be carried. Specifically, when patchMode is P_SKIP, skip_patch_data_unit(patchIdx) may be provided. When patchMode is P_MERGE, merge_patch_data_unit (patchIdx)) may be provided. When patchMode is P_INTRA, patch_data_unit(patchIdx) may be carried. When patchMode is P_INTER, inter_patch_data_unit(patchIdx) may be carried. When patchMode is P_RAW, raw_patch_data_unit(patchIdx) may be carried. When patchMode is P_EOM, eom_patch_data_unit(patchIdx) may be carried.

When atgh_type is I_TILE_GR, the following elements may be carried. Specifically, when patchMode is I_INTRA, patch_data_unit(patchIdx)) may be carried. When patchMode is I_RAW, raw_patch_data_unit(patchIdx) may be carried. When patchMode is I_EOM, eom_patch_data_unit(patchIdx) may be carried.

FIG. 43 shows patch_data_unit according to embodiments.

FIG. 43 shows detailed information of the patch data unit included in FIG. 42;

pdu_2d_pos_x[p] specifies the x-coordinate (or left offset) of the top-left corner of the patch bounding box for patch p in the current atlas tile group, tileGroupIdx, expressed as a multiple of PatchPackingBlockSize.

pdu_2d_pos_y[p] specifies the y-coordinate (or top offset) of the top-left corner of the patch bounding box for patch p in the current atlas tile group, tileGroupIdx, expressed as a multiple of PatchPackingBlockSize.

pdu_2d_size_x_minus1[p] plus 1 specifies the quantized width value of the patch with index p in the current atlas tile group, tileGroupIdx.

pdu_2d_size_y_minus1[p] plus 1 specifies the quantized height value of the patch with index p in the current atlas tile group, tileGroupIdx.

pdu_3d_pos_x[p] specifies the shift to be applied to the reconstructed patch points in the patch with index p of the current atlas tile group along the tangent axis.

pdu_3d_pos_y[p] specifies the shift to be applied to the reconstructed patch points in the patch with index p of the current atlas tile group along the bitangent axis.

pdu_3d_pos_min_z[p] specifies the shift to be applied to the reconstructed patch points in the patch with index p of the current atlas tile group along the normal axis.

pdu_3d_pos_delta_max_z[p], if present, specifies the nominal maximum value of the shift expected to be present in the reconstructed bitdepth patch geometry samples, after conversion to their nominal representation, in the patch with index p of the current atlas tile group along the normal axis.

pdu_projection_id[p] specifies the values of the projection mode and of the index of the normal to the projection plane for the patch with index p of the current atlas tile group.

pdu_orientation_index[p] indicates the patch orientation index for the patch with index p of the current atlas tile group.

| X | Identifier | Rotation( x ) | Offset( x ) |
|---|---|---|---|
| 0 | FPO_NULL | $\begin{bmatrix} 1 & 0 \\ 0 & 1 \end{bmatrix}$ | $\begin{bmatrix} 0 \\ 0 \end{bmatrix}$ |
| 1 | FPO_SWAP | $\begin{bmatrix} 0 & 1 \\ 1 & 0 \end{bmatrix}$ | $\begin{bmatrix} 0 \\ 0 \end{bmatrix}$ |
| 2 | FPO_ROT90 | $\begin{bmatrix} 0 & -1 \\ 1 & 0 \end{bmatrix}$ | $\begin{bmatrix} Patch2dSizeY[p]-1 \\ 0 \end{bmatrix}$ |
| 3 | FPO_ROT180 | $\begin{bmatrix} -1 & 0 \\ 0 & -1 \end{bmatrix}$ | $\begin{bmatrix} Patch2dSizeX[p]-1 \\ Patch2dSizeY[p]-1 \end{bmatrix}$ |
| 4 | FPO_ROT270 | $\begin{bmatrix} 0 & 1 \\ -1 & 0 \end{bmatrix}$ | $\begin{bmatrix} 0 \\ Patch2dSizeX[p]-1 \end{bmatrix}$ |
| 5 | FPO_MIRROR | $\begin{bmatrix} -1 & 0 \\ 0 & 1 \end{bmatrix}$ | $\begin{bmatrix} Patch2dSizeX[p]-1 \\ 0 \end{bmatrix}$ |
| 6 | FPO_MROT90 | $\begin{bmatrix} 0 & -1 \\ -1 & 0 \end{bmatrix}$ | $\begin{bmatrix} Patch2dSizeY[p]-1 \\ Patch2dSizeX[p]-1 \end{bmatrix}$ |
| 7 | FPO_MROT180 | $\begin{bmatrix} 1 & 0 \\ 0 & -1 \end{bmatrix}$ | $\begin{bmatrix} 0 \\ Patch2dSizeY[p]-1 \end{bmatrix}$ |

pdu_lod_enabled_flag[p] equal to 1 specifies that the LOD parameters are present for the current patch p. When pdu_lod_enabled_flag[p] is equal to 0, no LOD parameters are present for the current patch.

pdu_lod_scale_x_minus1[p] specifies the LOD scaling factor to be applied to the local x coordinate of a point in the patch with index p of the current atlas tile group, prior to its addition to the patch coordinate Patch3dPosX[p].

pdu_lod_scale_y[p] specifies the LOD scaling factor to be applied to the local y coordinate of a point in the patch with index p of the current atlas tile group, prior to its addition to the patch coordinate Patch3dPosY[p].

point_local_reconstruction_data(patchIdx) may include information for enabling the decoder to reconstruct points that are missing due to compression loss or the like.

SEI messages assist in processes related to decoding, reconstruction, display, or other purposes. According to embodiments, there may be two types of SEI messages: essential and non-essential.

Non-essential SEI messages are not required by the decoding process. Conforming decoders are not required to process this information for output order conformance.

Essential SEI messages are an integral part of the V-PCC bitstream and should not be removed from the bitstream. The essential SEI messages may be categorized into two types:

Type-A essential SEI messages: These SEIs contain information required to check bitstream conformance and for output timing decoder conformance. Every V-PCC decoder conforming to point A should not discard any relevant Type-A essential SEI messages and consider the same for bitstream conformance and for output timing decoder conformance.

Type-B essential SEI messages: V-PCC decoders that intend to conform to a particular reconstruction profile may not discard any relevant Type-B essential SEI messages and may consider the same for the purposes of 3D point cloud reconstruction and conformance.

Video-based point cloud compression represents volumetric encoding of point cloud visual information. A V-PCC bitstream containing a coded point cloud sequence (CPCS) may be composed of VPCC units carrying a V-PCC parameter set (VPS), a coded atlas bitstream, a 2D video encoded occupancy map bitstream, a 2D video encoded geometry bitstream, and zero or more 2D video encoded attribute bitstreams.

Figure 47:
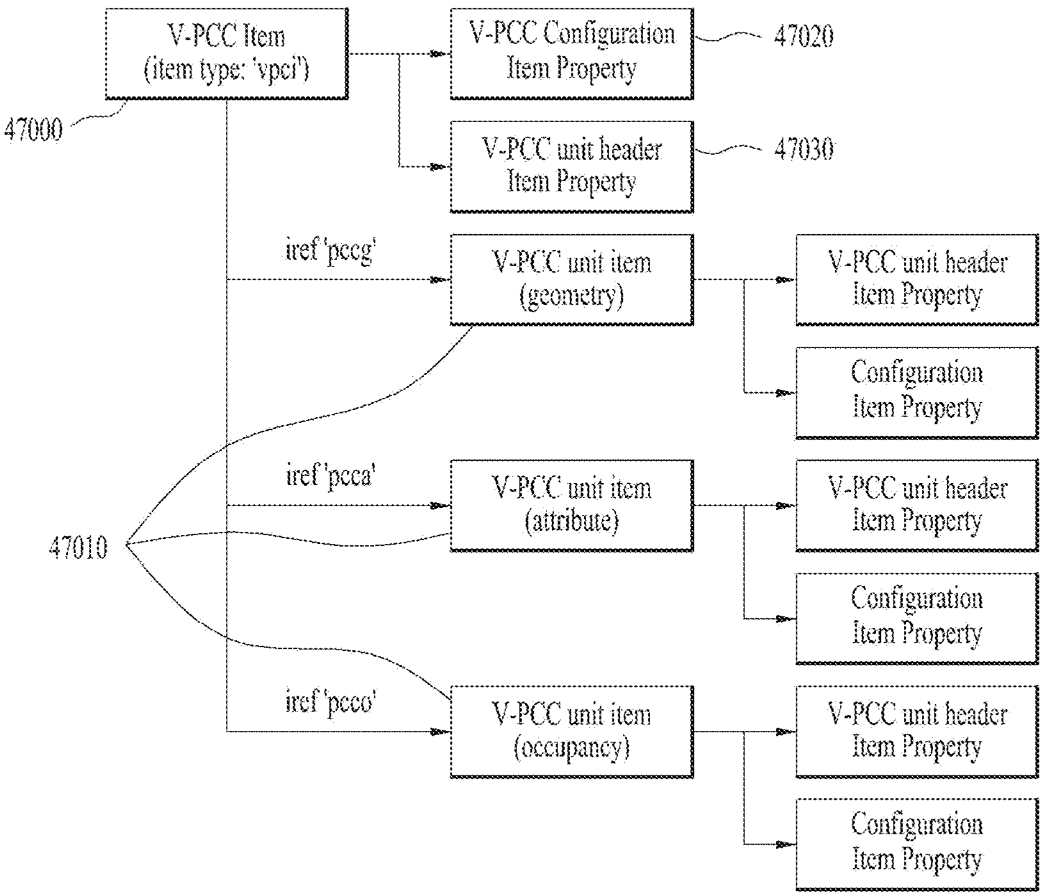
FIG. 47 shows an overview of a structure for encapsulating non-timed V-PCC data according to embodiments.

The method/device according to the embodiments may receive the V-PCC bitstreams of FIGS. 25 and 26 through the file/segment encapsulator (20004 in FIG. 20, 21009 in FIG. 21). When a file (FIG. 70 to 72) or point cloud data is an image, the method/device may encapsulate and deliver the following information based on the container structure of items (FIG. 47).

When the file (FIG. 70 to 72) or point cloud data is an image, the method/device according to the embodiments may receive and decapsulate the items (FIG. 47) through the file/segment decapsulator (20005 in FIG. 20, 22000 in FIG. 22).

Volumetric Visual Track

A volumetric visual track may be identified by the volumetric visual media handler type 'volv' in the HandlerBox of the MediaBox.

Volumetric Visual Media Header

Box Type: 'vvhd'

Container: MediaInformationBox

Mandatory: Yes

Quantity: Exactly one

Volumetric visual tracks use Volumetric VisualMediaHeaderBox in the MediaInformationBox.

```
aligned(8) class VolumetricVisualMediaHeaderBox
  extends FullBox('vvhd', version = 0, 1) {
}
```

"version" is an integer that specifies the version of this box.

Volumetric Visual Sample Entry

Volumetric visual tracks shall use a Volumetric VisualSampleEntry.

```
class VolumetricVisualSampleEntry(codingname) extends SampleEntry (codingname){
  unsigned int(8)[32] compressor_name;
}
```

compressor_name is a name, for informative purposes. It is formatted in a fixed 32-byte field, with the first byte set to the number of bytes to be displayed, followed by the number of bytes of displayable data encoded using UTF-8, and then padding to complete 32 bytes total (including the size byte). The field may be set to 0.

Volumetric Visual Samples

The format of a volumetric visual sample is defined by the coding system.

Hereinafter, detailed information on a common data structure included in a volumetric visual track according to the V-PCC system will be described.

V-PCC Unit Header Box

This box may be present in the sample entry of the V-PCC track and in the scheme information of all video-coded V-PCC component tracks. The box may contain the V-PCC unit header for the data carried by the respective track.

```
aligned(8) class VPCCUnitHeaderBox extends FullBox('vunt', version = 0, 0) {
  vpcc_unit_header( )      unit_header;
}
```

The box contains vpcc_unit_header( ) as above.

V-PCC Decoder Configuration Box

A V-PCC decoder configuration box may include VPCC-DecoderConfigurationRecord.

```
class VPCCConfigurationBox extends Box('vpcC') {
  VPCCDecoderConfigurationRecord( ) VPCCConfig;
}
```

This record contains a version field. This version may define version 1 of this record. Incompatible changes to the record may be indicated by a change of version number. The decoder may determine whether to decode this record or the bitstream based on the version number.

The VPCCParameterSet array includes a vpcc_parameter_set( )

The SetupUnit arrays include atlas parameter sets that are constant for the stream referred to by the sample entry in which the decoder configuration record as well as atlas sub-stream SEI messages is present.

The SetupUnit arrays may be constant for the stream referred to by the sample entry. The decoder configuration record may be present as well as atlas sub-stream SEI messages.

```
aligned(8) class VPCCDecoderConfigurationRecord {
  unsigned int(8) configurationVersion = 1;
  unsigned int(2) lengthSizeMinusOne;
  bit(1) reserved = 1;
  unsigned int(5) numOfVPCCParameterSets;
  for (i=0; i < numOfVPCCParameterSets; i++) {
  unsigned int(16) VPCCParameterSetLength;
  vpcc_unit(VPCCParameterSetLength) vpccParameterSet; //
The parameter vpccParameterSet is as defined in the standard
document ISO/IEC 23090.
  }
```

For example, vpccParameterSet may contain information about point cloud data such as vps_v3c_parameter_set_id, vps_atlas_id, vps_frame_width[j], vps_frame_height[j], vps_multiple_map_streams_present_flag[j], occupancy_information (j), geometry_information (j), and attribute_information (j).

```
  unsigned int(8) numOfSetupUnitArrays;
  for (j=0; j < numOfSetupUnitArrays; j++) {
    bit(1) array_completeness;
    bit(1) reserved = 0;
    unsigned int(6) NAL_unit_type;
    unsigned int(8) numNALUnits;
    for (i=0; i < numNALUnits; i++) {
      unsigned int(16) SetupUnitLength;
      nal_unit(SetupUnitLength) setupUnit; // setupUnit
is as defined in ISO/IEC 23090-5.
```

-continued

```
      }
    }
  }
```

configuration Version is a version field. Incompatible changes to the record may be indicated by a change of version number.

lengthSizeMinusOne plus 1 indicates the length in bytes of the NALUnitLength field in a V-PCC sample in the stream to which this configuration record applies.

For example, a size of one byte is indicated with a value of 0. The value of this field may be equal to ssnh_unit_size_precision_bytes_minus1 in sample_stream_nal_header( ) for the atlas substream.

numOfVPCCParameterSets specifies the number of V-PCC parameter set units signaled in the decoder configuration record.

VPCCParameterSetLength indicates the size, in bytes, of the vpccParameterSet field.

vpccParameterSet is a V-PCC unit of type VPCC_VPS carrying the vpcc_parameter_set( )

numOfSetupUnitArrays indicates the number of arrays of atlas NAL units of the indicated type(s).

array_completeness equal to 1 indicates that all atlas NAL units of the given type are in the following array and none are in the stream. array_completeness equal to 0 indicates that additional atlas NAL units of the indicated type may be in the stream. The default and permitted values are constrained by the sample entry name.

NAL_unit_type indicates the type of the atlas NAL units in the following array. It may be one of the values indicating the NAL_ASPS, NAL_PREFIX_SEI, or NAL_SUFFIX_SEI atlas NAL unit.

numNALUnits indicates the number of atlas NAL units of the indicated type included in the configuration record for the stream to which this configuration record applies. The SEI array may only contain SEI messages.

SetupUnitLength indicates the size, in bytes, of the setupUnit field. The length field may include the size of both the NAL unit header and the NAL unit payload, but does not include the length field itself.

setupUnit may contain a NAL unit of type NAL_ASPS, NAL_AFPS, NAL_PREFIX_ESEI, NAL_PREFIX_NSEI, NAL_SUFFIX_ESEI, or NAL_SUFFIX_NSEI.

When not present in setupUnit, type NAL_ASPS (atlas sequence parameter set), NAL_AFPS (atlas frame parameter set), NAL_AAPS (atlas adaptation parameter), NAL_PREFIX_ESEI, NAL_PREFIX_NSEI, NAL_SUFFIX_ESEI, or NAL_SUFFIX_NSEI unit may be included. NAL_PREFIX_ESEI (Essential supplemental enhancement information, sci_rbsp( ), NAL_PREFIX_NSEI (Non-essential supplemental enhancement information, sci_rbsp( ), NAL_SUFFIX_ESEI (Essential supplemental enhancement information, sci_rbsp( ), or NAL_SUFFIX_NSEI (Non-essential supplemental enhancement information, sei_rbsp( ) may contain SEI messages. The SEI messages may provide information about the stream as a whole. An example of such an SEI may be a user-data SEI.

FIG. 44 shows a V-PCC atlas relation box according to embodiments.

FIG. 44 shows a V-PCC atlas relation box contained in a file (FIG. 70 to 72) or an item (FIG. 47) according to the V-PCC system.

The V-PCC atlas relation box according to the embodiments may include VPCCAtlasRelationRecord according to the embodiments.

```
class VPCCAtlasRelationBox extends Box('vpcA') {
   VPCCAtlasRelationRecord VPCCAtlas;
}
```

VPCCAtlasRelationRecord is a structure for signaling an atlas sub-bitstream containing multiple atlas data, and may contain information such as a relationship between a list of atlas tile groups included in the atlas data and an id and/or atlas data.

```
aligned(8) class VPCCAtlasRelationRecord {
bit(1) entry_point_flag;
   unsigned int(8) num_atlas_data;
   for (i=0; i<num_atlas_data; i++) {
      unsigned int(8) atlas_id;
      unsigned int(8) num_atlas_tile_groups;
      for (j=0; j<num_atlas_tile_groups; j++) {
         unsigned int(16) atlas_tile_group_id;
      }
      unsigned int(8) num_vpcc_component_track_groups;
      for (k=0; k<num_vpcc_component_track_groups; k++) {
unsigned int(32) vpcc_component_track_group_id;
      }
      unsigned int(8) num_vpcc_component_tracks;
      for (p=0; p<num_vpcc_component_tracks; p++) {
         unsigned int(32) vpcc_component_track_id;
      }
   }
}
```

entry_point_flag is a flag having a value of true or false. When set to true, it can be used to indicate a V-PCC track used as an entry point among multiple V-PCC tracks. Although it is recommended that entry_point_flag be set to the value of true for only one V-PCC track among the multiple V-PCC tracks, the flag may be set to true for one or more V-PCC tracks.

num_atlas_data may indicate the number of atlas data included in a V-PCC track.

atlas_id is an id for identifying atlas contained in the V-PCC track, and may be mapped to vuh_atlas_id of vpcc_unit_header( ) described in FIG. 27.

num_atlas_tile_groups may indicate the number of atlas tile groups contained in atlas data.

atlas_tile_group_id is an id for identifying an atlas tile group, and may be mapped to afti_tile_group_id of atlas_frame_tile_information( ) described in FIG. 36.

num_vpcc_component_track_groups indicates the number of V-PCC component track groups associated with the atlas data.

vpcc_component_track_group_id indicates the track group for the tracks which carry the V-PCC components for the associated atlas data.

num_vpcc_component_tracks may indicate the number of associated V-PCC component tracks when the V-PCC component tracks are not grouped.

vpcc_component_track_id is an id for identifying each associated V-PCC component track when the V-PCC component tracks are not grouped.

In addition, access to atlas data for each atlas tile group may be possible through NALUMapEntry disclosed below.

NALUMapEntry may be present in the V-PCC track when VPCCSpatialRegionsBox is present. For example, NALUMapEntry may be configured as specified in ISO/IEC14496-15.

The NALUMapEntry, when present, may be used to assign an identifier or groupID to each atlas NAL unit.

The NALUMapEntry, when present, may or may not be linked to a sample group description setting grouping_type_parameter of the SampleToGroupBox of type 'nalm'. Consequently, SampleToGroupBox of type 'nalm' may or may not use version 0 of the box.

FIG. 45 shows a V-PCC global atlas information box according to embodiments.

FIG. 45 shows a V-PCC global atlas information box included in a file (FIG. 70 to 72) or an item (FIG. 47) according to the V-PCC system.

V-PCC Global Atlas Information Box

A V-PCC global atlas information box may include VPCCGlobalAtlasInformationRecord.

```
class VPCCGlobalAtlasInformationBox extends Box('vpcA') {
   VPCCGlobalAtlasInformationRecord GlobalAtlas;
}
```

VPCCGlobalAtlasInformationRecord is a structure for signaling multiple atlas data contained in all V-PCC tracks, and may contain information such as a relationship between a list of atlas tile groups included in the atlas data and ids and/or atlas data. Only VPCCGlobalAtlasInformationBox information may be contained in a V-PCC track with a sample entry including VPCCGlobalAtlasInformationBox, that is, a separate V-PCC track, that is, a V-PCC main track.

```
aligned(8) class VPCCGlobalAtlasInformationRecord {
   unsigned int(8) num_vpcc_tracks;
   for (i=0; i<num_vpcc_tracks; i++) {
      unsigned int(8) track_id;
      bit(1) entry_point_flag;
      unsigned int(8) num_atlas_data;
      for(j=0; j<num_atlas_data; j++) {
         unsigned int(8) atlas_id;
         unsigned int(8) num_atlas_tile_groups;
```

-continued

```
        for (k=0; k<num_atlas_tile_groups; k++) {
          unsigned int(16) atlas_tile_group_id;
        }
        unsigned int(8) num_vpcc_component_track_groups;
        for (k=0; k<num_vpcc_component_track_groups; k++) {
unsigned int(32) vpcc_component_track_group_id;
        }
        unsigned int(8) num_vpcc_component_tracks;
          for (p=0; p<num_vpcc_component_tracks; p++) {
          unsigned int(32) vpcc_component_track_id;
        }
      }
    }
  }
```

num_vpcc_tracks may indicate the number of V-PCC tracks.

track_id is an id for identifying V-PCC tracks.

entry_point_flag is a flag having a value of true or false. When set to true, it can be used to indicate a V-PCC track used as an entry point among multiple V-PCC tracks. Although it is recommended that entry_point_flag be set to the value of true for only one V-PCC track among the multiple V-PCC tracks, the flag may be set to true for one or more V-PCC tracks.

num_atlas_data may indicate the number of atlas data contained in a V-PCC track having track_id.

atlas_id is an id for identifying atlas data contained in a V-PCC track having track_id, and may be mapped to vuh_atlas_id of vpcc_unit_header( ) described in [Section 5.2 V-PCC].

num_atlas_tile_groups may indicate the number of atlas tile groups contained in atlas data.

atlas_tile_group_id is an id for identifying an atlas tile group, and may be mapped to afti_tile_group_id of atlas_frame_tile_information( ) described in Atlas sub-bitstream and parameter sets in FIG. 36.

num_vpcc_component_track_groups indicates the number of V-PCC component track groups associated with the atlas data.

vpcc_component_track_group_id indicates the track group for the tracks which carry the V-PCC components for the associated atlas data.

num_vpcc_component_tracks may indicate the number of associated V-PCC component tracks when the V-PCC component tracks are not grouped.

vpcc_component_track_id is an id for identifying each associated V-PCC component track when the V-PCC component tracks are not grouped.

A file (FIG. 70 to 72) or an item (FIG. 47) according to the V-PCC system may include a sample group according to embodiments.

Sample Group

V-PCC Atlas Parameter Set Sample Group

The ‘vaps’ grouping_type for sample grouping represents the assignment of samples in a V-PCC track to the atlas parameter sets carried in this sample group. When SampleToGroupBox with grouping_type equal to ‘vaps’ is present, SampleGroupDescriptionBox with the same grouping type may be present, and may contain an ID of the group to which the samples belong.

A V-PCC track may contain at most one SampleToGroupBox with grouping_type equal to ‘vaps’.

```
aligned(8) class VPCCAtlasParamSampleGroupDescriptionEntry( ) extends
SampleGroupDescriptionEntry(‘vaps’) {
  unsigned int(8) numOfSetupUnits;
  for (i=0; i < numOfSetupUnits; i++) {
    unsigned int(16) setupUnitLength;
    nal_unit(setupUnitLength) setupUnit;
}
```

numOfAtlasParameterSets specifies the number of atlas parameter sets signaled in the sample group description.

atlasParameterSet is a sample_stream_vpcc_unit( ) instance containing an atlas sequence parameter set, atlas frame parameter set associated with this group of samples.

According to embodiments, it may be specified as follows.

```
aligned(8) class VPCCAtlasParamSampleGroupDescriptionEntry( ) extends
SampleGroupDescriptionEntry(‘vaps’) {
  unsigned int(3) lengthSizeMinusOne;
  unsigned int(5) numOfAtlasParameterSets;
  for (i=0; i<numOfAtlasParameterSets; i++) {
    sample_stream_nal_unit atlasParameterSetNALUnit;
  }
}
```

lengthSizeMinusOne plus 1 indicates the precision, in bytes, of the ssnu_nal_unit_size element in all sample stream NAL units signaled in this sample group description.

atlasParameterSetNALUnit is a sample_stream_nal_unit( ) instance containing an atlas sequence parameter set, atlas frame parameter set associated with this group of samples.

A file in accordance with embodiments may include one or more tracks including signaling information for point cloud data.

A track in accordance with embodiments may include one or more atlas identifier information to represent one or more atlas data for point cloud data.

A track in accordance with embodiments may include one or more atlas tile information associated with atlas data.

One or more atlas identifier information in accordance with embodiments may be carried in a sample entry of a track.

One or more atlas tile identifier information in accordance with embodiments may represent that atlas data may include one or more atlas tiles for point cloud data.

A track in accordance with embodiments further includes component track information for atlas data.

FIG. 46 shows a dynamic atlas relation sample group and a dynamic global atlas information sample group according to embodiments.

FIG. 46 shows a dynamic atlas relation sample group and a dynamic global atlas information sample group included in a file (FIG. 70 to 72) or an item (FIG. 47) according to the V-PCC system.

Dynamic Atlas Relation Sample Group

The 'dyar' grouping_type for sample grouping represents the assignment of samples in a V-PCC track to an atlas relation box carried in this sample group. When SampleToGroupBox with grouping_type equal to 'dyar' is present, SampleGroupDescriptionBox with the sample grouping type may be present, and may contain the ID of this group of samples.

A V-PCC track may contain at most one SampleToGroupBox with grouping_type equal to 'dyar'

```
aligned(8) class DynamicAtlasRelationSampleGroupDescriptionEntry( )
extends SampleGroupDescriptionEntry('dyar') {
  VPCCAtlasRelationBox( );
}
```

Dynamic Global Atlas Information Sample Group

The 'dyga' grouping_type for sample grouping represents the assignment of samples in V-PCC track to an atlas relation box carried in this sample group. When SampleToGroupBox with grouping_type equal to 'dyga' is present, SampleGroupDescriptionBox with the samp grouping type may be present, and may contain the ID of this group of samples.

A V-PCC main track may contain at most one SampleToGroupBox with grouping_type equal to 'dyga'.

```
aligned(8) class DynamicGlobalAtlasInformationSampleGroupDescriptionEntry( )
extends SampleGroupDescriptionEntry('dyar') {
  VPCCGlobalAtlasInformationBox( );
}
```

Tracks of a file (FIG. 70 to 72) or an item (FIG. 47) according to the V-PCC system may be grouped.

Track Grouping

Spatial Region Track Grouping

TrackGroupTypeBox with track_group_type equal to '3drg' indicates that this track belongs to a group of V-PCC component tracks that correspond to a 3D spatial region. Tracks belonging to the same spatial region have the same value of track_group_id for track_group_type '3drg'. The track_group_id of tracks from one spatial region differs from the track_group_id of tracks from any other spatial region.

```
aligned(8) class SpatialRegionGroupBox
  extends TrackGroupTypeBox('3drg') {
}
```

V-PCC Track Grouping

TrackGroupTypeBox with track_group_type equal to 'atrg' indicates that this track belongs to a group of V-PCC tracks that correspond to specific atlas data and/or V-PCC content. V-PCC tracks related to the atlas data and/or V-PCC content have the same value of track_group_id for track_group_type 'atrg'

V-PCC track grouping may be used to group V-PCC tracks corresponding to specific atlas data, and/or may be used to group V-PCC tracks constituting one V-PCC content.

```
aligned(8) class AtlasRelationGroupBox extends TrackGroupTypeBox('atrg') {
bit(1) entry_point_flag;
}
```

entry_point_flag is a flag having a value of true or false.

When set to true, it can be used to indicate a V-PCC track group used as an entry point among multiple V-PCC track groups. Although it is recommended that entry_point_flag be set to the value of true for only one V-PCC track group among the multiple V-PCC track groups, the flag may be set to true for one or more V-PCC track groups.

V-PCC Component Track Grouping

TrackGroupTypeBox with track_group_type equal to 'vctg' indicates that this track belongs to a group of V-PCC component tracks that correspond to atlas data and/or V-PCC content. V-PCC component tracks related to the atlas data and/or V-PCC content have the same value of track_group_id for track_group_type 'vctg'.

V-PCC component track grouping may be used to group V-PCC component tracks corresponding to specific atlas data, and/or may be used to group V-PCC component tracks constituting one V-PCC content.

sequence have the same implicit or explicit edit lists. Synchronization between the elementary streams in the component tracks are handled by the ISOBMFF track timing structures (stts, ctts, and cslg), or equivalent mechanisms in movie fragments.

The sync samples in the V-PCC track and V-PCC component tracks may or may not be time-aligned. In the absence of time-alignment, random access may involve pre-rolling the various tracks from different sync start-times in order to enable starting at the desired time.

In the case of time-alignment (required by, for example, a V-PCC profile such as the basic toolset profile as defined in V-PCC), the sync samples of the V-PCC track may be considered as the random access points for the V-PCC content, and random access may be performed by only referencing the sync sample information of the V-PCC track.

```
aligned(8) class VPCCComponentTrackGroupBox extends TrackGroupTypeBox('vctg') {
  bit(1) entry_point_flag;
}
```

entry_point_flag is a flag having a value of true or false. When set to true, it can be used to indicate a V-PCC component track group used as an entry point among multiple V-PCC component track groups. Although it is recommended that entry_point_flag be set to the value of true for only one V-PCC component track group among the multiple V-PCC component track groups, the flag may be set to true for one or more V-PCC component track groups.

A track of a file (FIG. 70 to 72) or an item (FIG. 47) according to the V-PCC system may have the following structure.

Multi Track Container of V-PCC Bitstream

In the general layout of a multi-track ISOBMFF V-PCC container, V-PCC units in a V-PCC bitstream may be mapped to individual tracks within the container file based on the types thereof. An example is shown in FIGS. 40 and 41. There may be two types of tracks in a multi-track ISOBMFF V-PCC container: V-PCC track and V-PCC component track.

V-PCC component tracks are video scheme tracks which carry 2D video encoded data for the occupancy map, geometry, and attribute sub-bitstreams of the V-PCC bitstream. In addition, the following conditions may be satisfied for V-PCC component tracks:

a) in the sample entry, a new box documenting the role of the video stream contained in this track may be inserted in the V-PCC system;
b) a track reference may be introduced from the V-PCC track into the V-PCC component track to establish the membership of the V-PCC component track in the specific point cloud represented by the V-PCC track;
c) the track-header flags may be set to 0 to indicate that this track does not contribute directly to the overall layup of the movie but contributes to the V-PCC system.

Tracks belonging to the same V-PCC sequence are time-aligned. Samples that contribute to the same point cloud frame across the different video-encoded V-PCC component tracks and the V-PCC track has the same presentation time. The V-PCC atlas sequence parameter sets and atlas frame parameter sets used for such samples have a decoding time equal or prior to the composition time of the point cloud frame. In addition, all tracks belonging to the same V-PCC Based on this layout, a V-PCC ISOBMFF container may include the following:

The container file may include one or more V-PCC tracks which contain V-PCC parameter sets and atlas sub-bitstream parameter sets (in the sample entry) and samples carrying atlas sub-bitstream NAL units. This track also includes track references to other tracks carrying the payloads of video compressed V-PCC units (of unit types VPCC_OVD, VPCC_GVD, and VPCC_AVD);

The container file may include a video scheme track in which the samples contain access units of a video-coded elementary stream for occupancy map data (i.e., payloads of V-PCC units of type VPCC_OVD);

The container file may include one or more video scheme tracks in which the samples contain access units of video-coded elementary streams for geometry data (i.e., payloads of V-PCC units of type VPCC_GVD); and The container file may include zero or more video scheme tracks in which the samples contain access units of video-coded elementary streams for attribute data (i.e., payloads of V-PCC units of type VPCC_AVD).

V-PCC Track

A file (FIG. 70 to 72) or an item (FIG. 47) according to the V-PCC system may include the following information in a track.

V-PCC Track Sample Entry

Sample Entry Type: 'vpc1', 'vpcg', 'vpga'
Container: SampleDescriptionBox
Mandatory: A 'vpc1' or 'vpcg' sample entry is mandatory
Quantity: One or more sample entries may be present A track according to embodiments may include sample entry types referred to as 'vpc1', 'vpcg', and 'vpga'.

V-PCC tracks may use VPCCSampleEntry which extends VolumetricVisualSampleEntry with a sample entry type of 'vpc1' or 'vpcg'.

A VPCC track sample entry may contain a VPCCConfigurationBox.

Under the 'vpc1' sample entry, all atlas sequence parameter sets, atlas frame parameter sets, or V-PCC SEIs may be present in the setupUnit array.

Under the 'vpcg' sample entry, the atlas sequence parameter sets, atlas frame parameter sets, V-PCC SEIs may be present in this array, or in the stream.

When multiple atlas data are composed of multiple V-PCC tracks, the point cloud reception device according to the embodiments may parse the V-PCC tracks, and recognize the relationship between the atlas data and the atlas tile groups and information about the associated V-PCC component tracks through VPCCAtlasRelationBox that may be contained in VPCCSampleEntry.

An optional BitRateBox may be present in the VPCC volumetric sample entry to signal the bit rate information of the V-PCC track.

```
aligned(8) class VPCCSampleEntry( ) extends VolumetricVisualSampleEntry ('vpc1') {
  VPCCConfigurationBox config;
    VPCCAtlasRelationBox atlas;
  VPCCUnitHeaderBox unit_header;
}
```

Referencing V-PCC Tracks

The method/device according to the embodiments may encapsulate atlas data using multiple V-PCC tracks.

When a V-PCC main track with a sample entry type of 'vpga' is used, as many TrackReferenceTypeBoxes as the number of V-PCC tracks may be added to TrackReferenceBox of TrackBox of the V-PCC main track. TrackReferenceTypeBox may include track_IDs of V-PCC tracks referenced by the V-PCC main track. The reference type referring to V-PCC tracks may be 'vpct'.

The method or device according to the embodiments may configure a separate V-PCC track, that is, a V-PCC main track, using a VPCC GlobalAtlasInformationBox, and set the sample entry type to 'vpga'.

The point cloud device according to the embodiments may first parse a track having a sample entry of the type 'vpga' and acquire information of other V-PCC tracks contained in the file and atlas data information that each track has.

That is, when the sample entry type of the V-PCC track is 'vpga', the track may be a track used as an entry point.

The method or device according to the embodiments may always set the track id of a track with a sample entry of type 'vpga' to 1.

```
aligned(8) class VPCCSampleEntry( ) extends
VolumetricVisualSampleEntry('vpga') {
    VPCCGlobalAtlasInformationBox globalAtlas;
}
```

V-PCC Track Sample Format

Each sample in the V-PCC track may correspond to a single coded atlas access unit.

Samples corresponding to this frame in the various component tracks may have the same composition time as the V-PCC track sample.

Each V-PCC sample may contain one V-PCC unit payload of type VPCC_AD, which may include one or more atlas NAL units.

```
aligned(8) class VPCCSample {
 unsigned int PointCloudPictureLength = sample_size; // size of
sample (e.g., from SampleSizeBox)
 for (i=0; i<PointCloudPictureLength; ) {
    sample_stream_nal_unit nalUnit;
    i += (VPCCDecoderConfigurationRecord.lengthSizeMinusOne+1) *
nalUnit.ssnu_nal_unit_size;
}
}
```

nalUnit may contain a single atlas NAL unit in NAL unit sample stream format.

V-PCC Track Sync Sample

A sync sample in a V-PCC track may be a sample that contains an intra random access point (IRAP) coded atlas access unit.

According to embodiments, atlas sub-bitstream parameter sets (e.g., ASPS, AAPS, AFPS) and SEI messages may be repeated, if needed, at a sync sample to allow for random access.

Video-Encoded V-PCC Component Tracks

Since it is not meaningful to display the decoded frames from attribute, geometry, or occupancy map tracks without reconstructing the point cloud at the player side, a restricted video scheme type may be defined for the video-coded tracks.

V-PCC component video tracks may be represented in the file as restricted video, and may be identified by 'pccv' in the scheme_type field of the SchemeTypeBox of the RestrictedSchemeInfoBox of their restricted video sample entries.

It should be noted that there is no restriction on the video codec used for encoding the attribute, geometry, and occupancy map V-PCC components. These components may be encoded using different video codecs.

Scheme Information

A SchemeInformationBox may be present and contain a VPCCUnitHeaderBox.

Referencing V-PCC Component Tracks

To link a V-PCC track to component video tracks, three TrackReferenceTypeBoxes are added to a TrackReferenceBox within the TrackBox of the V-PCC track, one for each component. The TrackReferenceTypeBox contains an array of track_IDs designating the video tracks which the V-PCC track references. The reference_type of a TrackReferenceTypeBox identifies the type of the component (i.e., occupancy map, geometry, or attribute, or occupancy map). The 4CCs of these track reference types may be specified as follows:

'pcco': the referenced track(s) contain the video-coded occupancy map V-PCC component;

'pccg': the referenced track(s) contain the video-coded geometry V-PCC component; and 'pcca': the referenced track(s) contain the video-coded attribute V-PCC component.

The type of the V-PCC component carried by the referenced restricted video track, and signaled in the RestrictedSchemeInfoBox of the track, may match the reference type of the track reference from the V-PCC track.

Single Track Container of V-PCC Bitstream

A single-track encapsulation of V-PCC data requires the V-PCC encoded elementary bitstream to be represented by a single track.

Single-track encapsulation of PCC data may be utilized in the case of simple ISOBMFF encapsulation of a V-PCC encoded bitstream. Such a bitstream may be directly stored as a single track without further processing. V-PCC unit header data structures may be kept in the bitstream. A single track container may be provided to media workflows for further processing (e.g., multi-track file generation, transcoding, DASH segmentation, etc.).

V-PCC Bitstream Track

Sample Entry Type: 'vpe1', 'vpeg'

Container: Sample DescriptionBox

Mandatory: A 'vpe1' or 'vpeg' sample entry is mandatory

Quantity: One or more sample entries may be present

V-PCC bitstream tracks use VolumetricVisualSampleEntry with a sample entry type of 'vpe1' or 'vpeg'.

A VPCC bitstream sample entry contains a VPCCConfigurationBox.

Under the 'vpe1' sample entry, all atlas sequence parameter sets, atlas frame parameter sets, SEIs may be present in the setupUnit array.

Under the 'vpeg' sample entry, atlas sequence parameter sets, atlas frame parameter sets, SEIs may be present in this array, or in the stream.

```
aligned(8) class VPCCBitStreamSampleEntry( ) extends
VolumetricVisualSampleEntry ('vpe1') {
    VPCCConfigurationBox config;
}
```

V-PCC Bitstream Sample Format

A V-PCC bitstream sample contains one or more V-PCC units which belong to the same presentation time, i.e, one V-PCC access unit. A sample may be self-contained like a sync sample or decoding-wise dependent on other samples of V-PCC bitstream track.

V-PCC Bitstream Sync Sample

A V-PCC bitstream sync sample satisfies all the following conditions:

It is independently decodable;

None of the samples that come after the sync sample in decoding order have any decoding dependency on any sample prior to the sync sample; and All samples that come after the sync sample in decoding order are successfully decodable.

V-PCC Bitstream Sub-Sample

A V-PCC bitstream sub-sample is a V-PCC unit which is contained in a V-PCC bitstream sample.

A V-PCC bitstream track shall contain one SubSampleInformationBox in SampleTableBox, or in the TrackFragmentBox of each of the MovieFragmentBoxes, which lists the V-PCC bitstream sub-samples. The 32-bit unit header of the V-PCC unit which represents the sub-sample may be copied to the 32-bit codec_specific_parameters field of the sub-sample entry in the SubSampleInformationBox. The V-PCC unit type of each sub-sample may be identified by parsing the codec_specific_parameters field of the sub-sample entry in the SubSampleInformationBox.

Timed Metadata Track

In the method/device according to the embodiments, V-PCC atlas relation information may be delivered based on the configuration of a timed metadata track as follows.

If the V-PCC track has an associated timed-metadata track with a sample entry type 'dyat', atlas data defined for the point cloud stream carried by the V-PCC track may be considered as dynamic atlas data.

The associated timed-metadata track may contain a 'cdsc' track reference to the V-PCC track carrying the atlas stream.

Sample Entry

```
aligned(8) class DynamicAtlasRelationSampleEntry extends
MetaDataSampleEntry('dyat'){
    VPCCAtlasRelationBox( );
}
```

Sample Format

```
aligned(8) class DynamicAtlasRelationSample( ) {
bit(1) entry_point_flag;
    unsigned int(8) num_atlas_data;
    for (i=0; i<num_atlas_data; i++) {
        unsigned int(8) atlas_id;
        unsigned int(8) num_atlas_tile_groups;
        for (j=0; j<num_atlas_tile_groups; j++) {
            unsigned int(16) atlas_tile_group_id;
        }
        unsigned int(8) num_vpcc_component_track_groups;
        for (k=0; k<num_vpcc_component_track_groups; k++) {
unsigned int(32) vpcc_component_track_group_id;
        }
        unsigned int(8) num_vpcc_component_tracks;
        for (p=0; p<num_vpcc_component_tracks; p++) {
            unsigned int(32) vpcc_component_track_id;
        }
    }
}
```

The semantics for each field are the same as defined in VPCCAtlasRelationRecord.

In addition, when the V-PCC global atlas information changes dynamically, it may be included in the sample entry of the timed-metadata track, and only changing information may be included in the sample.

Sample Entry

```
aligned(8) class DynamicGlobalAtlasInformationSampleEntry extends
MetaDataSampleEntry('dyga') {
    VPCCGlobalAtlasInformationBox( );
}
```

Sample Format

```
aligned(8) class GlobalAtlasInformationSample( ) {
    unsigned int(8) num_vpcc_tracks;
    for (i=0; i<num_vpcc_tracks; i++) {
        unsigned int(8) track_id;
        bit(1) entry_point_flag;
        unsigned int(8) num_atlas_data;
        for(j=0, j<num_atlas_data; j++) {
            unsigned int(8) atlas_id;
            unsigned int(8) num_atlas_tile_groups;
            for (k=0; k<num_atlas_tile_groups; k++) {
                unsigned int(16) atlas_tile_group_id;
            }
            unsigned int(8) num_vpcc_component_track_groups;
            for (k=0; k<num_vpcc_component_track_groups; k++) {
unsigned int(32) vpcc_component_track_group_id;
            }
            unsigned int(8) num_vpcc_component_tracks;
                for (p=0; p<num_vpcc_component_tracks; p++) {
                unsigned int(32) vpcc_component_track_id;
            }
        }
    }
}
```

The semantics for each field are the same as defined in VPCCGlobalAtlasInformationRecord.

FIG. 47 shows an overview of a structure for encapsulating non-timed V-PCC data according to embodiments.

FIG. 47 shows a structure for transmitting non-timed V-PCC data when the point cloud data related device of FIGS. 20 to 22 processes non-timed point cloud data.

The point cloud data transmission/reception method/device according to the embodiments, and a system included in the transmission/reception device may transmit and receive non-timed V-PCC data by encapsulating non-timed V-PCC data as shown in FIG. 47.

When the point cloud data according to the embodiments is an image, the point cloud video encoder 10002 of FIG. 1 (or the encoder of FIG. 4, the encoder of FIG. 15, the transmission device of FIG. 18, the processor 20001 of FIG. 20, the encoder 20003 of FIG. 20, the processor of FIG. 21, the image encoder 21008 of FIG. 21) may encode the image, and the file/segment encapsulator 10003 (or the file/segment encapsulator 20004 of FIG. 20, the file/segment encapsulator 21009 of FIG. 21) may store the image and image-related information in a container (item) as shown in FIG. 47. The transmitter 10004 may transmit the container.

Similarly, the receiver of FIG. 1 receives the container of FIG. 47, and the file/segment decapsulator 10007 (or the file/segment decapsulator 20005 of FIG. 20, the file/segment decapsulator 22000) parses the container. The point cloud video decoder 10008 of FIG. 1 (or the decoder of FIG. 16, the decoder of FIG. 17, the reception device of FIG. 19, the image decoder 20006, or the image decoder 22002) may decode the image contained in the item and provide the decoded image to the user.

The image according to the embodiments may be a still image. The method/device according to the embodiments may transmit/receive point cloud data about the image. The method/device according to the embodiments may store the image in an item based on the data container structure as shown in FIG. 47 and transmit/receive the same. Also, attribute information about the image may be stored in an image property or the like.

The non-timed V-PCC data is stored in a file as image items. Two new item types (i.e., V-PCC item and V-PCC unit item) are defined for encapsulating non-timed V-PCC data.

A new handler type 4CC code ‘vpcc’ is defined and stored in the HandlerBox of the MetaBox in order to indicate the presence of V-PCC items, V-PCC unit items and other V-PCC encoded content representation information.

V-PCC Items 47000: A V-PCC item is an item which represents an independently decodable V-PCC access unit. An item type ‘vpci’ is defined to identify V-PCC items. V-PCC items store V-PCC unit payload(s) of the atlas sub-bitstream. When PrimaryItemBox is present, item_id in this box is set to indicate a V-PCC item.

A V-PCC unit item is an item which represents a V-PCC unit data. V-PCC unit items store V-PCC unit payload(s) of occupancy, geometry, and attribute video data units. A V-PCC unit item stores only one V-PCC access unit related data.

An item type for a V-PCC unit item is set depending on the codec used to encode corresponding video data units. A V-PCC unit item is associated with corresponding V-PCC unit header item property and codec specific configuration item property. V-PCC unit items are marked as hidden items because it is not meaningful to display the same independently.

In order to indicate the relationship between a V-PCC item and V-PCC unit items, the following three item reference types are used. Item reference is defined “from” a V-PCC item “to” the related V-PCC unit items.

‘pcco’: the referenced V-PCC unit item(s) contain the occupancy video data units.

‘pccg’: the referenced V-PCC unit item(s) contain the geometry video data units.

‘pcca’: the referenced V-PCC unit item(s) contain the attribute video data units.

V-PCC Configuration Item Property 47020

Box Types: ‘vpcp’

Property type: Descriptive item property

Container: ItemPropertyContainerBox

Mandatory (per item): Yes, for a V-PCC item of type ‘vpci’

Quantity (per item): One or more for a V-PCC item of type ‘vpci’

For the V-PCC configuration item property, the box type is ‘vpcp’ and the property type is a descriptive item property. The container is an ItemPropertyContainerBox. It is mandatory per item for a V-PCC item of type ‘vpci’. One or more properties per item may be present for a V-PCC item of type ‘vpci’.

V-PCC parameter sets are stored as descriptive item properties and are associated with the V-PCC items.

```
aligned(8) class vpcc_unit_payload_struct ( ) {
    unsigned int(16) vpcc_unit_payload_size;
    vpcc_unit_payload( );
}
```

vpcc_unit_payload_size specifies the size in bytes of the vpcc_unit_paylod( )

```
aligned(8) class VPCCConfigurationProperty extends
ItemProperty(‘vpcc’) {
    vpcc_unit_payload_struct( )[ ];
}
```

vpcc_unit_paylod( ) includes a V-PCC unit of type VPCC_VPS.

V-PCC Unit Header Item Property 47030

Box Types: ‘vunt’

Property type: Descriptive item property

Container: ItemPropertyContainerBox

Mandatory (per item): Yes, for a V-PCC item of type ‘vpci’ and for a V-PCC unit item Quantity (per item): One For the V-PCC unit header item property, the box type is ‘vunt’, the property type is a descriptive item property, and the container is an ItemPropertyContainerBox. It is Mandatory per item for a V-PCC item of type ‘vpci’ and for a V-PCC unit item. One property may be present per item.

V-PCC unit header is stored as descriptive item properties and is associated with the V-PCC items and the V-PCC unit items.

```
aligned(8) class VPCCUnitHeaderProperty ( ) extends
ItemFullProperty(‘vunt’, version=0, 0) {
    vpcc_unit_header( );
}
```

Based on the structure of FIG. 47, the method/device/system according to the embodiments may deliver non-timed point cloud data.

Carriage of Non-Timed Video-Based Point Cloud Compression Data

The non-timed V-PCC data is stored in a file as image items. A new handler type 4CC code ‘vpcc’ is defined and stored in the HandlerBox of the MetaBox in order to indicate the presence of V-PCC items, V-PCC unit items and other V-PCC encoded content representation information.

An item according to embodiments represents an image. For example, it is data that does not move and may refer to a single image.

The method/device according to the embodiments may generate and transmit data according to the embodiments based on a structure for encapsulating non-timed V-PCC data, as shown in FIG. 45.

V-PCC Items

A V-PCC item is an item which represents an independently decodable V-PCC access unit. A new item type 4CC code 'vpci' is defined to identify V-PCC items. V-PCC items store V-PCC unit payload(s) of atlas sub-bitstream.

If PrimaryItemBox exists, item_id in this box shall be set to indicate a V-PCC item.

V-PCC Unit Item

A V-PCC unit item is an item which represents a V-PCC unit data.

V-PCC unit items store V-PCC unit payload(s) of occupancy, geometry, and attribute video data units. A V-PCC unit item may contain only one V-PCC access unit related data.

An item type 4CC code for a V-PCC unit item is set based on the codec used to encode corresponding video data units. A V-PCC unit item is associated with corresponding V-PCC unit header item property and codec specific configuration item property.

V-PCC unit items are marked as hidden items, since it is not meaningful to display independently.

In order to indicate the relationship between a V-PCC item and V-PCC units, three new item reference types with 4CC codes 'pcco', 'pccg' and 'pcca' are defined. Item reference is defined "from" a V-PCC item "to" the related V-PCC unit items. The 4CC codes of item reference types are:

- 'pcco': the referenced V-PCC unit item(s) containing the occupancy video data units.
- 'pccg': the referenced V-PCC unit item(s) containing the geometry video data units.
- 'pcca': the referenced V-PCC unit item(s) containing the attribute video data units.

V-PCC-Related Item Properties

Descriptive item properties are defined to carry the V-PCC parameter set information and V-PCC unit header information, respectively:

V-PCC Configuration Item Property

Box Types: 'vpcp'

Property type: Descriptive item property

Container: ItemPropertyContainerBox

Mandatory (per item): Yes, for a V-PCC item of type 'vpci'

Quantity (per item): One or more for a V-PCC item of type 'vpci'

V-PCC parameter sets are stored as descriptive item properties and are associated with the V-PCC items.

```
essential is set to 1 for a 'vpcp' item property.
aligned(8) class vpcc_unit_payload_struct ( ) {
unsigned int(16) vpcc_unit_payload_size;
vpcc_unit_payload( );
}
aligned(8) class VPCCConfigurationProperty
extends ItemProperty('vpcc') {
vpcc_unit_payload_struct( )[ ];
}
```

vpcc_unit_payload_size specifies the size in bytes of the vpcc_unit_paylod( )

V-PCC Unit Header Item Property

Box Types: 'vunt'

Property type: Descriptive item property

Container: ItemPropertyContainerBox

Mandatory (per item): Yes, for a V-PCC item of type 'vpci' and for a V-PCC unit item Quantity (per item): One V-PCC unit header is stored as descriptive item properties and is associated with the V-PCC items and the V-PCC unit items.

The essential is set to 1 for a 'vunt' item property.

```
aligned(8) class VPCCUnitHeaderProperty ( ) {
extends ItemFullProperty('vunt', version=0, 0) {
    vpcc_unit_header( );
}
```

Figure 48:
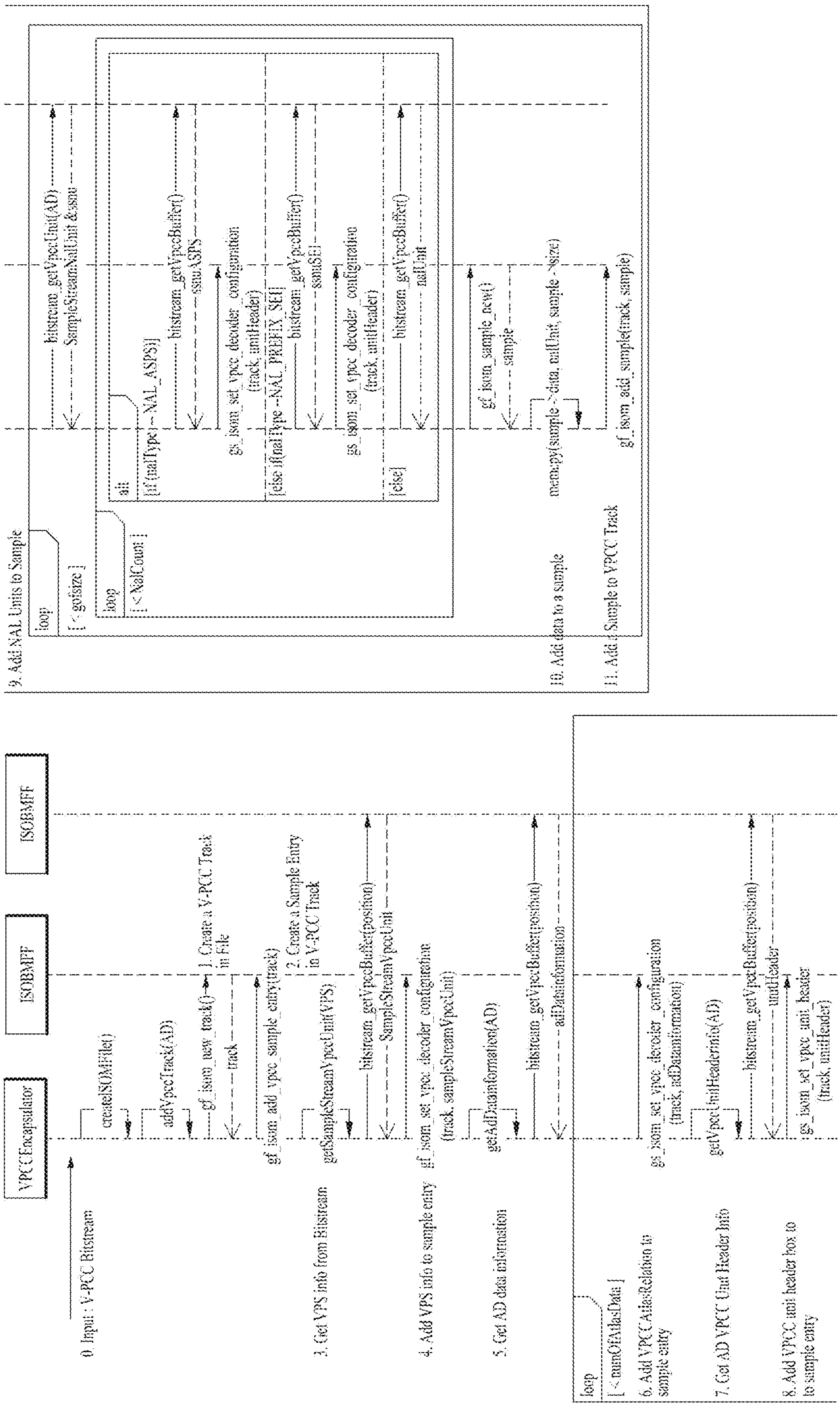
FIG. 48 illustrates a file encapsulation operation for multiple atlas data according to embodiments.

FIG. 48 illustrates a file encapsulation operation for multiple atlas data according to embodiments.

FIG. 48 illustrates the operation of the file encapsulators 10003, 20004, and 21009.

The point cloud data transmission device according to the embodiments may include a file encapsulator (hereinafter, referred to as an encapsulator) and/or a transmitter. The encapsulator may configure a V-PCC bitstream in the isobmff file format and create a box structure or the like necessary for encoding in the isobmff file format. The transmitter may transmit the generated data. Each step in FIG. 48 is described below.

0. A bitstream V-PCC-encoded by the encoder (10002, FIG. 4, FIG. 15, FIGS. 18, 20000 to 20003, 21000 to 21008) (i.e., input bitstream, FIG. 25, FIG. 26, or FIG. 31) may be used as an input.

1. A V-PCC track may be created in an ISOBMFF file (FIGS. 70 to 72, FIG. 47).

2. A sample entry may be created in the V-PCC track created in operation 1 above.

3. VPS (VPCC Parameter Set) info (see FIG. 29) according to embodiments may be acquired from the input bitstream.

4. The VPS info according to the embodiments may be added to the sample entry.

5. Atlas data info according to embodiments may be acquired from the input bitstream. The atlas data info according to the embodiments may include VPCCAtlasRelation information.

6. Based on the atlas data info according to the embodiments, a VPCCAtlasRelationBox structure suitable for the point cloud system file format may be created and added to a sample entry.

7. Atlas VPCC unit header info according to embodiments may be acquired from the input bitstream.

8. VPCC unit header info according to the embodiments may be added to a sample entry.

9. Atlas NAL unit data according to embodiments may be added to a sample entry or a sample according to nalType.

10. Data according to embodiments except for NAL_ASPS or NAL_XXXX_SEI, which is an atlas NAL unit data type, may be added to a sample.

11. The sample created in operation 10 above may be added to the V-PCC track.

Figure 49:
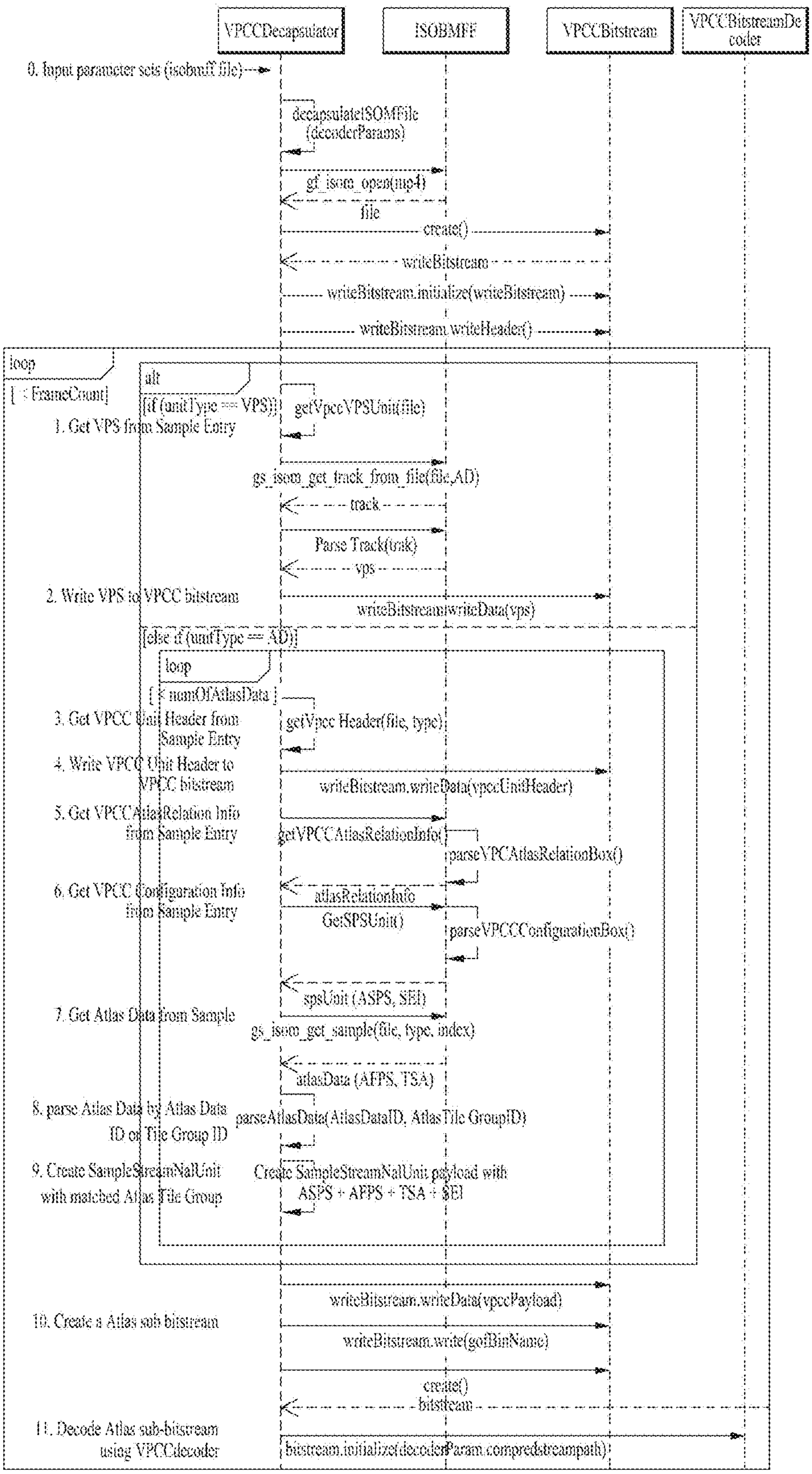
FIG. 49 illustrates a file decapsulation operation for atlas data according to embodiments.

FIG. 49 illustrates a file decapsulation operation for atlas data according to embodiments.

FIG. 49 illustrates the operation of the file decapsulators 10007, 20005, and 22000.

The point cloud data reception device according to the embodiments may include a receiver and/or a file/segment decapsulator (which may be referred to as a decapsulator). The receiver may receive point cloud data (in the V-PCC isobmff file format). The decapsulator may decapsulate the V-PCC isobmff file into a V-PCC bitstream, and may parse a box structure (information in the file) or the like required for decoding thereof. The reception device may further include a decoder. The decoder may decode the V-PCC bitstream. Each operation of the decapsulator according to the embodiments is described below.

0. A file encapsulated in V-PCC Isobmff (FIGS. 70 to 72 and 47) may be received.

1. VPS (V-PCC Parameter Set, FIG. 29) information according to the embodiments may be acquired from the sample entry of the input isobmff file.

2. The VPS information acquired in operation 1 above may be configured in the form of a V-PCC bitstream (FIG. 25, FIG. 26, FIG. 31).

3. V-PCC unit header information according to the embodiments may be acquired from the sample entry of the input isobmff file.

4. The V-PCC unit header information acquired in operation 3 above may be configured in the form of a V-PCC bitstream.

5. VPCCAtlasRelation information according to the embodiments may be acquired from the sample entry of the input isobmff file.

6. V-PCC configuration information according to the embodiments may be acquired from the sample entry of the input isobmff file. According to embodiments, the V-PCC configuration information includes VPS and atlas data in which NAL unit type is NAL_ASPS or NAL_XXXX_SEI.

7. From the sample of the input isobmff file, atlas data according to embodiments having the NAL unit type such as TSA may be acquired.

8. Based on the VPCCAtlasRelation information acquired in operation 5 above, the atlas data that matches vuh_atlas_id of the atlas vpcc unit header information acquired in operation 7 above may be aggregated. In addition, atlas NAL units that match atlas_tile_group_id at the atlas tile group level may be aggregated.

9. SampleStreamNalUnit data constituting the V-PCC atlas sub-bitstream (FIG. 31) may be configured using the atlas data acquired in operations 6 to 8 above.

10. A V-PCC atlas sub-bitstream for V-PCC bitstream decoding may be configured.

11. By parsing the V-PCC atlas sub-bitstream generated in operation 10 above through VPCCBitstreamDecoder, an atlas tile group and patch data necessary for reconstructing a point cloud according to embodiments may be acquired.

Figure 50:
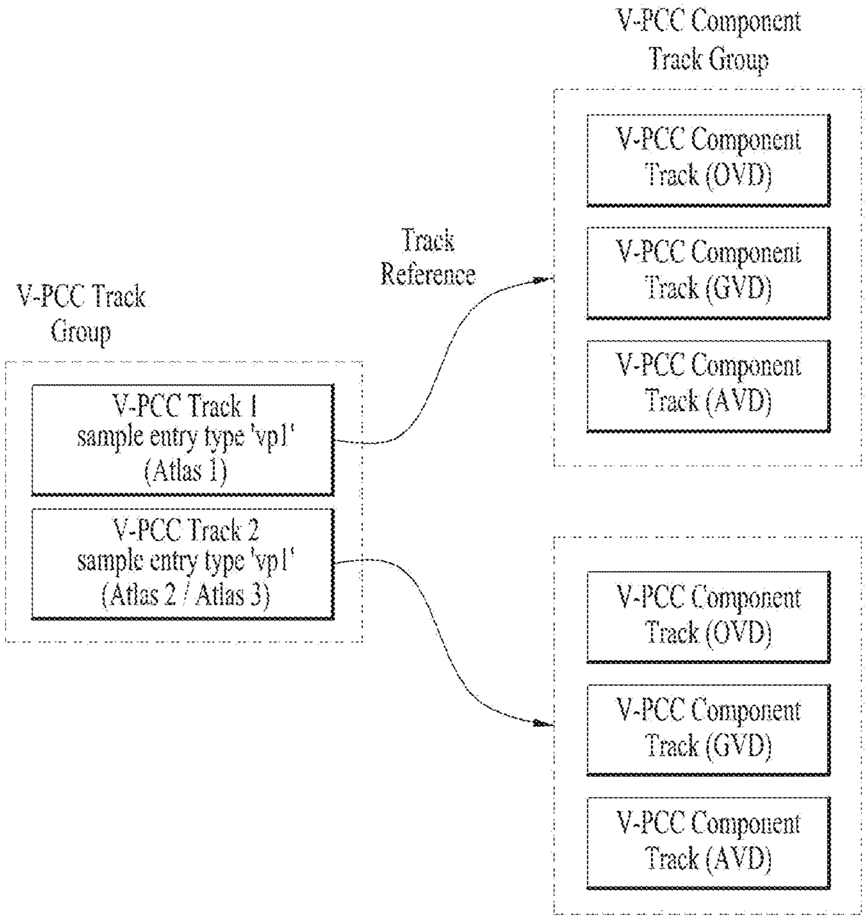
FIG. 50 illustrates file level signaling according to embodiments.

FIG. 50 illustrates file level signaling according to embodiments.

FIG. 50 illustrates a reference and/or grouping relationship of a V-PCC track according to embodiments.

The method/device according to the embodiments may deliver point cloud data in multiple tracks.

The relationship between the V-PCC bitstream and the V-PCC file format structure may be represented as shown in FIG. 50.

When point cloud data for multiple atlas is processed, V-PCC track 1 may have a sample entry type 'vpc1' (=all atlas sequence parameter sets, atlas frame parameter sets, or V-PCC SEIs), and contain data about atlas 1. V-PCC track 2 may have a sample entry type 'vpc1' (=all atlas sequence parameter sets, atlas frame parameter sets, or V-PCC SEIs), and contain data about atlas 2 and/or atlas 3.

Sample entries of all V-PCC tracks may contain VPCCAtlasRelationBox.

Track 1 may have a reference relationship with a V-PCC component track group based on a track reference. For example, a group of a V-PCC component track carrying occupancy video data about atlas 1, a V-PCC component track carrying geometry video data, and a V-PCC component track carrying attribute video data and V-PCC track 1 may refer to each other.

Track 2 may have a reference relationship with the V-PCC component track group based on the track reference. For example, a group of a V-PCC component track carrying occupancy video data about atlas 2, a V-PCC component track carrying geometry video data, and a V-PCC component track carrying attribute video data and V-PCC track 1 may refer to each other.

The method/device according to the embodiments may provide an effect of efficiently accessing multiple atlases and point cloud data about the atlases, and efficiently decoding and rendering desired point cloud data.

Figure 51:
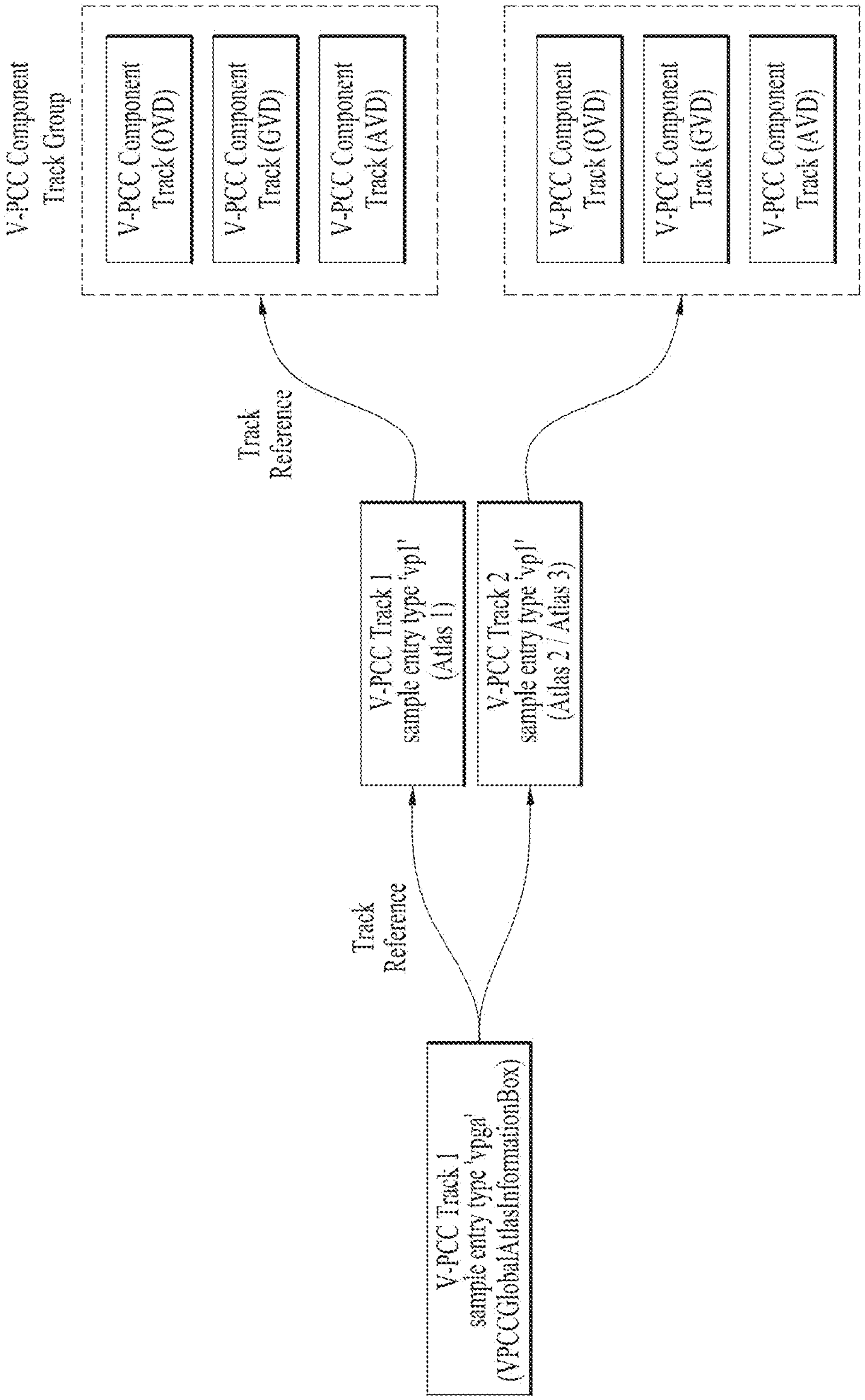
FIG. 51 illustrates file level signaling according to embodiments.

FIG. 51 illustrates file level signaling according to embodiments.

FIG. 51 illustrates an additional file signaling operation, as shown in FIG. 50.

V-PCC main track 1 may have a sample entry type of 'vpga' and contain VPCCGlobalAtlasInformationBox. V-PCC main track 1 may have a track reference relationship with V-PCC track 2 about atlas 1 and/or V-PCC track 3 about atlas 2 or atlas 3. In addition, the V-PCC track 2 and/or V-PCC track 3 may have a reference relationship with a V-PCC component track group.

The method/device according to the embodiments may parse the sample entry of the main track, efficiently access desired point cloud data based on file level signaling of the atlas data and the video component data of the point cloud data as shown in FIGS. 50 and 51, and may process necessary data.

FIG. 52 shows structures of a V-PCC bitstream and a V-PCC file format according to embodiments.

FIG. 52 illustrates a relationship between a bitstream according to FIGS. 25, 26, 31, and the like and a file format according to FIGS. 70 to 72, 47, and the like.

One or more patches of point cloud data are included in an atlas tile group, and the atlas tile group is included in an atlas frame. One atlas may be represented as one atlas frame. According to the configuration of the point cloud data, the atlas tile group may include one patch or multiple patches, and may include one atlas tile group or multiple atlas tile groups. As the object of the point cloud data is projected, one or more atlas tile groups may be included in the atlas frame.

The V-PCC bitstream according to the embodiments encoded by the encoder according to the embodiments may contain a sample stream VPCC unit or a NAL unit (FIGS. 25 and 26).

A unit contained in the bitstream according to the embodiments basically includes a header and a payload.

The header is a V-PCC unit header according to embodiments, and contains atlas ID information that is a target of the unit.

The payload is a V-PCC unit payload according to embodiments, and may contain data contained in the bitstream on a basis of a sample stream NAL unit.

For example, in the case of atlas data, an atlas (sub) bitstream is contained in the payload as shown in FIG. 31.

The NAL unit data includes an atlas sequence parameter set, an atlas frame parameter set, an atlas_tile_group_layer, and SEI.

The atlas frame parameter set (see FIG. 35) includes atlas frame tile information (see FIG. 36, etc.), and includes ID information on the atlas tile groups based on the number of atlas tile groups.

The atlas_tile_group_layer (see FIG. 39, etc.) includes an atlas tile group header (FIG. 39) and atlas tile group data (FIG. 41).

The atlas tile group header contains the address of the atlas tile group header and the type of the atlas tile group header.

The bitstream is encapsulated in a file container by the file encapsulator according to the embodiments. The structure of the file container conforms to the ISO BMFF scheme.

The file according to the embodiments contains AtlasRelationBox according to the embodiments in order to signal an atlas relation.

The AtlasRelationBox includes VPCCAtlasRelationRecord VPCCAtlas, and delivers, as shown in FIG. 44, an atlas ID, the number of atlas tile groups, atlas tile group IDs according to the number of atlas tile groups, track group IDs according to the number of track groups.

The SampleGroupDescriptionBox of the file contains the start number for the NAL units.

The method/device according to the embodiments may process an object of dynamic point cloud data. That is, a signaling method for a bitstream and file format for a dynamic point cloud object is provided.

For example, to support partial access of a dynamic point cloud object, atlas tile group information associated with some data of a V-PCC object included in each spatial region of the point cloud object at the file system level may be provided.

Additionally, an extended signaling scheme for label and/or patch information included in each atlas tile group is provided.

FIGS. 53, 54, and 55 show scene object information according to embodiments.

FIGS. 53, 54, and 55 show scene object information contained in the V-PCC bitstream according to the embodiments of FIGS. 25 and 26.

FIGS. 53 to 58 illustrate information included in a volumetric annotation SEI message contained in a V-PCC bitstream according to embodiments.

An object according to the embodiments is a point cloud object. Furthermore, the object is a concept that includes even (partial) objects that constitute or divide the object.

The methods/devices according to the embodiments may provide partial access on a basis of a 3D spatial region including one or more scene objects based on scene object information according to the embodiments.

SEI messages according to the embodiments include information about processes related to decoding, reconstruction, display, or other purposes.

SEI messages according to the embodiments include two types: essential and non-essential.

Non-essential SEI messages are not required by the decoding process. Decoders are not required to process this information for output order conformance.

Volumetric annotation information (volumetric annotation SEI message) including scene object information, object label information, patch information, and volumetric rectangle information according to embodiments may be a non-essential SEI message.

According to embodiments, the above-mentioned information may be carried in an essential SEI message.

Essential SEI messages are an integral part of the V-PCC bitstream and should not be removed from the bitstream. The essential SEI messages may be categorized into two types:

Type-A essential SEI messages: These SEIs may contain information required to check bitstream conformance and for output timing decoder conformance. The V-PCC decoders according to the embodiments do not discard any relevant Type-A essential SEI messages. The V-PCC decoder according to the embodiments may consider such information for bitstream conformance and for output timing decoder conformance.

Type-B essential SEI messages: V-PCC decoders that conform to a particular reconstruction profile may not discard any relevant Type-B essential SEI messages, and may consider the same for 3D point cloud reconstruction and conformance purposes.

FIG. 46 shows a volumetric annotation SEI message.

The V-PCC bitstream according to the embodiments defines volumetric annotation SEI messages that may be related to partial access as shown in FIG. 46.

soi_cancel_flag equal to 1 indicates that the scene object information SEI message cancels the persistence of any previous scene object information SEI message in output order.

soi_num_object_updates indicates the number of objects that are to be updated by the current SEI.

When soi_num_object_updates is greater than 0, the following elements may be included in the scene object information.

soi_simple_objects_flag equal to 1 indicates that no additional information for an updated or newly introduced object will be signaled. soi_simple_objects_flag equal to 0 indicates that additional information for an updated or newly introduced object may be signaled.

When soi_simple_objects_flag is equal to 0, the following elements may be included in the scene object information.

If soi_simple_objects_flag is not equal to 0, flags may be set as soi_object_label_present_flag=0, soi_priority_present_flag=0, soi_object_hidden_present_flag=0, soi_object_dependency_present_flag=0, soi_visibility_cones_present_flag=0, soi_3d_bounding_box_present_flag=0, soi_collision_shape_present_flag=0, soi_point_style_present_flag=0, soi_material_id_present_flag=0, and soi_extension_present_flag=0.

soi_object_label_present_flag equal to 1 indicates that object label information is present in the current scene object information SEI message. soi_object_label_present_flag equal to 0 indicates that object label information is not present).

soi_priority_present_flag equal to 1 indicates that priority information is present in the current scene object information SEI message. soi_priority_present_flag equal to 0 indicates that priority information is not present.

soi_object_hidden_present_flag equal to 1 indicates that hidden object information is present in the current scene object information SEI message. soi_object_hidden_present_flag equal to 0 indicates that hidden object information is not present.

soi_object_dependency_present_flag equal to 1 indicates that object dependency information is present in the current scene object information SEI message.

soi_object_dependency_present_flag equal to 0 indicates that object dependency information is not present.

soi_visibility_cones_present_flag equal to 1 indicates that visibility cones information is present in the current scene object information SEI message. soi_visibility_cones_present_flag equal to 0 indicates that visibility cones information is not present.

soi_3d_bounding_box_present_flag equal to 1 indicates that 3D bounding box information is present in the current scene object information SEI message.

soi_3d_bounding_box_present_flag equal to 0 indicates that 3D bounding box information is not present.

soi_collision_shape_present_flag equal to 1 indicates that collision information is present in the current scene object information SEI message. soi_collision_shape_present_flag equal to 0 indicates that collision shape information is not present.

soi_point_style_present_flag equal to 1 indicates that point style information is present in the current scene object information SEI message. soi_point_style_present_flag equal to 0 indicates that point style information is not present.

soi_material_id_present_flag equal to 1 indicates that material ID information is present in the current scene object information SEI message. soi_material_id_present_flag equal to 0 indicates that material ID information is not present.

soi_extension_present_flag equal to 1 indicates that additional extension information shall be present in the current scene object information SEI message.

soi_extension_present_flag equal to 0 indicates that additional extension information is not present. It is a requirement of bitstream conformance to this version of the specification that soi_extension_present_flag shall be equal to 0.

When soi_3d_bounding_box_present_flag is equal to 1, the following elements may be included in the scene object information.

soi_3d_bounding_box_scale_log 2 indicates the scale to be applied to the 3D bounding box parameters that may be specified for an object.

soi_3d_bounding_box_precision_minus8 plus 8 indicates the precision of the 3D bounding box parameters that may be specified for an object.

soi_log 2_max_object_idx_updated specifies the number of bits used to signal the value of an object index in the current scene object information SEI message.

When soi_object_dependency_present_flag is equal to 1, the following elements may be included in the scene object information.

soi_log 2_max_object_dependency_idx specifies the number of bits used to signal the value of a dependency object index in the current scene object information SEI message.

The following elements as many as the soi_num_object_updates value may be included in the scene object information.

soi_object_idx[i] indicates the object index of the i-th object to be updated. The number of bits used to represent soi_object_idx[i] is equal to soi_log 2_max_object_idx_updated. When soi_object_idx[i] is not present in the bitstream, its value may be inferred to be equal to 0.

soi_object_cancel_flag[i] equal to 1 indicates that the object with index equal to i may be canceled and that the variable ObjectTracked[i] shall be set to 0. Furthermore, all of its associated parameters, including the object label, 3D bounding box parameters, priority information, hidden flag, dependency information, visibility cones, collision shapes, point style, and material id, may be reset to their default values. shall also be set equal to 0. soi_object_cancel_flag equal to 0 indicates that the object with index equal to soi_object_idx[i] shall be updated with information that follows this element and that that the variable ObjectTracked[i] may be set to 1.

When soi_object_cancel_flag[k] is not equal to 1 and soi_object_label_present_flag is equal to 1, the following element may be included in the scene object information.

soi_object_label_update_flag[i] equal to 1 indicates that object label update information is present for an object with object index i. soi_object_label_update_flag[i] equal to 0 indicates that object label update information is not present.

When soi_object_label_update_flag[k] is equal to 1, the following element may be included in the scene object information.

soi_object_label_idx[i] indicates the label index of an object with index i.

When soi_priority_present_flag is equal to 1, the following element may be included in the scene object information.

soi_priority_update_flag[i] equal to 1 indicates that priority update information is present for an object with object index i. soi_priority_update_flag[i] equal to 0 indicates that object priority information is not present.

When soi_priority_update_flag[k] is equal to 1, the following element may be included in the scene object information.

soi_priority_value[i] indicates the priority of an object with index i. The lower the priority value, the higher the priority.

When soi_object_hidden_present_flag is 1, the following element may be included in the scene object information.

soi_object_hidden_flag[i] equal to 1 indicates that the object with index i shall be hidden. soi_object_hidden_flag[i] equal to 0 indicates that the object with index i shall become present.

When soi_object_dependency_present_flag is equal to 1, the following element may be included in the scene object information.

soi_object_dependency_update_flag[i] equal to 1 indicates that object dependency update information is present for an object with object index i.

soi_object_dependency_update_flag[i] equal to 0 indicates that object dependency update information is not present.

When soi_object_dependency_update_flag[k] is equal to 1, the following element may be included in the scene object information.

soi_object_num_dependencies [i] indicates the number of dependencies of object with index i.

The following element may be included in the scene object information according to the value of soi_object_num_dependencies [k].

soi_object_dependency_idx[i][j] indicates the index of the j-th object that has a dependency with the object with object index i.

When soi_visibility_cones_present_flag is equal to 1, the following element may be included in the scene object information.

soi_visibility_cones_update_flag[i] equal to 1 indicates that visibility cones update information is present for an object with object index i. soi_visibility_cones_update_flag[i] equal to 0 indicates that visibility cones update information is not present.

When soi_visibility_cones_update_flag[k] is equal to 1, the following elements may be included in the scene object information.

soi_direction_x[i] indicates the normalized x-component value of the direction vector for the visibility cone of an object with object index i. The value of soi_direction_x[i], when not present, may be assumed to be equal to 1.0.

soi_direction_y[i] indicates the normalized y-component value of the direction vector for the visibility cone of an object with object index i. The value of soi_direction_y[i], when not present, may be assumed to be equal to 1.0.

soi_direction_z[i] indicates the normalized z-component value of the direction vector for the visibility cone of an object with object index i. The value of soi_direction_z[i], when not present, may be assumed to be equal to 1.0.

soi_angle[i] indicates the angle of the visibility cone along the direction vector in degrees. The value of soi_angle [i], when not present, may be assumed to be equal to 180°.

When soi_3d_bounding_box_present_flag is equal to 1, the following elements may be included in the scene object information.

soi_3d_bounding_box_update_flag[i] equal to 1 indicates that 3D bounding box information is present for an object with object index i. soi_3d_bounding_box_update_flag[i] equal to 0 indicates that 3D bounding box information is not present.

soi_3d_bounding_box_x[i] indicates the x coordinate value of the origin position of the 3D bounding box of an object with index i. The default value of soi_3d_bounding_box_x[i] may be equal to 0.

soi_3d_bounding_box_y[i] indicates the y coordinate value of the origin position of the 3D bounding box of an object with index i. The default value of soi_3d_bounding_box_y[i] may be equal to 0.

soi_3d_bounding_box_z[i] indicates the z coordinate value of the origin position of the 3D bounding box of an object with index i. The default value of soi_3d_bounding_box_z[i] may be equal to 0.

soi_3d_bounding_box_delta_x[i] indicates the size of the bounding box on the x axis of an object with index i. The default value of soi_3d_bounding_box_delta_x[i] may be equal to 0.

soi_3d_bounding_box_delta_y[i] indicates the size of the bounding box on the y axis of an object with index i. The default value of soi_3d_bounding_box_delta_y[i] may be equal to 0.

soi_3d_bounding_box_delta_z[i] indicates the size of the bounding box on the z axis of an object with index i. The default value of soi_3d_bounding_box_delta_z[i] may be equal to 0.

When soi_collision_shape_present_flag is equal to 1, the following elements may be included in the scene object information.

soi_collision_shape_update_flag[i] equal to 1 indicates that collision shape update information is present for an object with object index i. soi_collision_shape_update_flag [i] equal to 0 indicates that collision shape update information is not present.

When soi_collision_shape_update_flag[k]] is equal to 1, the following element may be included in the scene object information.

soi_collision_shape_id[i] indicates the collision shape id of an object with index i.

When soi_point_style_present_flag is equal to 1, the following elements may be included in the scene object information.

soi_point_style_update_flag[i] equal to 1 indicates that point style update information is present for an object with object index i. soi_point_style_update_flag[i] equal to 0 indicates that point style update information is not present.

When soi_point_style_update_flag[k]] is equal to 1, the following elements may be included in the scene object information.

soi_point_shape_id[i] indicates the point shape id of an object with index i. The default value of soi_point_shape_id [i] may be equal to 0.

soi_point_size[i] indicates the point size of an object with index i. The default value of soi_point_size[i] may be equal to 1.

When soi_material_id_present_flag is equal to 1, the following elements may be included in the scene object information.

soi_material_id_update_flag[i] equal to 1 indicates that material ID update information is present for an object with object index i. soi_point_style_update_flag[i] equal to 0 indicates that point style update information is not present.

When soi_material_id_update_flag[k] is equal to 1, the following element may be included in the scene object information.

soi_material_id[i] indicates the material ID of an object with index i. The default value of soi_material_id[i] may be equal to 0.

FIG. 56 shows object label information according to embodiments.

oli_cancel_flag equal to 1 indicates that the object label information SEI message cancels the persistence of any previous object label information SEI message in output order.

When oli_cancel_flag is not equal to 1, the following elements may be included in the object label information.

oli_label_language_present_flag equal to 1 indicates that label language information is present in the object label information SEI message. oli_label_language_present_flag equal to 0 indicates that label language information is not present.

When oli_label_language_present_flag is equal to 1, the following elements may be included in the object label information.

oli_bit_equal_to_zero may be equal to 0.

oli_label_language contains a language tag as specified by IETF RFC 5646 followed by a null termination byte equal to 0x00. The length of the oli_label_language syntax element may be less than or equal to 255 bytes, not including the null termination byte.

oli_num_label_updates indicates the number of labels that are to be updated by the current SEI.

The following elements may be included in the object label information as many as the value of oli_num_label_updates.

oli_label_idx[i] indicates the label index of the i-th label to be updated.

oli_label_cancel_flag equal to 1 indicates that the label with index equal to oli_label_idx[i] shall be canceled and set equal to an empty string. oli_label_cancel_flag equal to 0 indicates that the label with index equal to oli_label_idx[i] shall be updated with information that follows this element.

When oli_label_cancel_flag is not equal to 1, the following elements may be included in the object label information.

oli_bit_equal_to_zero is equal to 0.

oli_label[i] indicates the label of the i-th label. The length of the vti_label[i] syntax element shall be less than or equal to 255 bytes, not including the null termination byte. FIG. 57 shows patch information according to embodiments.

pi_cancel_flag equal to 1 indicates that the patch information SEI message cancels the persistence of any previous patch information SEI message in output order and that all entries in the patch information table shall be removed.

pi_num_tile_group_updates indicates the number of tile groups that are to be updated in the patch information table by the current SEI message.

When pi_num_tile_group_updates is greater than 0, the following elements may be included in the patch information.

pi_log 2_max_object_idx_tracked specifies the number of bits used to signal the value of a tracked object index in the current patch information SEI message.

pi_log 2_max_patch_idx_updated specifies the number of bits used to signal the value of an updated patch index in the current patch information SEI message.

The following elements as many as the pi_num_tile_group_updates value may be included in the patch information.

pi_tile_group_address[i] specifies the tile group address for the i-th updated tile group in the current SEI message.

pi_tile_group_cancel_flag[i] equal to 1 indicates that the tile group with index i shall be reset and all patches previously assigned to this tile group will be removed.

pi_tile_group_cancel_flag[i] equal to 0 indicates that all patches previously assigned to the tile group will index i will be retained.

pi_num_patch_updates[i] indicates the number of patches that are to be updated by the current SEI within the tile group with index i in the patch information table.

The following elements as many as the pi_num_patch_updates value may be included in the patch information.

pi_patch_idx[i][j] indicates the patch index of the j-th patch in tile group with index i that is to be updated in the patch information table. The number of bits used to represent pi_patch_idx[i] is equal to pi_log 2_max_patch_idx_updated. When pi_patch_idx[i] is not present in the bitstream, its value may be inferred to be equal to 0.

pi_patch_cancel_flag[i][j] equal to 1 indicates that the patch with index j in tile group with index i shall be removed from the patch information table.

When pi_patch_cancel_flag[j][p] is not equal to 1, the following elements may be included in the patch information.

pi_patch_number_of_objects_minus1[i][j] indicates the number of objects that are to be associated with the patch with index j in tile group with index i.

m may be set as m=pi_patch_number_of_objects_minus1 [j][p]+1, and the following element as many as the value of m may be included in the patch information.

pi_patch_object_idx[i][j][k] indicates the k-th object index that is associated with the j-th patch in tile group with index i. The number of bits used to represent pi_patch_object_idx[i] may be equal to pi_log 2_max_object_idx_tracked. When pi_patch_object_idx[i] is not present in the bitstream, its value may be inferred to be equal to 0.

FIG. 58 shows volumetric rectangle information according to embodiments.

vri_cancel_flag equal to 1 indicates that the volumetric rectangles information SEI message cancels the persistence of any previous volumetric rectangles information SEI message in output order and that all entries in the volumetric rectangle information table shall be removed.

vri_num_rectangles_updates indicates the number of volumetric rectangles that are to be updated by the current SEI.

When vri_num_rectangles_updates is greater than 0, the following elements may be included in the volumetric rectangle information.

vri_log 2_max_object_idx_tracked specifies the number of bits used to signal the value of a tracked object index in the current volumetric rectangle information SEI message.

vri_log 2_max_rectangle_idx_updated specifies the number of bits used to signal the value of an updated volumetric rectangle index in the current volumetric rectangle information SEI message.

The following elements as many as the value of vri_num_rectangles_updates may be included in the volumetric rectangle information.

vri_rectangle_idx[i]] indicates the i-th volumetric rectangle index that is to be updated in the volumetric rectangle information table. The number of bits used to represent vri_rectangle_idx[i] may be equal to vri_log 2_max_rectangle_idx_updated. When vri_rectangle_idx[i] is not present in the bitstream, its value may be inferred to be equal to 0.

vri_rectangle_cancel_flag[i] equal to 1 indicates that the volumetric rectangle with index i may be removed from the volumetric rectangle information table.

When vri_rectangle_cancel_flag[p] is not equal to 1, the following elements may be included in the volumetric rectangle information.

vri_bounding_box_update_flag[i] equal to 1 indicates that 2D bounding box information for the volumetric rectangle with index i should be updated.

vti_bounding_box_update_flag[i] equal to 0 indicates that 2D bounding box information for the volumetric rectangle with index i should not be updated.

When vri_bounding_box_update_flag[p] is equal to 1, the following elements may be included in the volumetric rectangle information.

vri_bounding_box_top[i] indicates the vertical coordinate value of the top-left position of the bounding box of the i-th volumetric rectangle within the current atlas frame. The default value of vri_bounding_box_top[i] may be equal to 0.

vri_bounding_box_left[i] indicates the horizontal coordinate value of the top-left position of the bounding box of the i-th volumetric rectangle within the current atlas frame. The default value of vri_bounding_box_left[i] may be equal to 0.

vri_bounding_box_width[i] indicates the width of the bounding box of the i-th volumetric rectangle. The default value of vri_bounding_box_width[i] may be equal to 0.

vri_bounding_box_height[i] indicates the height of the bounding box of the i-th volumetric rectangle. The default value of vri_bounding_box_height[i] may be equal to 0.

vri_rectangle_number_of_objects_minus1[i] indicates the number of objects that are to be associated with the i-th volumetric rectangle.

The value of m may be set to vri_rectangle_number_of_objects_minus1[p]+1. For the value of m, the following element may be included in the volumetric rectangle information.

vri_rectangle_object_idx[i][j] indicates the j-th object index that is associated with the i-th volumetric rectangle. The number of bits used to represent vri_rectangle_object_idx[i] may be equal to vri_log 2_max_object_idx_tracked. When vri_rectangle_object_idx[i] is not present in the bitstream, its value may be inferred to be equal to 0.

Figure 59:
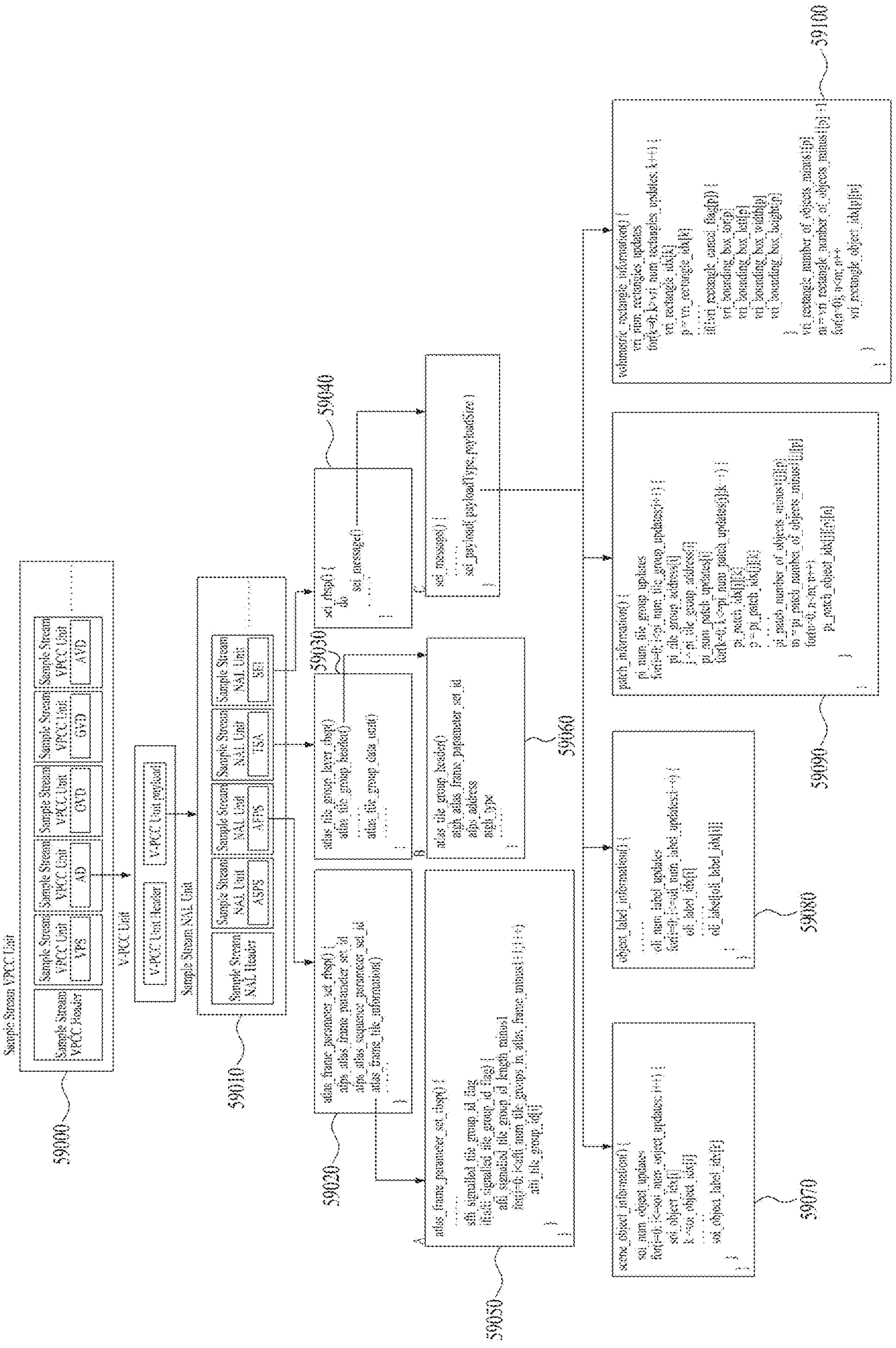
FIG. 59 shows hierarchy of an SEI message in an atlas sub-bitstream according to embodiments.

FIG. 59 shows hierarchy of an SEI message in an atlas sub-bitstream according to embodiments.

The transmission method/device according to the embodiments may generate an atlas sub-bitstream as shown in FIG. 59.

A relationship between the NAL unit data constituting the atlas sub-bitstream is established.

In SEI messages added to the atlas sub-bitstream, information corresponding to volumetric_tiling_info_objects( ) is scene_object_information( ). There are patch_information( ) which may indicate the relationship with objects belonging to respective patches, and volumetric_rectangle_information( ) which may be allocated for one or more objects.

The bitstream 59000 corresponds to the bitstream 25000 of FIG. 25.

The NAL unit 59010, which is contained in the payload of the v-pcc unit contained in the atlas data of the bitstream 59000, corresponds to the bitstream of FIG. 31.

The atlas frame parameter set 59020 of FIG. 59 corresponds to the atlas frame parameter set of FIG. 35.

The atlas tile group (or tile) layer 59030 of FIG. 59 corresponds to the atlas tile group (or tile) layer of FIG. 40.

The SEI message 59040 of FIG. 59 corresponds to the SEI messages of FIG. 31.

The atlas frame tile information 59050 of FIG. 59 corresponds to the atlas frame tile information of FIG. 37.

The atlas tile group (or tile) header 59060 of FIG. 59 corresponds to the atlas tile group (or tile) header of FIG. 39.

The scene object information 59070 of FIG. 59 corresponds to the scene object information of FIGS. 53 to 55.

The object label information 59080 of FIG. 59 corresponds to the object label information of FIG. 56.

The patch information 59090 of FIG. 59 corresponds to the patch information of FIG. 57.

The volumetric rectangle information 59100 of FIG. 59 corresponds to the volumetric rectangle information of FIG. 58.

The atlas frame tile information 59050 may be identified by an atlas tile group (or tile) ID, and may be included in the atlas frame parameter set 59020.

The atlas tile group (or tile) layer 59030 may include an atlas tile group (or tile) header 59060. The atlas tile group (or tile) header may be identified by an atlas tile group (or tile) address.

The scene object information 59070 may be identified by an object index and an object label index.

The object label information 59080 may be identified by a label index.

The patch information 59090 may be identified by a tile group (or tile) address and a patch object index.

The volumetric rectangle information 59100 may be identified by a rectangle object index.

The transmission method/device according to the embodiments may generate a bitstream by encoding point cloud data and generating reference/hierarchical relationship information as shown in FIG. 59.

The reception method/device according to the embodiments may receive a bitstream as shown in FIG. 59 and restore point cloud data contained in the bitstream. In addition, it may efficiently decode and restore point cloud data based on the atlas data of FIG. 59 contained in the bitstream.

Figure 60:
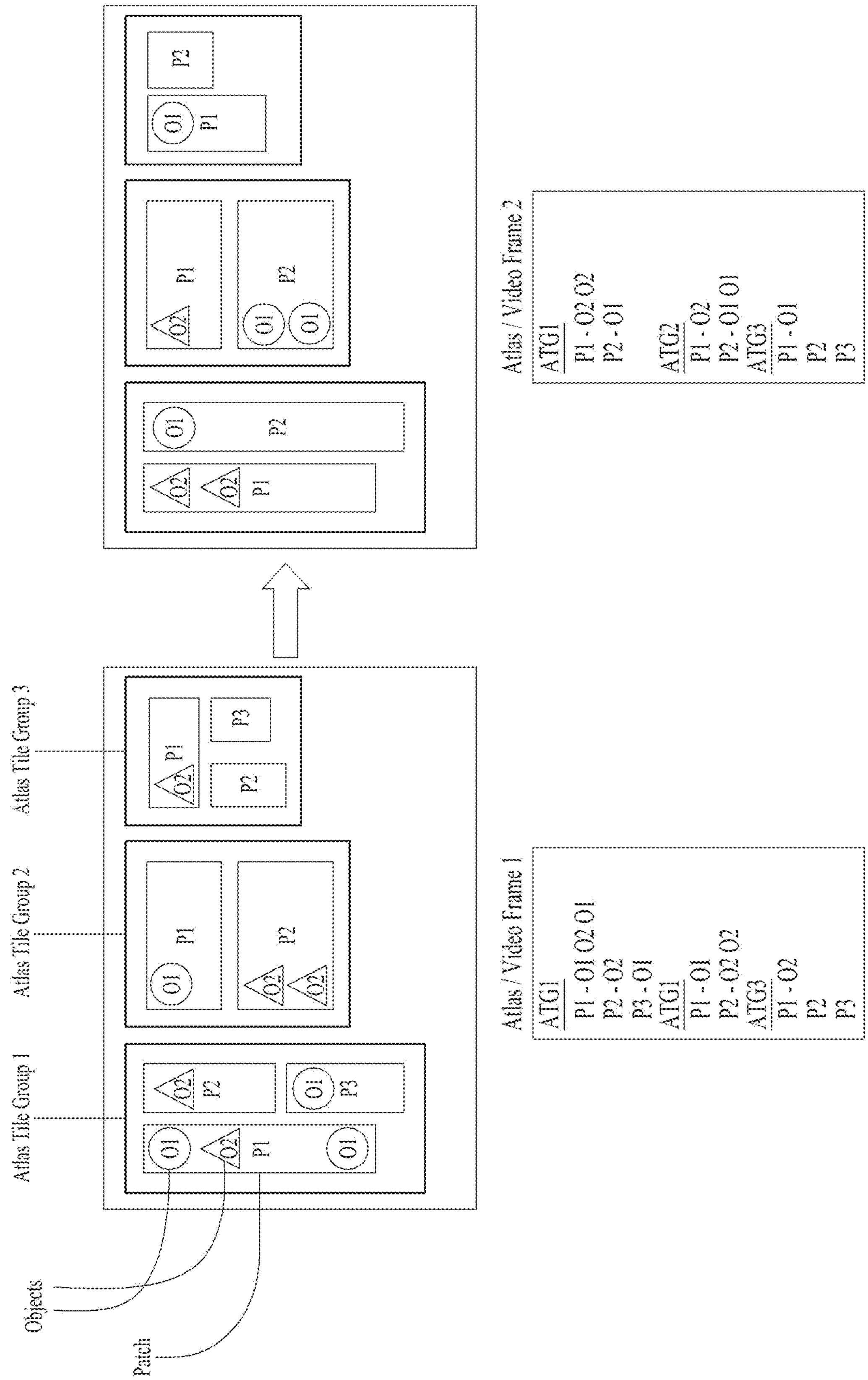
FIG. 60 illustrates a configuration of an atlas tile group (or tile) according to embodiments.

FIG. 60 illustrates a configuration of an atlas tile group (or tile) according to embodiments.

FIG. 60 illustrates a relationship between a video frame, an atlas, a patch, and an object for point cloud data presented and signaled in a bitstream by the methods/devices according to the embodiments.

An atlas frame may be generated and decoded by the metadata processors 18005 and 19002 of the transmission device and reception device according to the embodiments. Thereafter, the atlas bitstream representing the atlas frame may be formed in a format according to embodiments and transmitted/received by the encapsulator/decapsulator 20004, 20005, 21009, 22000 of the transmission device/reception device according to the embodiments.

An object is a target expressed as point cloud data.

According to embodiments, the location and/or size of objects may change dynamically. In this case, a configuration of a changing atlas tile group or atlas tile may be given as shown in FIG. 59.

Patches P1 to P3 may be configured with multiple scene objects O1 to O2 constituting one or more objects. Frame 1 (video frame 1) may be composed of three atlas tile groups.

An atlas tile group according to embodiments may be referred to as an atlas tile. Atlas tile groups 1 to 3 may correspond to atlas tiles 1 to 3.

Atlas tile group 1 may include 3 patches. Patch 1 (P1) may include three objects O1 to O3. Patch 2 (P2) may contain one object (O2). Patch 3 (P3) may contain one object O1.

The methods/devices according to the embodiments may express a mapping relationship between patches and objects based on a field (pi_patch_object_idx[j]) corresponding to an object ID included in the patch information (patch_information( ) in FIG. 57).

Atlas tile group (or tile) 2 may include two patches P1 and P2. Patch 1 (P1) may contain one object O1, and patch 2 (P2) may contain two objects O2.

The methods/devices according to the embodiments may express a mapping relationship based on the field (pi_patch_object_idx[j]) corresponding to an object ID included in the patch information (patch_information in FIG. 57).

Atlas tile group (or tile) 3 may include three patches P1, P2, and P3. Patch 1 (P1) may contain one object O2.

The methods/devices according to the embodiments may indicate a mapping relationship based on the field (pi_patch_object_idx[j]) corresponding to an object ID included in the patch information (patch_information in FIG. 57).

Frame 2 may be composed of three atlas tile groups (or tiles).

Atlas tile group (or tile) 1 (49000) may include two patches P1 and P2. Patch 1 may contain two objects O1 and O2. Patch 2 may contain one object O1.

The methods/devices according to the embodiments may indicate a mapping relationship based on the field (pi_patch_object_idx[j]) corresponding to an object ID included in the patch information (patch_information in FIG. 57).

Atlas tile group (or tile) 2 (49000) may include two patches P1 and P2. Patch 1 (P1) may contain one object (O2). Patch 2 (P1) may contain two objects.

The methods/devices according to the embodiments may indicate a mapping relationship based on the field (pi_patch_object_idx[j]) corresponding to an object ID included in the patch information (patch_information in FIG. 57).

Atlas tile group (or tile) 3 may include two patches P1 and P2. Patch 1 (P1) may contain one object O1.

The methods/devices according to the embodiments may indicate a mapping relationship based on the field (pi_patch_object_idx[j]) corresponding to an object ID included in the patch information (patch_information in FIG. 57).

A structure of data generated and transmitted/received by a V-PCC (V3C) system included in or connected to the point cloud data transmission/reception method/device according to embodiments will be described.

The methods/devices according to the corresponding embodiments may generate a file, and generate and transmit/receive the following data in the file.

The transmission method/device according to the embodiments may generate and transmit the following data structures based on a bitstream containing encoded point cloud data, and the reception method/device according to the embodiments may receive and parse the following data structures, and restore the point cloud data contained in the bitstream.

FIG. 61 shows a VPCC spatial regions box according to embodiments.

A file generated and transmitted/received by the point cloud data transmission/reception device according to the embodiments and a system included in or connected to the transmission/reception device include a VPCC Spatial Regions Box.

This box may contain information such as 3D bounding box information about VPCC spatial regions and label information related to the spatial regions, an atlas type group ID (or atlas tile ID), and a patch ID that may be included in an atlas tile group (or tile).

In addition, this box may contain V-PCC component track group information related to the spatial regions. The V-PCC spatial regions box may be included in the sample entry of the V-PCC track.

FIGS. 61 and 62 show common data structures that may be included in a track of a file (or item) according to embodiments, and are included in the track.

FIG. 61 shows signaling information for processing a spatial region of point cloud data.

3d_region_id is an identifier for the spatial region.

x, y, and z specify the x, y, and z coordinate values, respectively, of a 3D point in the coordinate system.

cuboid_dx, cuboid_dy, and cuboid_dz indicate the dimensions of the cuboid sub-region in the coordinate system along the x, y, and z axes, respectively, relative to an anchor point.

An anchor is a 3D point in the coordinate system used as the anchor for the 3D spatial region.

dimensions_included_flag is a flag that indicates whether the dimensions of the spatial region are signaled.

According to the embodiments, methods/devices may process a sub-region of the point cloud based on the information of FIG. 61, and the reception device may provide partial access to the point cloud.

FIG. 62 shows a VPCC spatial regions box according to embodiments.

num_atlas indicates the number of atlases associated with spatial regions indicated by 3DSpatialRegionStruct.

atlas_id is an identifier of the associated atlas sub-bitstream.

num_regions indicates the number of 3D spatial regions in the point cloud.

num_region_tile_groups may indicate the number of atlas tile groups in an atlas substream associated with some data of the V-PCC object included in the spatial region.

atlas tile group may be interpreted as the same meaning of atlas tile in accordance with some embodiments. In accordance with embodiments, atlas tile group and atlas tile has the same meaning and are compatible with each other.

region_tile_group_id may indicate the id of an atlas tile group in an atlas substream associated with some data of a V-PCC object included in the spatial region.

num_patch_updates may indicate the number of patches belonging to an atlas tile group associated with some data of the V-PCC object included in the corresponding spatial region among the patches of each atlas tile group.

patch_id may indicate patch ids of patches belonging to the atlas tile group associated with some data of the V-PCC object included in the corresponding spatial region among the patches of each atlas tile group.

num_track_groups indicates the number of track groups associated with a 3D spatial region. A track in accordance with embodiments indicates a track carrying a V-PCC component.

track_group_id indicates the track group of tracks which carry the V-PCC components for the associated 3D spatial region.

label_id may indicate a label id related to an atlas tile group associated with some data of a V-PCC object included in a corresponding spatial region.

label_language may indicate language information about a label related to an atlas tile group associated with some data of a V-PCC object included in a corresponding spatial region.

label_name may indicate label name information related to an atlas tile group associated with some data of a V-PCC object included in a corresponding spatial region.

The method/device according to the embodiments may include a dynamic spatial region sample group for signaling a dynamic spatial region in a file.

The 'dysr' grouping_type for sample grouping represents the assignment of samples in a V-PCC track to spatial region box carried in this sample group. When SampleToGroupBox with grouping_type equal to 'dysr' is present, SampleGroupDescriptionBox with the same grouping type is present, and contains the ID of this group to which the samples belong.

A V-PCC track may contain SampleToGroupBox with grouping_type equal to 'dysr'. aligned (8) class Dynamic3DspatialRegionSampleGroupDescriptionEntry( ) extends

```
SampleGroupDescriptionEntry('dysr') {
        VPCCSpatialRegionsBox( );
}
```

The methods/devices according to the embodiments may generate a timed metadata track and transmit/receive based on a file (or item) container.

According to embodiments, the dynamic spatial region may be added by configuring a timed metadata track as follows.

If the V-PCC track has an associated timed-metadata track with a sample entry type 'dysr', spatial regions defined for the point cloud stream carried by the V-PCC track may be dynamic regions.

The associated timed-metadata track may contain a 'cdsc' track reference to the V-PCC track carrying the atlas stream.

The method/device according to the embodiments may generate the following information in the sample entry for the dynamic spatial region.

Sample Entry

```
aligned(8) class DynamicSpatialRegionSampleEntry extends
MetaDataSampleEntry('dysr') {
    VPCCSpatialRegionsBox( );
}
```

Sample Format

```
aligned(8) class DynamicSpatialRegionSample( ) {
    unsigned int(16) num_regions;
    for(i=0; i<num_regions; i++) {
        3DspatialRegionStruct(1);
        LabelInfoStruct( );
```

-continued

```
unsigned int(16) num_atlas;
    for(m=0; m< num_atlas ; m++)
{
    unsigned int(16) atlas_id;
        unsigned int(16) num_region_tile_groups;
        for (k=0; k < num_region_tile_groups; k++) {
            unsigned int(16) region_tile_group_id;
                unsigned int(8) num_patch_updates;
            for (p=0; p < num_patch_updates; p++)
                unsigned int(16) patch_id;
        }
}
        unsigned int(8) num_track_groups;
        for (j=0; j < num_track_groups; j++) {
            unsigned int(32) track_group_id;
        }
    }
}
```

In order to process the spatial region, an atlas ID may indicate one or more atlases associated with each region.

A track of a file in accordance with embodiments may include spatial region information including one or more atlas tile identifier information for a spatial region of point cloud data.

Figure 63:
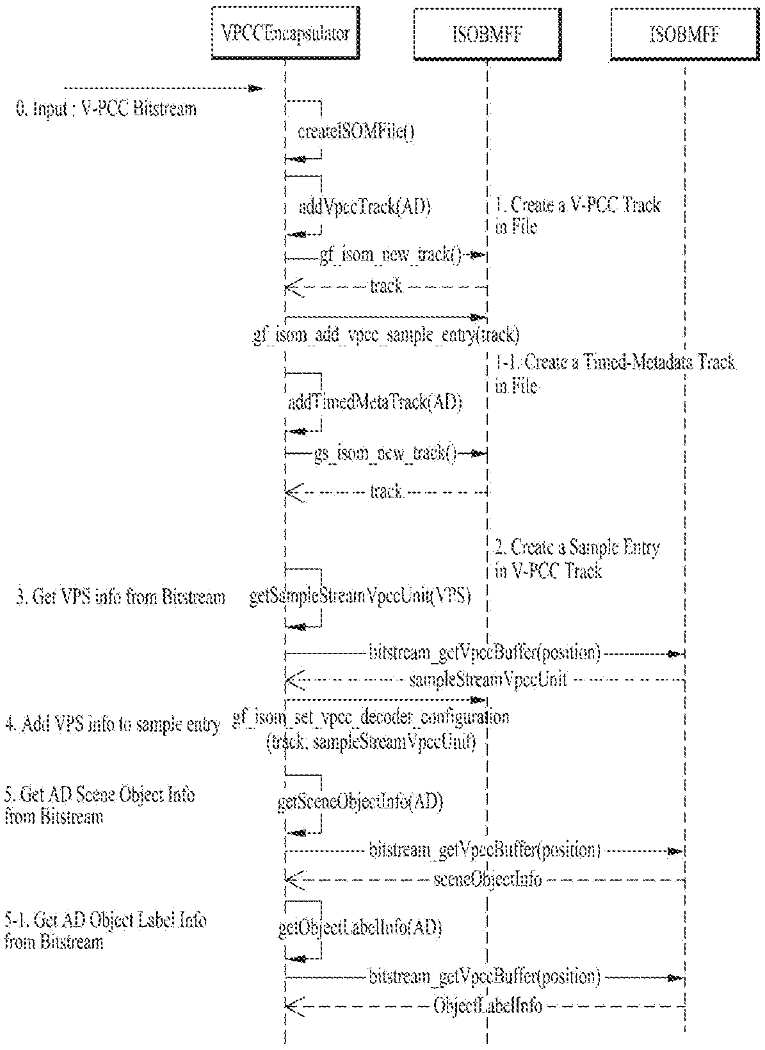
FIGS. 63, 64, and 65 are flowcharts illustrating file encapsulation according to embodiments.
Figure 64:
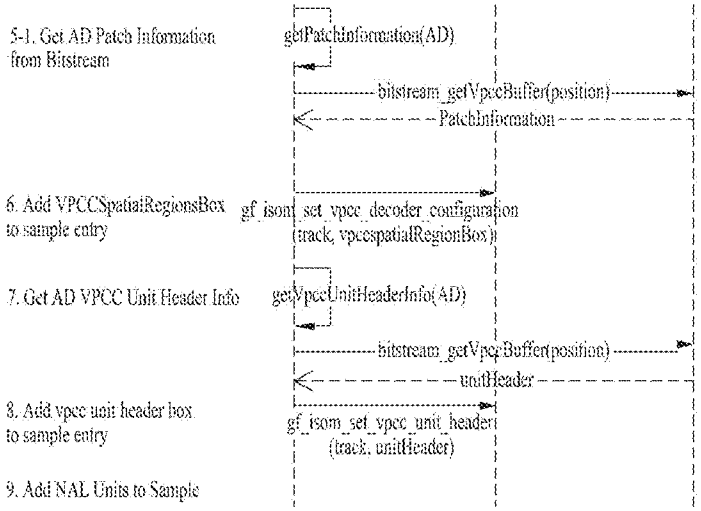
Figure 65:
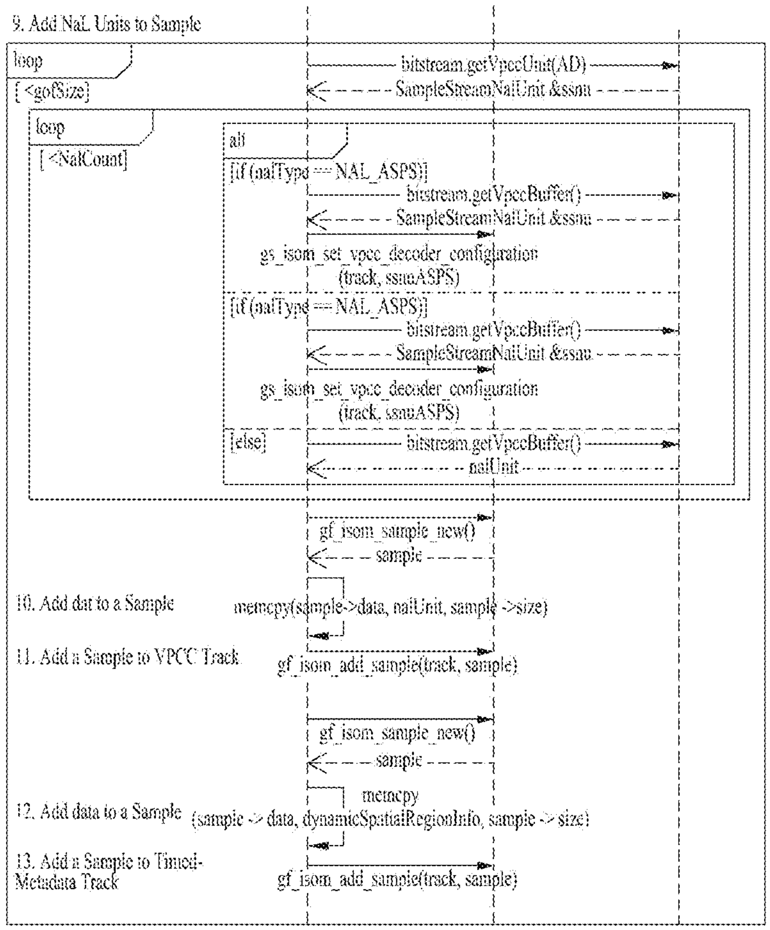

FIGS. 63, 64, and 65 are flowcharts illustrating file encapsulation according to embodiments.

FIGS. 64 and 65 illustrate the operation of the file encapsulators 10003, 20004, and 21009.

The point cloud data transmission device and the encapsulator according to the embodiments may configure a V-PCC bitstream in the isobmff file format, and create a box structure necessary for encoding in the isobmff file format. The transmitter may transmit the generated data.

In addition, the point cloud data transmission device according to the embodiments, for example, the file/segment encapsulator, etc. may create and transmit the aforementioned VPCC spatial regions box.

0. The encapsulator receives a V-PCC encoded bitstream (FIGS. 25 and 26).

1. The encapsulator may create a V-PCC track in ISOBMFF file.

1-1. The encapsulator may create a timed-metadata track for a dynamic spatial region.

2. A sample entry may be created in the V-PCC track created in operation 1 above.

3. The encapsulator may acquire VPS (VPCC Parameter Set) information from the input bitstream (FIGS. 25 and 26).

4. The encapsulator may add the VPS information to the sample entry.

5. The encapsulator may acquire atlas scene object information (FIG. 53 or the like) from the input bitstream (FIGS. 25 and 26).

5-1. The encapsulator may acquire atlas object label information (FIG. 56) from the input bitstream (FIGS. 25 and 26).

5-2. The encapsulator may acquire atlas patch information (FIG. 57) from the input bitstream (FIGS. 25 and 26).

6. The encapsulator may generate a VPCCSpatialRegionsBox structure (FIG. 61, etc.) according to embodiments suitable for the point cloud system file format based on the atlas volumetric tiling information (FIG. 36, FIG. 39, FIG. 41, FIG. 57, etc.) and add the same to the sample entry.

Also, for the dynamic spatial region, the VPCCSpatialRegionsBox structure may be added to the sample entry of the timed-metadata track.

7. The encapsulator may acquire atlas VPCC unit header info (FIG. 26, etc.) from the input bitstream.

8. The encapsulator may add VPCC unit header info to the sample entry.

9. The encapsulator may add atlas NAL unit data (FIG. 31, etc.) to a sample entry or sample according to nalType.

10. The encapsulator may add data except for NAL_ASPS or NAL_XXXX_SEI, which is an atlas NAL unit data type to a sample.

11. The encapsulator may add the sample created in operation 10 above to the V-PCC track.

12. The encapsulator may add DynamicSpatialRegionSample according to embodiments for the dynamic spatial region to a sample of the timed-metadata track.

Figure 66:
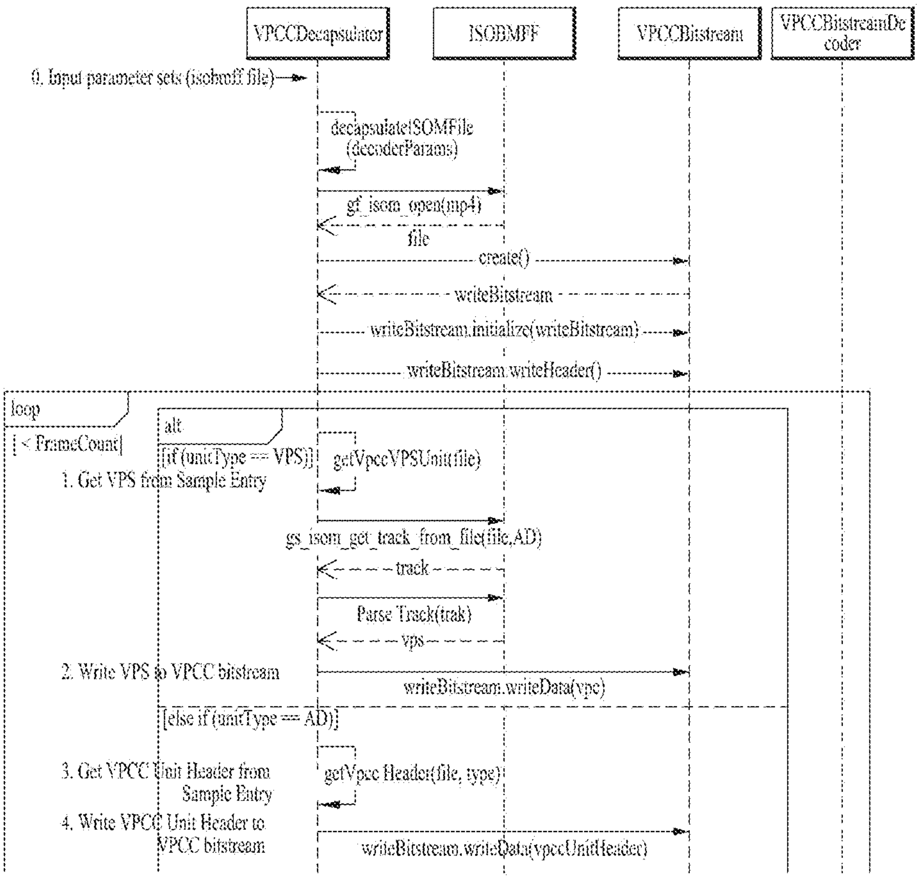
FIGS. 66 and 67 are flowcharts illustrating an operation of a file decapsulator according to embodiments.
Figure 67:
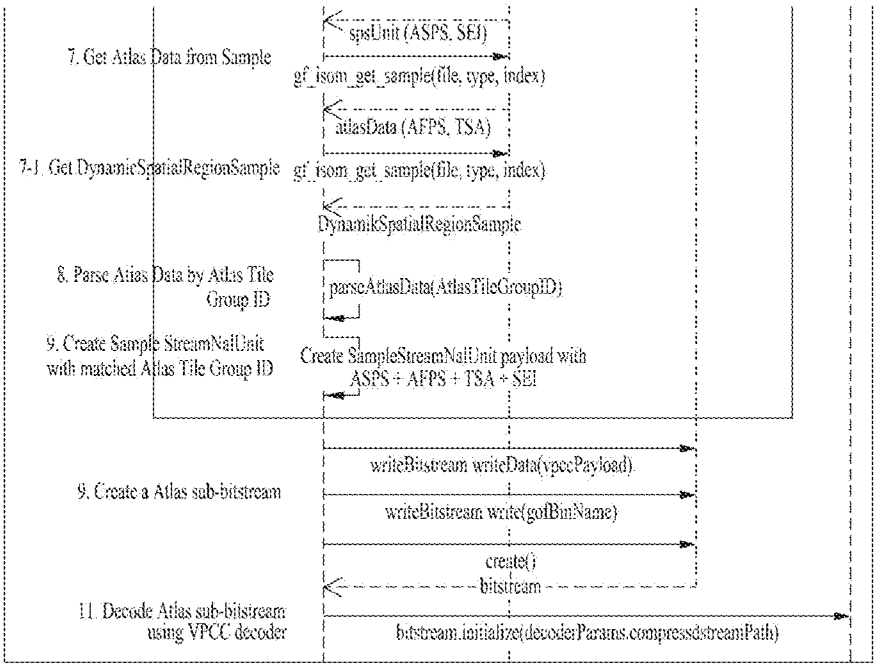

FIGS. 66 and 67 are flowcharts illustrating an operation of a file decapsulator according to embodiments.

The point cloud data reception device according to the embodiments may include a receiver and/or a file/segment decapsulator (which may be referred to as a decapsulator). The receiver may receive point cloud data (in the V-PCC isobmff file format). The decapsulator may decapsulate the V-PCC isobmff file into a V-PCC bitstream, and may parse a box structure or the like required for decoding thereof. The reception device may further include a decoder. The decoder may decode the V-PCC bitstream.

In addition, the point cloud data reception device according to the embodiments, for example, the file/segment decapsulator and the like may receive and parse the VPCC spatial regions box according to the embodiments.

0. The decapsulator receives a file encapsulated in V-PCC Isobmff.

1. The decapsulator may acquire VPS (V-PCC Parameter Set) information from the sample entry of the input isobmff file.

2. The decapsulator may configure the VPS information acquired in operation 1 above in the form of a V-PCC bitstream.

3. The decapsulator may acquire V-PCC unit header information from the sample entry of the input isobmff file.

4. The decapsulator may configure the V-PCC unit header information acquired in operation 3 above in the form of a V-PCC bitstream.

5. The decapsulator may acquire VPCCSpatialRegionsBox information from the sample entry of the input isobmff file. In addition, VPCCSpatialRegionsBox information may be acquired from the sample entry of the timed-metadata track for a dynamic spatial region.

6. The decapsulator may acquire V-PCC configuration information from the sample entry of the input isobmff file. The V-PCC configuration information includes VPS and atlas data in which NAL unit type is NAL_ASPS or NAL_XXXX_SEI.

7. The decapsulator may acquire atlas data such having the NAL unit type such as TSA from the sample of the input isobmff file.

7-1. The decapsulator may acquire DynamicSpatialRegionSample information from a sample of the timed-metadata track for the dynamic spatial region.

8. The decapsulator may parse only data having the matching afti_tile_group_id and atgh_address among the atlas data acquired in operation 7, based on vti_object_tile_group_id acquired in operation 5 above.

9. The decapsulator may configure SampleStreamNalUnit data constituting the V-PCC atlas sub-bitstream using the atlas data acquired in operations 6 to 8 above.

10. The decapsulator may configure a V-PCC atlas sub-bitstream for V-PCC bitstream decoding.

11. The decapsulator may acquire an atlas tile group and patch data for reconstructing a point cloud by parsing the V-PCC atlas sub-bitstream generated in operation 10 above through VPCCBitstreamDecoder.

Figure 68:
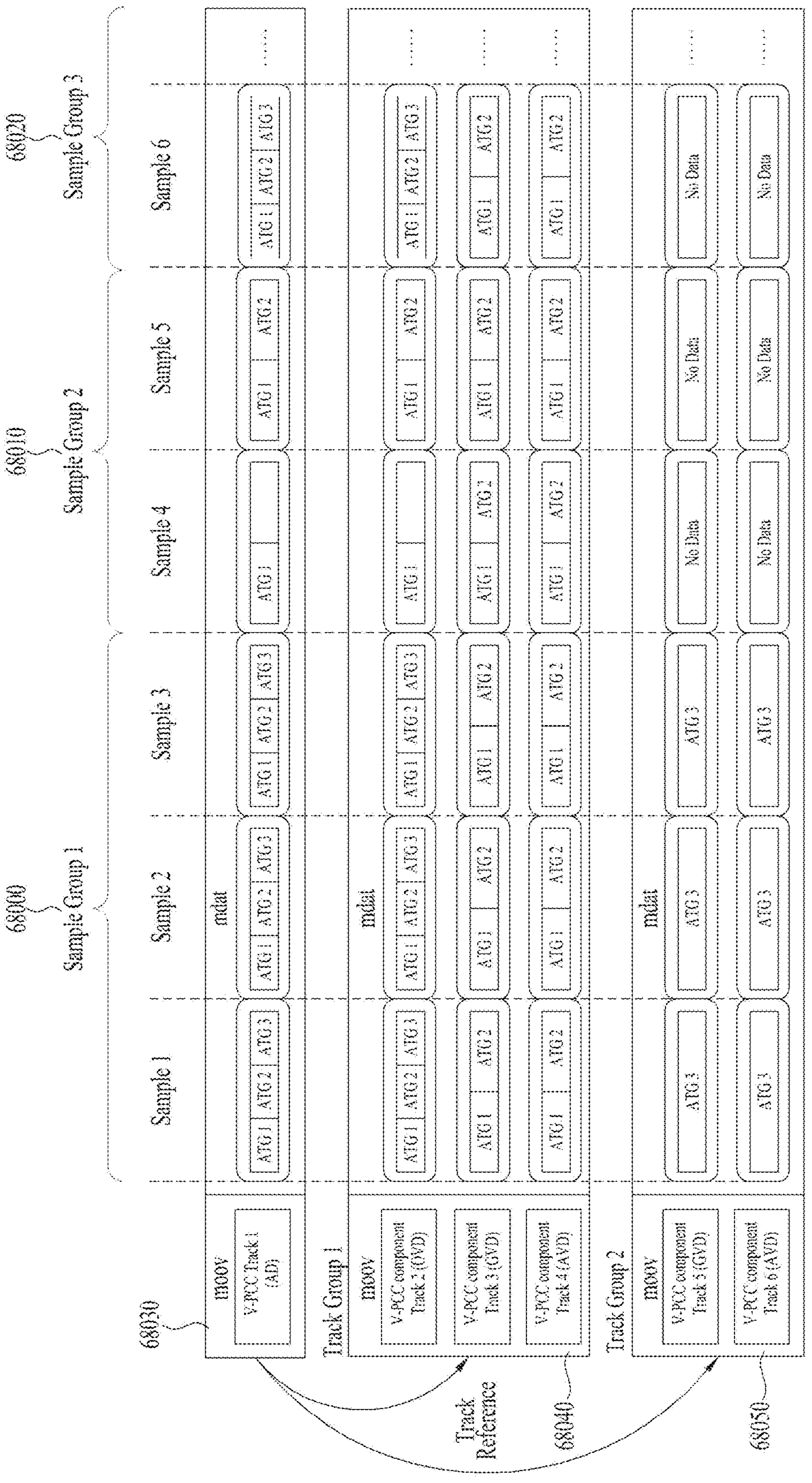
FIG. 68 illustrates file level signaling according to embodiments.

FIG. 68 illustrates file level signaling according to embodiments.

The point cloud data transmission/reception method/device and the system included in the transmission/reception device according to the embodiments may create and transmit/receive a file in a structure as shown in FIG. 68.

The point cloud data transmission/reception method/device and the system included in the transmission/reception device according to the embodiments may signal data at the file level as follows.

Signaling information, metadata, parameters, etc. according to embodiments may be contained in the sample entry of the V-PCC track (or V3C track) 68030, and may be transmitted/received in the sample entry and the sample of the timed metadata track.

The V-PCC bitstream composed of a plurality of atlas tile groups (or atlas tiles) for partial access may be encapsulated by the encapsulator in a file format structure as shown in FIG. 68. Sample group 1 55900 may have three atlas tile groups (corresponding to atlas tiles) (ATG1 to ATG3, or AT1 to AT3).

Sample group 2 (68010) may have two atlas tile groups (or atlas tiles) due to changes in the position and/or size of spatial regions (ATG1 and ATG2, or AT1 and AT2).

Sample group 3 (68020) may be composed of the same or different atlas tile groups (or atlas tiles).

The file may contain a moov box and a mdat box. The moov box and the mdat box may be referred to as tracks. When the type of the v-pcc track 68030 is atlas data AD, the mdat box containing an atlas tile corresponding to a sample may be positioned behind the moov box.

When there are multiple tracks in a file, grouping between tracks may be performed.

A track containing OVD, a track containing GVD, and a track containing AVD may be grouped into track group 1 (68040).

A track containing GVD and a track containing AVD may be grouped into track group 2 (68050).

Referencing may be performed between tracks related to the file.

Track 1 (68030) may reference group 1 (68040) and group 2 (68050).

Figure 69:
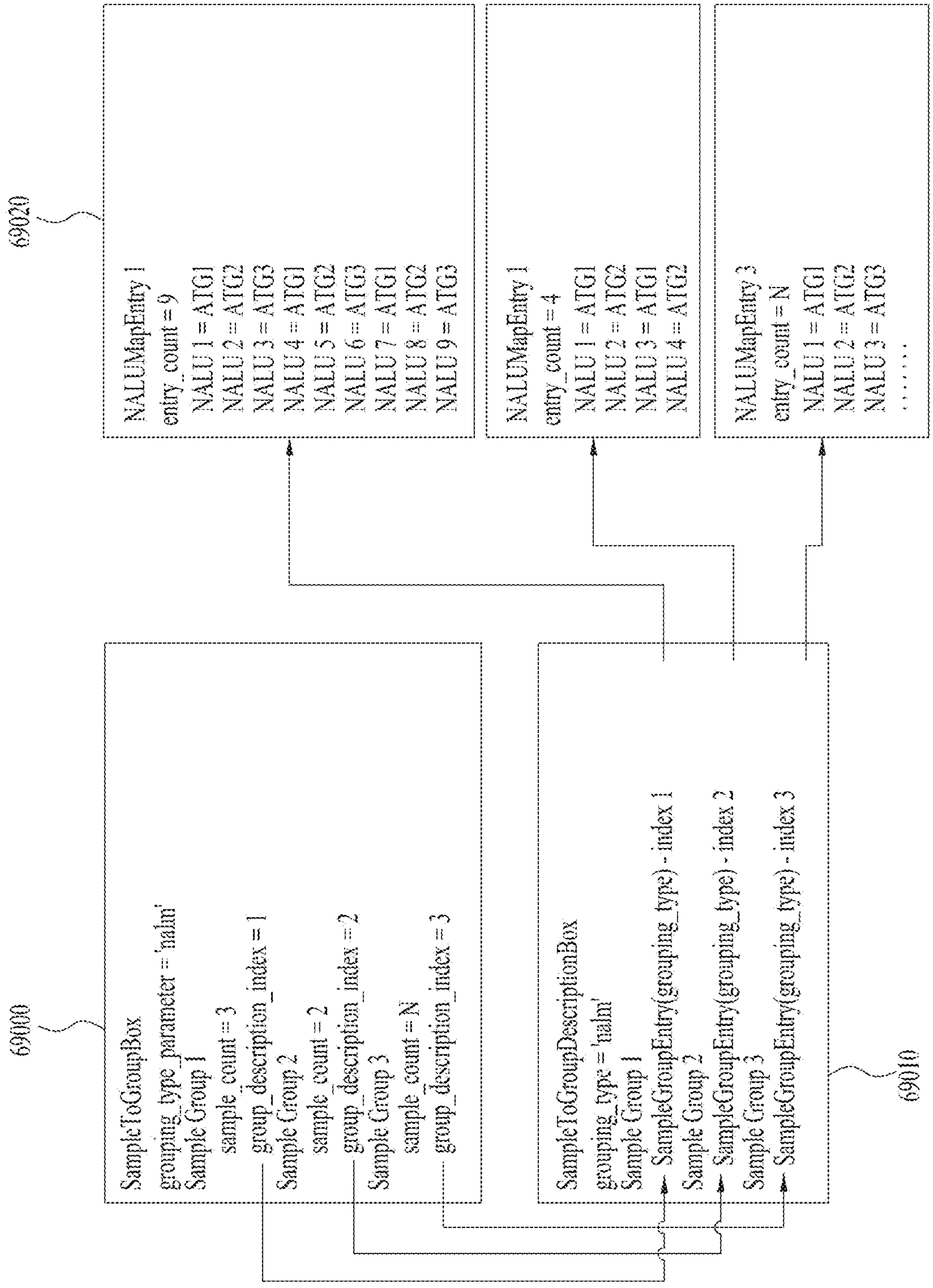
FIG. 69 illustrates file level signaling according to embodiments.

FIG. 69 illustrates file level signaling according to embodiments.

The method/device according to the embodiments may generate a NALUMapEntry as a SampleGroupEntry of SampleGroupDescription.

An atlas_tile_group_id (or atlas_tile_id) may be assigned to each atlas NAL unit. The point cloud receiver may aggregate only atlas NAL units corresponding to the respective spatial regions according to the atlas_tile_group_id (or atlas_tile_id).

As shown in FIG. 69, the method/device according to the embodiments may create a link relationship between sampletogroupbox and NALUMapEntry. Both sampletogroupbox and NALUMapEntry may be contained in the sample entry in the moov box.

NALUMapEntry according to the embodiments may be defined as specified in ISO/IEC 14496-15 [14496-15].

NALUMapEntry may be present in the V-PCC track when VPCCSpatialRegionsBox is present.

The NALUMapEntry may be used to assign a groupID to each atlas NAL unit.

The NALUMapEntry may or may not be linked to a sample group description setting the grouping_type_parameter of the SampleToGroupBox of type 'nalm'.

A SampleToGroupBox of type 'nalm' may or may not use version 0 of the box.

The V-PCC track according to the embodiments may contain SampleToGroupBox 58000.

The SampleToGroupBox 69000 may contain the grouping_type_parameter having the value of nalm, and contain a plurality of sample groups.

Sample group 1 (68000), for example, when configured as shown in FIG. 69, has sample_count set to 3 and includes samples 1 to 3. In this case, the sample description index may be 1.

Sample group 2 (69010) has sample_count set to 2, and may include sample 1 and sample 2 as shown in FIG. 57. In this case, the sample description index is 2.

Sample group 3 (69020) has sample_count set to N and may include N samples. In this case, the sample description index is 3.

The V-PCC track according to the embodiments may contain a SampleGroupDescriptionBox 69010.

The SampleGroupDescriptionBox 69010 may contain additional information about the SampleToGroupBox. The grouping type is 'nalm', and file level signaling information may be provided for each sample group through a sample group entry.

NALUMapEntry 1 (69020) may provide configuration information about sample group 1 (69000).

For example, when the configuration as shown in FIG. 57 is signaled, NALUMapEntry 1 (69020) may have 9 entries in total.

The NALUMapEntry may represent an atlas tile group (or atlas tile) included in NALUs 1-9 contained in the track related to sample group 1.

For example, NALUMapEntry 1 (69020) informs that NALU 1 is mapped to atlas tile group 1. Similarly, it informs that NALU 2 to 9 are matched with atlas tile groups 2 to 9, respectively.

The methods/devices according to the embodiments may provide the following effects.

For example, a transmitter or receiver for providing a point cloud content service may configure a V-PCC bitstream and efficiently store a file.

V-PCC bitstreams may be effectively multiplexed. Efficient access to the bitstream may be supported on a V-PCC unit basis at the receiving side. The atlas stream of the V-PCC bitstream may be effective stored and transmitted in tracks in the file. Efficient signaling of the atlas may enable the reception device to perform efficient processing and partial access of point cloud data.

SEI messages/information for data processing and rendering in the V-PCC bitstream may be effectively stored and transmitted in a file.

The point cloud compression processing device, transmitter, receiver, point cloud player, encoder or decoder provides these effects.

The data representation/storage/signaling/encoding method according to embodiments may enable efficient access to a point cloud bitstream. In addition, it may enable effective access to the information necessary for data processing and rendering of the point cloud bitstream.

The transmitter or receiver according to the embodiments may efficiently store and transmit the file of the point cloud bitstream through a technique and signaling for partitioning and storing the V-PCC bitstream into one or more tracks in a file, signaling for indicating the relationship between the stored V-PCC bitstream and multiple tracks, and identification of alternative V-PCC tracks stored in the file, and the like.

FIG. 70 shows an encapsulated V-PCC data container structure according to embodiments.

The point cloud video encoder 10002 of the transmission device 10000 of FIG. 1, the encoders of FIGS. 4 and 15, the transmission device of FIG. 18, the video/image encoders 20002 and 20003 of FIG. 29, the processor and the encoders 21000 to 21008 of FIG. 21, and the XR device 2330 of FIG. 23 generate a bitstream containing point cloud data according to embodiments.

The file/segment encapsulator 10003 of FIG. 1, the file/segment encapsulator 20004 of FIG. 20, the file/segment encapsulator 21009 of FIG. 21, and the XR device of FIG. 23 format the bitstream in the file structure of FIGS. 24 and 25.

Similarly, the file/segment decapsulation module 10007 of the reception device 10005 of FIG. 1, the file/segment decapsulators 20005, 21009, and 22000 of FIGS. 20 to 23, and the XR device 2330 of FIG. 23 receive and decapsulate a file and parse the bitstream. The bitstream is decoded by the point cloud video decoder 10008 of FIG. 1, the decoders of FIGS. 16 and 17, the reception device of FIG. 19, the video/image decoders 20006, 21007, 21008, 22001, and 22002 of FIGS. 20 to 23, and the XR device 2330 of FIG. 23 to restore the point cloud data.

FIGS. 70 and 71 show the structure of a point cloud data container according to the ISOBMFF file format.

FIGS. 70 and 71 show the structure of a container for delivering point clouds based on multiple tracks.

The methods/devices according to the embodiments may transmit/receive a container file in which point cloud data and additional data related to the point cloud data are included based on multiple tracks.

Track-1 70000 is an attribute track, and may contain attribute data 70040 encoded as illustrated in FIGS. 1, 4, 15, 18, and the like.

Track-2 70010 is an occupancy track, and may contain geometry data 70050 encoded as illustrated in FIGS. 1, 4, 15, 18, and the like.

Track-3 70020 is a geometry track, and may contain occupancy data 70060 encoded as illustrated in FIGS. 1, 4, 15, 18, and the like.

Track-4 70030 is a v-pcc (v3c) track, and may contain an atlas bitstream 27070 containing data related to point cloud data.

Each track is composed of a sample entry and a sample. The sample is a unit corresponding to a frame. In order to decode the N-th frame, a sample or sample entry corresponding to the N-th frame is required. The sample entry may contain information describing the sample.

FIG. 71 shows a structure of a file according to embodiments.

The v3c track 71000 corresponds to track-4 70030. Data contained in the v3c track 71000 may have a format of a data container referred to as a box. The v3c track 71000 contains reference information about the V3C component tracks 71010 to 71030.

The reception method/device according to the embodiments may receive a container (which may be referred to as a file) containing point cloud data as shown in FIG. 71 and parse the V3C track, and may decode and reconstruct occupancy data, geometry data, and attribute data based on the reference information contained in the V3C track.

The occupancy track 71010 corresponds to track-2 70010 and contains occupancy data. The geometry track 71020 corresponds to track-3 70020 and contains geometry data. The attribute track 71030 corresponds to track-1 70000 and contains attribute data.

FIG. 72 shows tracks according to the embodiments.

The file according to the embodiments may contain one or more tracks as shown in FIG. 72.

Track 1 is an atlas track and may carry an atlas bitstream. Track 1 is an entry point and serves as an entry point for point cloud data in the file.

When there are multiple tracks, Track 1 has a track reference. For example, based on v3v0 (occupancy data), v3va (attribute data), and v3vg (geometry data), access to each point cloud data may be performed.

Track 1 may include a sample entry and samples. The sample entry is V3C configuration information according to embodiments, and may include parameter sets and SEI information. The sample may contain atlas data.

Track 2 is a video component track carrying a geometry bitstream. Track 2 contains a sample entry and samples. The sample entry is video configuration information, and may include parameter sets, SEI information and include a V3C unit header. The samples may carry geometry data.

Track 3 is a video component track carrying an attribute bitstream. Track 3 contains a sample entry and samples. The sample entry is video configuration information, and may include parameter sets and SEI information, and include a V3C unit header. The samples may carry attribute data.

Track 4 is a video component track carrying an occupancy bitstream. Track 4 contains a sample entry and samples. The sample entry is video configuration information, and may include parameter sets and SEI information, and include a V3C unit header. The samples may carry occupancy data.

The methods/devices according to the embodiments may transmit and receive volumetric visual data for point cloud data according to the embodiments based on the tracks of FIG. 72.

Figure 73:
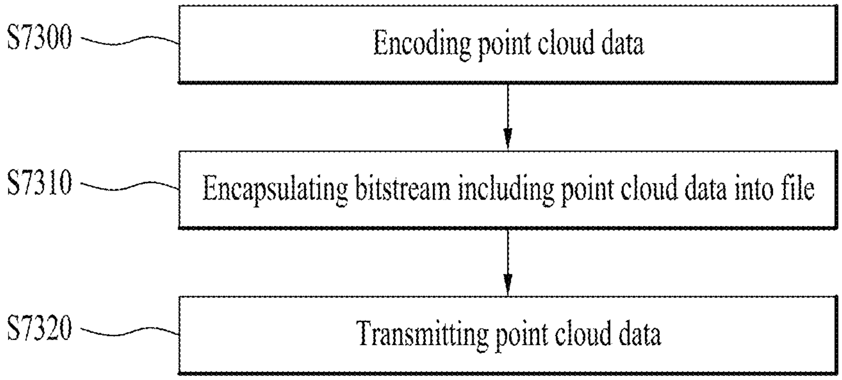
FIG. 73 illustrates a method of transmitting point cloud data according to embodiments.

FIG. 73 illustrates a method of transmitting point cloud data according to embodiments.

S7300: the point cloud data transmission method according to the embodiments may include encoding the point cloud data.

The encoding operation according to the embodiments is performed as described above regarding the transmission device 10000 of FIG. 1, the encoding process of FIG. 4, the operation of the encoder of FIG. 15, the transmission device of FIG. 18, the encoding (20001, 20002, 20003) of FIG. 20, preprocessing encoding (21001 to 21008) of FIG. 21, the operation of the device of FIG. 23, generation of bitstreams of FIGS. 25, 26, 59, and the like.

S7310: the point cloud data transmission method according to the embodiments may further include encapsulating a bitstream containing the point cloud data into a file.

The encapsulation operation according to the embodiments is performed as described above regarding the operations of the file/segment encapsulator 10003 of FIG. 1, the file/segment encapsulator 20004 of FIG. 20, and the file/segment encapsulator 21009 of FIG. 21, the device of FIG. 23, file generation in FIGS. 52 and 68 to 72, and the like.

S7320: the point cloud data transmission method according to the embodiments may further include transmitting the point cloud data.

The transmission operation according to the embodiments is the same as described above regarding the operation of the transmitter 10004 of FIG. 1 and the like.

Figure 74:
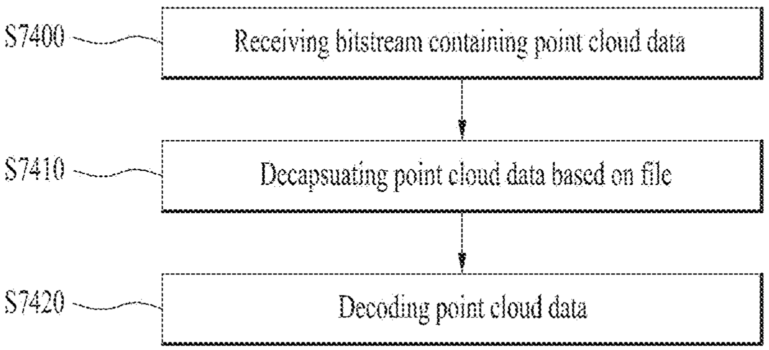
FIG. 74 illustrates a method of receiving point cloud data according to embodiments.

FIG. 74 illustrates a method of receiving point cloud data according to embodiments.

S7400: the method of receiving point cloud data according to the embodiments may include receiving a bitstream containing point cloud data.

The reception operation according to the embodiments is the same as described above regarding the operation of the reception device 10005 of FIG. 1, the reception device of FIGS. 20, 22, and 23, and the like.

S7410: the method of receiving point cloud data according to the embodiments may further include decapsulating the point cloud data based on the file.

The decapsulation operation according to the embodiments is performed as described above regarding the operation of the file/segment decapsulator 10007 of FIG. 1, the file/segment decapsulator 20005 of FIG. 20, the file/segment decapsulator 22000 of FIG. 22, and the parsing of the container structure of FIGS. 70 to 72.

S7420: the method of receiving point cloud data according to the embodiments may further include decoding the point cloud data.

The decoding operation according to the embodiments is performed as described above regarding the operation of the decoder 10008 of FIG. 1, the decoding process of FIG. 16, the decoder of FIG. 17, the reception device of FIG. 19, the decoding, processing, and rendering of FIGS. 20 and 22, the decoding of the bitstream of FIGS. 25 and 26.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for the Disclosure

As described above, related details have been described in the best mode for carrying out the embodiments.

Industrial Applicability

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A method of encoding point cloud data, the method comprising:

encoding the point cloud data;

encapsulating a file including video component tracks carrying the point cloud data and a track for a plurality of atlas data of the point cloud data; and transmitting the file, wherein a first sample entry of the file includes an atlas identifier of atlas data for the point cloud data and parameter set information for the atlas data, wherein a second sample entry of the file includes identifier information related to an atlas tile, and number information related to a number of atlas tiles, wherein the plurality of the atlas data are grouped based on a grouping type, wherein one or more video component tracks related to a specific atlas identifier are grouped among the video component tracks, and wherein the file further includes a timed metadata track for spatial regions that are dynamic in the point cloud data including information for a number of spatial regions.

2. The method of claim 1, wherein the identifier information represents that the atlas data includes one or more atlas tiles for the point cloud data.

3. A non-transitory computer-readable digital storage medium storing a bitstream generated by a point cloud encoding method, the method comprising:

encoding point cloud data;

encapsulating a file including video component tracks carrying the point cloud data and a track for a plurality of atlas data of the point cloud data; and transmitting the file, wherein a first sample entry of the file includes an atlas identifier of atlas data for the point cloud data and parameter set information for the atlas data, wherein a second sample entry of the file includes identifier information related to an atlas tile, and number information related to a number of atlas tiles, wherein the plurality of the atlas data are grouped based on a grouping type, wherein one or more video component tracks related to a specific atlas identifier are grouped among the video component tracks, and wherein the file further includes a timed metadata track for spatial regions that are dynamic in the point cloud data including information for a number of spatial regions.

4. A method of decoding point cloud data, the method comprising:

receiving a file including video component tracks carrying point cloud data and a track for a plurality of atlas data of the point cloud data;

decapsulating the file; and decoding the point cloud data, wherein a first sample entry of the file includes an atlas identifier of atlas data for the point cloud data and parameter set information for the atlas data, wherein a second sample entry of the file includes identifier information related to an atlas tile, and number information related to a number of atlas tiles, wherein the plurality of the atlas data are grouped based on a grouping type, wherein one or more video component tracks related to a specific atlas identifier are grouped among the video component tracks, and wherein the file further includes a timed metadata track for spatial regions that are dynamic in the point cloud data including information for a number of spatial regions.

5. The method of claim 4, wherein the identifier information represents that the atlas data includes one or more atlas tiles for the point cloud data.

6. An apparatus configured to decode point cloud data, the apparatus comprising:

a memory; and a processor connected to the memory, wherein the processor is configured to:

receive a file including video component tracks carrying point cloud data and a track for a plurality of atlas data of the point cloud data;

decapsulate the file; and decode the point cloud data, wherein a first sample entry of the file includes an atlas identifier of atlas data for the point cloud data and parameter set information for the atlas data, wherein a second sample entry of the file includes identifier information related to an atlas tile, and number information related to a number of atlas tiles, wherein the plurality of the atlas data are grouped based on a grouping type, wherein one or more video component tracks related to a specific atlas identifier are grouped among the video component tracks, and wherein the file further includes a timed metadata track for spatial regions that are dynamic in the point cloud data including information for a number of spatial regions.

7. The apparatus of claim 6, wherein the identifier information represents that the atlas data includes one or more atlas tiles for the point cloud data.

* * * * *